(12) United States Patent
Lee et al.

(10) Patent No.: US 11,157,140 B2
(45) Date of Patent: Oct. 26, 2021

(54) INTERFACE PROVIDING METHOD FOR MULTITASKING AND ELECTRONIC DEVICE IMPLEMENTING THE SAME

(71) Applicant: Samsung Electronics Co., Ltd., Gyeonggi-do (KR)

(72) Inventors: Jongmoo Lee, Seoul (KR); Seungmin Choi, Gyeonggi-do (KR); Minseok Kang, Gyeonggi-do (KR); Sunhee Kang, Seoul (KR); Jiwoo Lee, Gyeongsangbuk-do (KR)

(73) Assignee: Samsung Electronics Co., Ltd

( * ) Notice: Subject to any disclaimer, the term of this patent is extended or adjusted under 35 U.S.C. 154(b) by 294 days.

(21) Appl. No.: 15/905,186

(22) Filed: Feb. 26, 2018

(65) Prior Publication Data

US 2018/0246622 A1    Aug. 30, 2018

(30) Foreign Application Priority Data

Feb. 24, 2017    (KR) .................... 10-2017-0025087

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0443* (2019.05); *G06F 3/0481* (2013.01); *G06F 3/04847* (2013.01); *G06F 3/04883* (2013.01); *G06F 2203/04105* (2013.01); *G06F 2203/04803* (2013.01); *G06F 2203/04808* (2013.01)

(58) Field of Classification Search
USPC ........................................................ 715/767
See application file for complete search history.

(56) References Cited

U.S. PATENT DOCUMENTS

| 10,628,018 B2* | 4/2020 | Chilmulwar ........ G06F 3/04817 |
| 2006/0187338 A1* | 8/2006 | May ..................... H04N 5/2254 348/375 |

(Continued)

FOREIGN PATENT DOCUMENTS

| CN | 103502920 | 1/2014 |
| CN | 103838560 | 6/2014 |

(Continued)

OTHER PUBLICATIONS

International Search Report dated May 30, 2018 issued in counterpart application No. PCT/KR2018/002110, 3 pages.

(Continued)

*Primary Examiner* — Ariel Mercado
(74) *Attorney, Agent, or Firm* — The Farrell Law Firm, P.C.

(57) ABSTRACT

Disclosed is an electronic device and multitasking interface providing method therefor. The electronic device presents at least a portion of specific content on at least a portion of the display via a window having a size desired by the user, provides a multi-window display according to user input and determines the content to be displayed in each window, and provides an update on specific content via the first window of the multi-window and an application list enabling application switching via the second window.

17 Claims, 43 Drawing Sheets

(51) Int. Cl.
*G06F 3/0484* (2013.01)
*G06F 3/0488* (2013.01)
*G06F 3/044* (2006.01)

(56) References Cited

U.S. PATENT DOCUMENTS

| | | | |
|---|---|---|---|
| 2010/0208593 A1 | 8/2010 | Soon et al. | |
| 2013/0145313 A1* | 6/2013 | Roh | G06F 3/0481 715/802 |
| 2013/0346912 A1 | 12/2013 | Buening | |
| 2014/0143676 A1 | 5/2014 | Tan | |
| 2014/0298253 A1 | 10/2014 | Jin et al. | |
| 2014/0331174 A1* | 11/2014 | Wen | G06F 3/04883 715/804 |
| 2015/0100914 A1* | 4/2015 | Guan | G06F 3/0481 715/781 |
| 2015/0113455 A1 | 4/2015 | Kang et al. | |
| 2015/0186005 A1 | 7/2015 | Roper et al. | |
| 2016/0034155 A1 | 2/2016 | Vranjes et al. | |
| 2016/0071491 A1 | 3/2016 | Berryman | |
| 2017/0285894 A1* | 10/2017 | Barrus | G06F 3/0482 |
| 2018/0121028 A1* | 5/2018 | Kuscher | G06F 3/0483 |
| 2019/0146625 A1 | 5/2019 | Zhu | |

FOREIGN PATENT DOCUMENTS

| | | |
|---|---|---|
| CN | 105955639 | 9/2016 |
| CN | 106462413 | 2/2017 |
| KR | 1020110100988 | 9/2011 |
| KR | 1020150045121 | 4/2015 |
| KR | 1020150092624 | 8/2015 |

OTHER PUBLICATIONS

European Search Report dated Mar. 9, 2020 issued in counterpart application No. 18758392.7-1203, 18 pages.
Jack Wallen: "How to Manage Multi-Window Mode in Android N—TechRepublic", XP055640287, Internet, Jun. 7, 2016, 12 pages.
Vranjes Miron: "Arrange your Windows in a Snap—Windows Experience Blog", XP055640286, Internet, Jun. 4, 2015, 11 pages.
European Search Report dated Nov. 20, 2019 issued in counterpart application No. 18758392.7-1221, 19 pages.
Chinese Office Action dated Nov. 18, 2020 issued in counterpart application No. 201880013784.8, 23 pages.

* cited by examiner

INTERFACE PROVIDING METHOD FOR MULTITASKING AND ELECTRONIC DEVICE IMPLEMENTING THE SAME

PRIORITY

This application claims priority under 35 U.S.C. § 119(a) to a Korean Patent Application filed in the Korean Intellectual Property Office on Feb. 24, 2017 and assigned Serial No. 10-2017-0025087, the contents of which are incorporated herein by reference.

BACKGROUND

1. Field of the Disclosure

The present disclosure relates generally to an electronic device, and more particularly, to a method and apparatus that provide a user interface for controlling multitasking performed in an electronic device.

2. Description of the Related Art

Multitasking refers to performing two or more tasks simultaneously on an electronic device. Specifically, the electronic device can provide a multi-window or an application list, as an interface permitting the user to control multitasking, through a display in response to a user input, such as a tap, multi-touch, or gesture on a particular button. Screens of applications (user interfaces) may be simultaneously displayed in each window, and the size of each window can be adjusted. The electronic device may display a list of running applications on the display in response to another user input, such as a long tap on a particular button. The user interface of the application selected by the user on the application list may be displayed on the display.

In the multi-window feature supported by the electronic device, the aspect ratio of each window may not be suitable for presenting content desired by the user in the user interface. For example, the aspect ratio of the display (i.e. the ratio of width to height) may be 16:9. The electronic device may provide a multi-window by dividing the display having a 16:9 aspect ratio into two windows each having an 8:9 aspect ratio. A video may be displayed on the first window of the multi-window and other content, such as the scoreboard in a sports event, may be displayed on the second window. The 8:9 aspect ratio may differ from the normal video aspect ratio (9:16 or 9:21). Thus, the user may have to enter an additional input, such as scrolling or dragging, to match the aspect ratio of the first window to the video aspect ratio.

In addition, the electronic device can provide an application list on the display. For example, a captured image of each application may be provided along with a list of recently executed applications. However, it may not be easy for the user to predict the current status of an application through a captured image of the application that has long been placed in the background. For instance, to check a reply or news that is frequently updated in a social networking service (SNS) application, it may be necessary to select the application and execute it as a foreground application. In other words, it may be difficult to check the updated contents of each application in a simple way through the application list.

SUMMARY

Aspects of the present disclosure are to address at least the above mentioned problems and/or disadvantages and to provide at least the advantages described below.

Accordingly, an aspect of the present disclosure is to provide an electronic device that presents at least a portion of specific content on at least a portion of the display via a window having a size desired by the user.

Another aspect of the present disclosure is to provide an electronic device that can provide a multi-window on the display according to user input and determine the content to be displayed in each window.

Another aspect of the present disclosure is to provide an electronic device that can provide an update on specific content via the first window of the multi-window and an application list enabling application switching via the second window.

In accordance with an aspect of the present disclosure, there is provided an electronic device including a housing configured to include a first surface and a second surface facing away from the first surface, a touchscreen display exposed through a first portion of the first surface, a wireless communication circuit positioned inside the housing, a processor positioned inside the housing and electrically connected to the display and the wireless communication circuit, and a memory positioned inside the housing and electrically connected to the processor, wherein the memory is configured to store instructions that, when executed, cause the processor to display a first user interface of a first application program on the display, receive a first user input via the display while the first user interface is displayed, display, in response to the first user input, a movable and resizable window for selecting a portion of the first user interface, receive a second user input for selecting the portion of the first user interface via the display, and move, in response to the second user input, the selected portion of the first user interface to a designated region of the display.

In accordance with another aspect of the present disclosure, there is provided an electronic device including a housing configured to include a first surface and a second surface facing away from the first surface, a touchscreen display exposed through a first portion of the first surface, a touch sensitive button disposed at a second portion of the first surface, a wireless communication circuit positioned inside the housing, a processor positioned inside the housing and electrically connected to the display, the button, and the wireless communication circuit, and a memory positioned inside the housing and electrically connected to the processor, wherein the memory is configured to store instructions that, when executed, cause the processor to display a first user interface of a first application program on the display, receive a first user input via the display or the button while the first user interface is displayed, display, in response to the first user input, a movable and resizable window for selecting a portion of the first user interface, receive a second user input for selecting the portion of the first user interface via the display, and move, in response to the second user input, the selected portion of the first user interface to a designated region of the display.

In accordance with another aspect of the present disclosure, there is provided a method for an electronic device having a touchscreen display, including displaying a first user interface of a first application program on the display, receiving a first user input via the display or a touch sensitive button while the first user interface is displayed, displaying, in response to the first user input, a movable and resizable window for selecting a portion of the first user interface, receiving a second user input for selecting the portion of the first user interface via the display, and moving, in response to the second user input, the selected portion of the first user interface to a designated region of the display.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
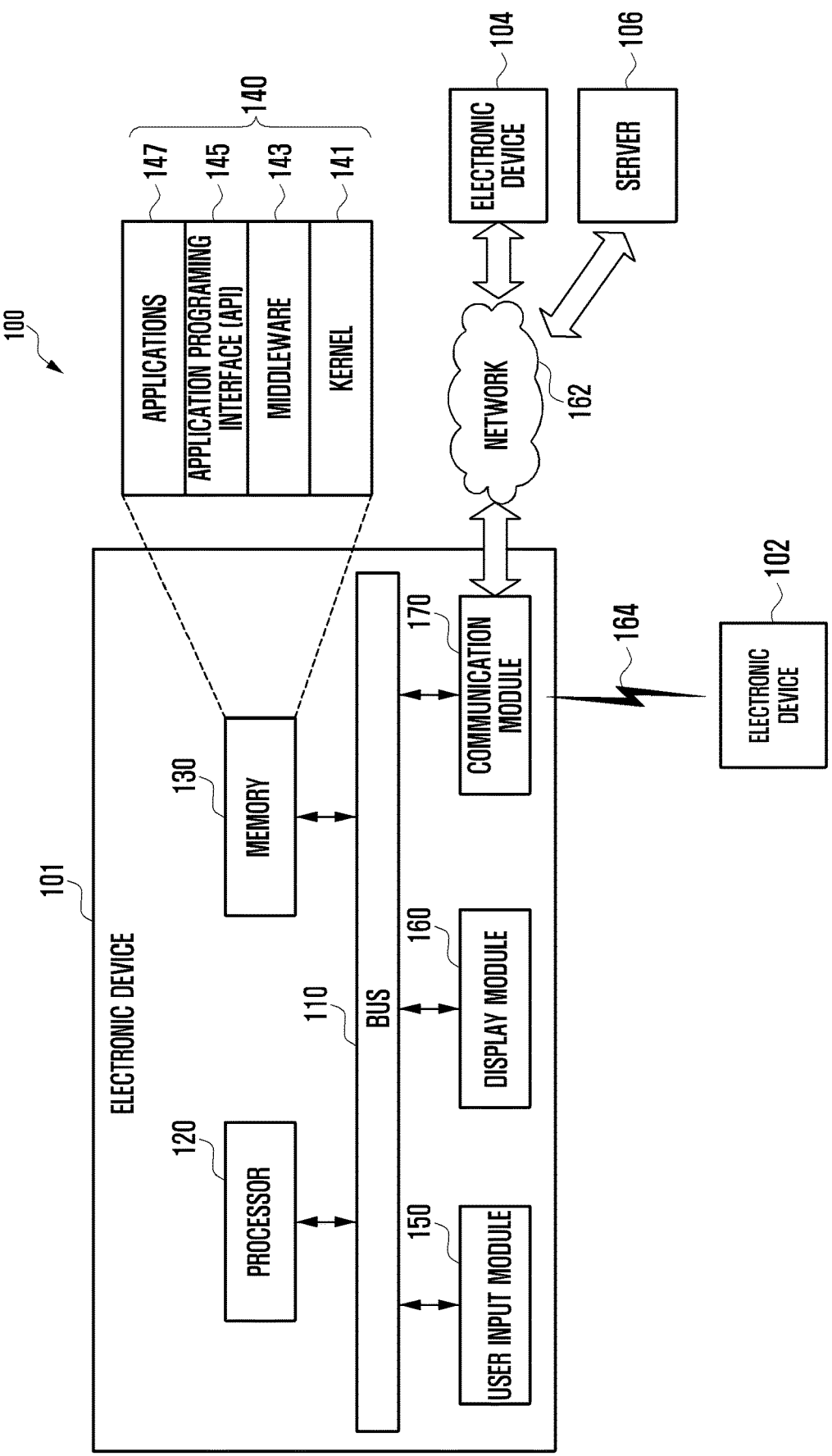
FIG. 1 illustrates electronic devices in a network environment according to embodiments of the present disclosure.

The following description with reference to the accompanying drawings is provided to aid in a comprehensive understanding of embodiments of the present disclosure. It includes various details to assist in that understanding, but these are to be regarded as merely examples. Accordingly, those of ordinary skill in the art will recognize and understand that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to their dictionary meanings, but are merely used to enable a clear and consistent understanding of the present disclosure. Accordingly, it should be apparent to those skilled in the art that the following description of embodiments of the present disclosure is provided for illustration purposes only and not for the purpose of limiting the present disclosure, as defined by the appended claims and their equivalents.

It is to be understood that the singular terms "a," "an," and "the" include the plural term unless the context clearly dictates otherwise. Thus reference to "a component surface" includes reference to one or more of such surfaces.

The expressions "include" or "may include" may refer to the existence of a corresponding disclosed function, operation or component which can be used in embodiments of the present disclosure and do not limit one or more additional functions, operations, or components. Terms herein such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In embodiments of the present disclosure, the expression "or" or "at least one of A or/and B" includes any or all of combinations of words listed together. For example, the expression "A or B" or "at least A or/and B" may include A, may include B, or may include both A and B.

The terms "1", "2", "first", or "second" used in embodiments of the present disclosure may modify various components of the embodiments but do not limit the corresponding components. For example, the above expressions do not limit the sequence and/or importance of the components. The expressions may be used for distinguishing one component from other components. For example, a first user device and a second user device may indicate different user devices although both are user devices. Similarly, a first structural element may be referred to as a second structural element, and the second structural element also may be referred to as the first structural element.

When it is stated that a component is "coupled to" or "connected to" another component, the component may be directly coupled or connected to another component or a further component may exist between the component and another component. On the other hand, when it is stated that a component is "directly coupled to" or "directly connected to" another component, an additional component does not exist between the two components.

The terms used in describing embodiments of the present disclosure are only examples for describing a specific embodiment but do not limit the embodiments of the present disclosure.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to embodiments of the present disclosure may include a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD) such as electronic glasses, electronic clothes, an electronic bracelet, an electronic necklace, an electronic accessary, an electronic tattoo, and a smart watch), but is not limited thereto.

According to embodiments of the present disclosure, the electronic device may be a smart home appliance having a communication function and including at least one of a television (TV), a digital versatile disc (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame, but is not limited thereto.

According to embodiments, the electronic device may include at least one of various types of medical devices, such as a magnetic resonance angiography (MRA) device, magnetic resonance imaging (MRI) device, computed tomography (CT) device, a scanner, and an ultrasonic device, a navigation device, a global navigation satellite system (GNSS) receiver, an event data recorder (EDR), a flight data recorder (FDR), a vehicle infotainment device, electronic equipment for a ship (e.g., a navigation device and a gyro compass, avionics, a security device, a head unit for a vehicle, an industrial or home robot, an automated teller machine (ATM), a point of sales (POS) device, and an Internet of things (IoT) device, such as a fire alarm, various sensors, electric or gas meter units, a sprinkler, a thermostat, a streetlamp, a toaster, sports outfits, a hot-water tank, a heater, and a boiler, but is not limited thereto.

According to embodiments of the present disclosure, the electronic device may include at least one of furniture or a part of a building/structure, an electronic board, an electronic signature receiving device, a projector, and various types of measuring devices, such as a water, electricity, gas, or radio wave meter including a camera function, but is not limited thereto. The electronic device may be one or a combination of the above described various devices, and may be flexible, but the present disclosure is not limited to the above described devices.

Hereinafter, an electronic device according to embodiments of the present disclosure will be described with reference to the accompanying drawings. The term "user" used in embodiments may refer to a person who uses an electronic device or an artificial intelligence electronic device which uses an electronic device.

FIG. 1 illustrates an example network environment 100 including an electronic device 101 according to embodiments of the present disclosure.

Referring to FIG. 1, the electronic device 101 may include various components including a bus 110, a processor (e.g., including processing circuitry) 120, a memory 130, user input module (e.g., including input/output circuitry) 150, a display 160, and a communication module (e.g., including communication circuitry) 170.

The bus 110 may be a circuit connecting the above described components and transmitting communication (e.g., a control message) between the above described components.

The processor 120 may include various processing circuitry and receive commands from other components through the bus 110, analyze the received commands, and execute calculation or data processing according to the analyzed commands.

The memory 130 stores commands or data received from the processor 120 or other components or generated by the processor 120 or other components. The memory 130 may store a software and/or a program 140 including a kernel 141, middleware 143, an application programming interface (API) 145, and application programs (or applications) 147. At least part of the kernel 141, the middleware 143 or the API 145 may be referred to as an operating system (OS).

The kernel 141 controls or manages system resources used for executing an operation or function implemented by the remaining other programming modules, and provides an interface for accessing individual components of the electronic device 101 from the middleware 143, the API 145, or the applications 147 to control or manage the components.

The middleware 143 performs a relay function of enableing the API 145 or the applications 147 to communicate with the kernel 141 to exchange data. In operation requests received from the applications 147, the middleware 143 performs a control for scheduling or load balancing the operation requests by assigning a priority, by which system resources of the electronic device 101 can be used, to the applications 147.

The API 145 is an interface by which the applications 147 can control a function provided by the kernel 141 or the middleware 143 and includes at least one interface or function for file control, window control, image processing, or character control.

The applications 147 may include a short message service (SMS)/multimedia messaging service (MMS), email, calendar, alarm, health care (e.g., for measuring quantity of exercise or blood sugar) or environment information application, such as for providing information on barometric pressure, humidity or temperature. The applications 147 may be related to an information exchange between the electronic device 101 and a second external electronic device 104 and may include a notification relay application for transferring particular information to the external electronic device or a device management application for managing the external electronic device.

For example, the notification relay application may include a function of transmitting notification information generated by another application of the electronic device 101 to the second external electronic device 104, may receive notification information from the second external electronic device 104, and may provide the received notification information to the user. The device management application may install, remove, or update at least a part of functions of the electronic device, may turn on/off the external electronic device (or some components of the external electronic device), and control a brightness of the display of the external electronic device or communicate with the electronic device 101, an application executed in the second external electronic device 104, or a service (e.g., call service or message service) provided by the second external electronic device 104.

The applications 147 may include an application designated according to an attribute of the second external electronic device 104. For example, when the second external electronic device 104 is a moving picture experts group (MPEG-1 or MPEG-2) audio layer-3 (MP3) player, the applications 147 may include an application related to music reproduction. Similarly, when the second external electronic device 104 is a mobile medical device, the applications 147 may include an application related to health care. The applications 147 may include at least one of an application designated to the electronic device 101 and an application received from an external electronic device.

The input/output interface 150 may include various input/output circuitry and/or devices and transmits a command or data input from the user through an input/output device (e.g., a sensor, a keyboard, or a touch screen) to the processor 120, the memory 130, the communication interface 170, or the display 160 through the bus 110. For example, the input/output interface 150 may provide data on a user's touch input through a touch screen to the processor 120, and may output a command or data received through the bus 110, from the processor 120, the memory 130, or the communication interface 170 through the input/output device, such as outputting voice data processed through the processor 120 to the user through the speaker.

The display 160 may include a liquid crystal display (LCD), flexible display, transparent display, light-emitting diode (LED) display, organic LED (OLED) display, microelectromechanical systems (MEMS) display, or electronic paper display, but is not limited thereto. The display 160 may visually offer various content to users, may include a touch screen, and receive a touch, gesture, proximity, or hovering input using an electronic pen or a user's body, and may be one or more displays. For example, the display 160 may be included in the electronic device 101 or included in an external device, such as a first external electronic device 102 or the second external electronic device 104, having a wired or wireless connection with the electronic device 101, thus outputting information offered by the electronic device 101 to users.

The display 160 may be attachable to or detachable from the electronic device 101. For example, the display 160 may include an interface which can be mechanically or physically connected to the electronic device 101. In case the display 160 is detached (e.g., separated) from the electronic device 101 by a user's selection, the display 160 may wirelessly receive various control signals or image data from the processor 120.

The communication interface 170 may include various communication circuitry and establish communication between the electronic device 101 and any external device. For example, the communication interface 170 may be connected to a network 162 through wired or wireless communication and thereby communicate with any external device, and may establish a short-range wireless communication with an external electronic device, such as external electronic devices 102 or 104.

The electronic device 101 may be connected to the first external electronic device 102 and the second external electronic device 104 without using the communication interface 170. For example, based on at least one of a magnetic sensor, a contact sensor, or a light sensor that is equipped therein, the electronic device 101 may sense whether at least one of the first and second external electronic devices 102 and 104 contacts at least part of the electronic device 101, or is attached to at least part of the electronic device 101.

Wireless communication may use, as cellular communication protocol, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). A short-range communication 163 may include at least one of Wi-Fi, Bluetooth (BT), near field communication (NFC), magnetic secure transmission or near field magnetic data stripe transmission (MST), and GNSS, which may include at least one of a global positioning system (GPS), a Glonass, a Beidou navigation satellite system (Beidou), and the European global satellite-based navigation system (Galileo). Hereinafter, "GPS" may be interchangeably used with "GNSS" in the present disclosure. Wired communication may include at least one of a universal serial bus (USB), high definition multimedia interface (HDMI), recommended standard-232 (RS-232), and plain old telephone service (POTS). The network 162 may include at least one of a computer network, such as a local area network (LAN) or wide area network (WAN)), internet, and a telephone network.

The first and second external electronic devices 102 and 104 may be identical to, or different from, the electronic device 101, and may include a plurality of electronic devices. The server 106 may include a single server or a group of servers. All or part of operations executed in the electronic device 101 may be executed in other electronic device(s), such as the first and second external electronic devices 102 and 104 or the server 106.

In case the electronic device 101 is required to perform a certain function or service automatically or by request, the electronic device 101 may request at least one of the first external electronic device 102, the second external electronic device 104 or the server 106 to execute one or more functions associated with the required function or service. The requested device may execute the requested function and deliver the result of execution to the electronic device 101, which may then offer the required function or service, based on the received result or by processing the received result. To perform this execution, cloud computing, distributed computing, or client-server computing technologies may be used.

Figure 2:
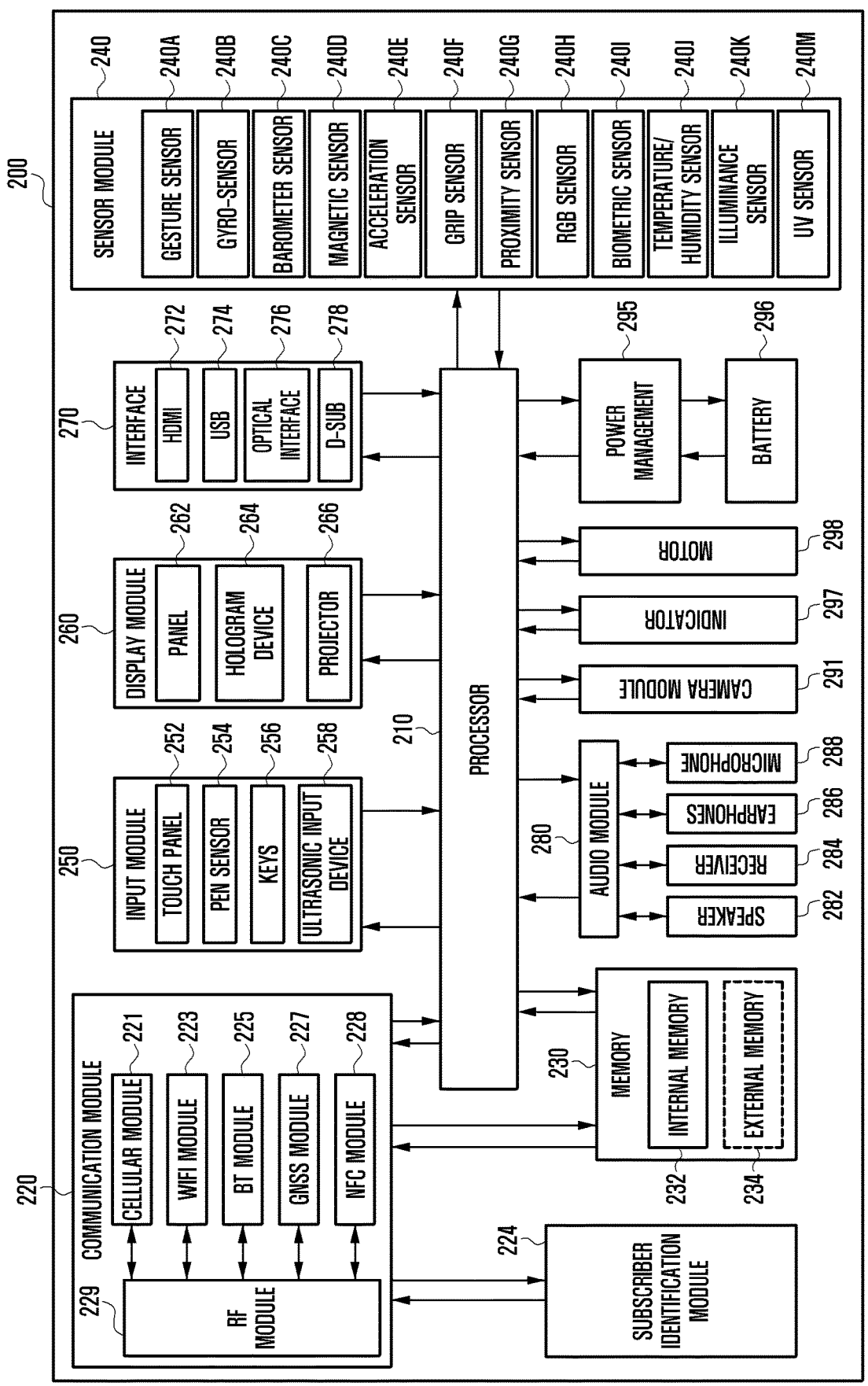
FIG. 2 is a block diagram of an electronic device according to embodiments of the present disclosure.

FIG. 2 illustrates an example configuration of an electronic device according to an embodiment of the present disclosure.

Referring to FIG. 2, the electronic device 201 may include part or all of the components in the electronic device 101 illustrated in FIG. 1. The electronic device 201 may include one or more processors 210 and a communication module 220 both including requisite circuitry, a subscriber identification module (SIM) card 224, a memory 230, a sensor module 240, an input module 250 and a display module 260, an interface 270 both including requisite circuitry, an audio module 280, a camera module 291, a power management module 295, a battery 296, an indicator 297, and a motor 298.

The processor 210 may include various processing circuitry, such as a dedicated processor, a CPU, an application processor, or an application specific integrated circuit, and is capable of driving an OS or an application program to control a plurality of hardware or software components connected to the processor 210, processing various data, and performing operations. The processor 210 may be implemented as a system on chip (SoC), may further include a graphic processing unit (GPU) and/or an image signal processor (ISP), may also include at least part of the components illustrated in FIG. 2, is capable of loading commands or data received from at least one of other components on a volatile memory and processing the loaded commands or data, and is capable of storing various data in a non-volatile memory.

The communication module 220 may include the same or similar configurations as the communication interface 170 illustrated in FIG. 1, such as the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, and an Internet service through a communication network, is capable of identifying and authenticating the electronic device 201 in a communication network by using the SIM card 224, may be capable of performing at least part of the functions provided by the processor 210, and may also include a communication processor (CP).

Each of the Wi-Fi module 223, the BT module 225, the GNSS module 227, and the NFC module 228 may include a processor and various communication circuitry for processing data transmitted or received through the corresponding module, and at least part of these modules may be included in one integrated chip (IC) or one IC package.

The RF module 229 is capable of transmission/reception of communication RF signals, and may include a transceiver, a power amp module (PAM), a frequency filter, a low noise amplifier (LNA), or an antenna. According to another embodiment of the present disclosure, at least one of the cellular module 221, Wi-Fi module 223, BT module 225, GNSS module 226, NFC module 228, and MST module is capable of transmission/reception of RF signals through a separate RF module.

The SIM card 224 may include a card including a SIM and/or an embodied SIM, and contain unique identification information, e.g., integrated circuit card identifier (ICCID), or subscriber information, e.g., international mobile subscriber identity (IMSI).

The memory 230 may include a built-in internal memory 232 and/or an external memory 234. The built-in internal memory 232 may include at least one of a volatile memory including a dynamic random access memory (DRAM), a static RAM (SRAM), or a synchronous dynamic RAM (SDRAM), and a non-volatile memory including a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, or a solid state drive (SSD).

The external memory 234 may include a flash drive, e.g., a compact flash (CF), a secure digital (SD), a micro-SD, a mini-SD, an extreme digital (xD), a multi-media card (MMC), and a memory stick. The external memory 234 may be connected to the electronic device 201, functionally and/or physically, through various interfaces.

The memory 230 may store payment information and a payment application serving as one of the application programs. The payment information may refer to credit card numbers and personal identification numbers (PINs), corresponding to a credit card, and user authentication information, such as fingerprints, facial features, and voice information.

The sensor module 240 may measure/detect a physical quantity or an operation state of the electronic device 201, and convert the measured or detected information into an electrical signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor and/or a fingerprint sensor, and a control circuit for controlling one or more sensors included therein. The electronic device 201 may include a processor, configured as part of the processor 210 or a separate component, for controlling the sensor module 240. In this case, the processor may control the sensor module 240 while the processor 210 is operating in a sleep mode.

The input module 250 may include various input circuitry, such as a touch panel 252, a digital pen sensor 254, keys 256, and an ultrasonic input device 258. The touch panel 252 may use at least one of a capacitive, resistive, infrared, and an ultrasonic type, may further include a control circuit and a tactile layer to offer a tactile feedback to a user, and may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include a physical button, an optical key, or a keypad. The ultrasonic input device 258 may detect ultrasonic waves occurring at an input tool through a microphone 288 and thereby identify data corresponding to the detected ultrasonic waves.

The display 260 may include a panel 262, a hologram device 264, or a projector 266. The panel 262 may include the same or similar configurations as the display 160 shown in FIG. 1. The panel 262 may be implemented to be flexible, transparent, or wearable, and be incorporated into one module together with the touch panel 252. The hologram device 264 may display a stereoscopic image in the air by using light interference. The projector 266 may display an image by projecting light onto a screen located inside or outside of the electronic device 201. The display 260 may further include a control circuit for controlling the panel 262, the hologram device 264, or the projector 266.

The interface 270 may include various interface circuitry, such as a high-definition multimedia interface (HDMI) 272, a USB 274, an optical interface 276, and a D-subminiature (D-sub) 278, may be included in the communication interface 170 shown in FIG. 1, and may include a mobile high-definition link (MHL) interface, a SD card/MMC interface, or an infrared data association (IrDA) standard interface.

The audio module 280 may provide bidirectional conversion between a sound and an electronic signal. At least part of the components in the audio module 280 may be included in the input/output interface 150 shown in FIG. 1. The audio module 280 may process sound information input or output through a speaker 282, a receiver 284, earphones 286, or microphone 288.

The camera module 291 may take both still and moving images and may include one or more image sensors (e.g., a front image sensor or a rear image sensor), a lens, an image signal processor (ISP), and a flash, such as a light-emitting diode (LED) or xenon lamp.

The power management module 295 is capable of managing power of the electronic device 201 and may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, or a rectifier. The battery gauge may measure the residual capacity, charge in voltage, current, or temperature of the battery 296, and may be either a rechargeable or solar battery.

The indicator 297 may display a specific status of the electronic device 201 or a part thereof, such as a boot-up, message, or charging status. The motor 298 may convert an electrical signal into mechanical vibrations, such as a vibration or haptic effect. The electronic device 201 may further include a processing unit (e.g., GPU) that supports a mobile TV and is capable of processing media data pursuant to standards, e.g., digital multimedia broadcasting (DMB), digital video broadcasting (DVB), or mediaFlo™.

Each of the elements described in the present disclosure may be formed with one or more components, and the names of the corresponding elements may vary according to the type of the electronic device. In embodiments, the electronic device may include at least one of the above described elements described in the present disclosure, and may exclude some of the elements or further include other additional elements. Some of the elements of the electronic device may be coupled to form a single entity while performing the same functions as those of the corresponding elements prior to the coupling.

Figure 3:
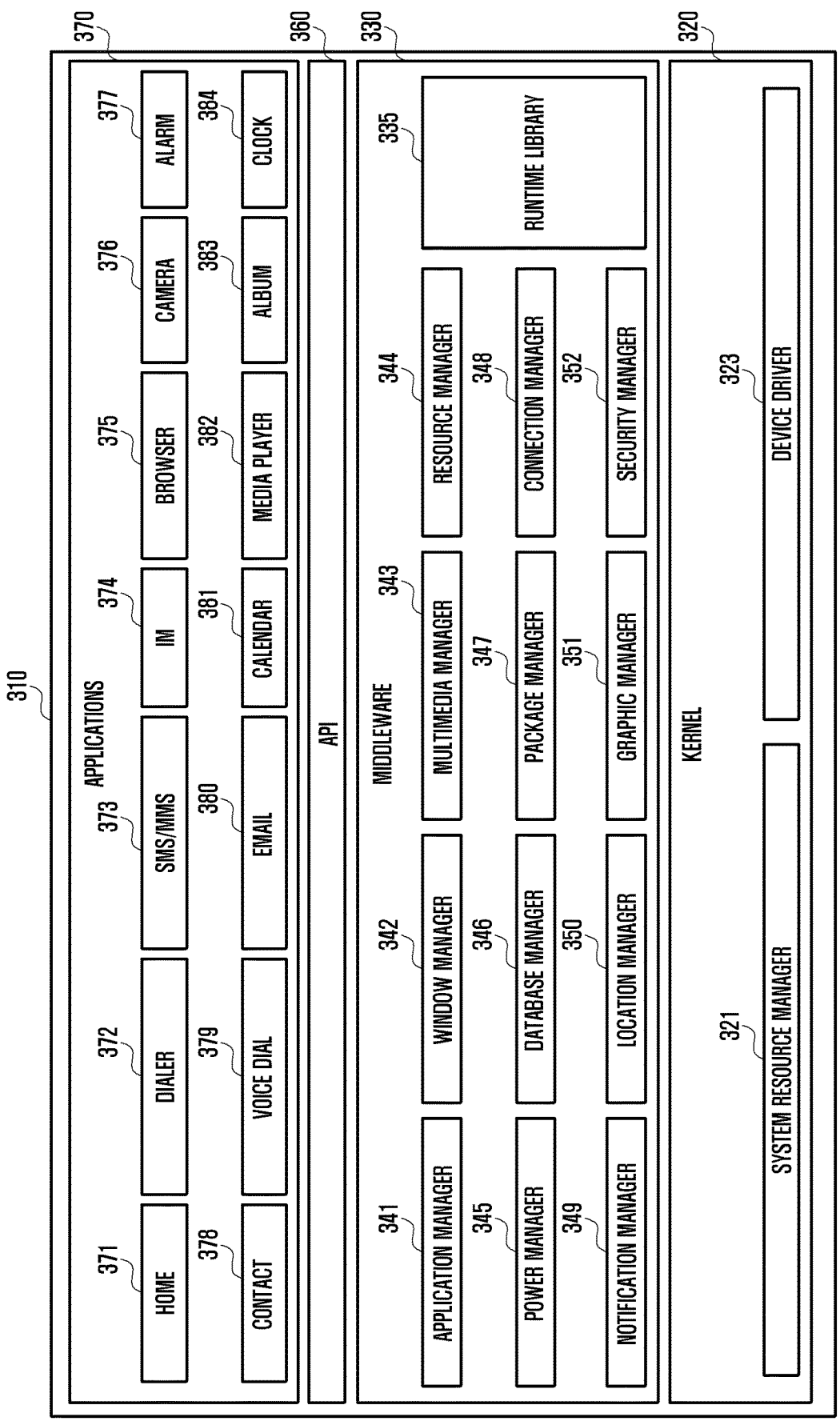
FIG. 3 is a block diagram of program modules according to embodiments of the present disclosure.

FIG. 3 illustrates a programming module according to an embodiment of the present disclosure.

Referring to FIG. 3, the program module 310 may include an OS for controlling resources related to the electronic device and/or various applications running on the OS. The OS may be Android, iOS, Windows, Symbian, Tizen, or Bada, but is not limited thereto.

The program module 310 may include a kernel 320, middleware 330, API 360 and/or applications 370. At least part of the program module 310 may be preloaded on the electronic device or downloaded from a server.

The kernel 320 may include a system resource manager 321 and/or a device driver 323. The system resource manager 321 may include a process manager, a memory manager, and a file system manager. The system resource manager 321 may perform a system resource control, allocation, and recall. The device driver 323 may include a display driver, a camera driver, a BT driver, a shared memory driver, a USB driver, a keypad driver, a Wi-Fi driver, an audio driver, and an inter-process communication (IPC) driver.

The middleware 330 may provide a function required in common by the applications 370 through the API 360 to enable the applications 370 to efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connection manager 348, a notification manager 349, a location manager 350, a graphic manager 351, and a security manager 352.

The runtime library 335 may include a library module used by a complier to add a new function through a programming language while the applications 370 are executed. According to an embodiment of the present disclosure, the runtime library 335 executes input and output, management of a memory, and a function associated with an arithmetic function.

The application manager 341 may manage a life cycle of at least one of the applications 370. The window manager 342 may manage GUI resources used on the screen. The multimedia manager 343 may detect a format required for reproducing various media files and encode or decode a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed as a package file.

The connection manager 348 may manage a wireless connection such as Wi-Fi or BT. The notification manager 349 may display or notify a user of an event such as an arrival message, an appointment, a proximity alarm, in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. When the electronic device has a call function, the middleware 330 may further include a telephony manager for managing a voice of the electronic device or a video call function.

The middleware 330 may include modules configuring various combinations of functions of the above described components, may provide modules specialized according to types of operation systems to provide distinct functions, and may be adaptively configured in such a manner as to remove part of the existing components or to include new components.

The API 360 may be a set of API programming functions, and may be provided with a different configuration according to an OS. For example, in Android or iOS, a single API set may be provided for each platform. In Tizen, two or more API sets may be provided.

The applications 370 may include one or more applications for performing various functions, such as a home 371, dialer 372, SMS/MMS 373, instant message (IM) 374, browser 375, camera 376, alarm 377, contact 378, voice dial 379, email 380, calendar 381, media player 382, album 383, and clock 384 function. Additionally, or alternatively, the applications 370 may include health care (e.g., an application for measuring amount of exercise, or blood sugar level), and environment information (e.g., an application for providing atmospheric pressure, humidity, or temperature).

The applications 370 may include an application for supporting information exchange between an electronic device and an external device. The information exchange application is capable of including a notification relay application for relaying specific information to external devices or a device management application for managing external devices.

For example, the notification relay application may include a function for relaying notification information, created in other applications of the electronic device to external devices, and is capable of receiving notification information from external devices to provide the received information to the user.

The device management application may install, remove or update at least one function of an external device communicating with the electronic device. Examples of the function are a function of turning-on/off the external device or part of the external device, a function of controlling the resolution of the display, applications running on the external device, and services provided by the external device, such as a call or messaging service.

The applications 370 may include a health care application of a mobile medical device, applications received from an external device, and a preloaded application or third party applications that can be downloaded from a server. It should be understood that the components of the program module 310 may be referred to by different names according to the type of the OS.

According to embodiments of the present disclosure, at least part of the program module 310 can be implemented with software, firmware, hardware, or any combination thereof, can be executed by a processor, and may include modules, programs, routines, sets of instructions, or processes for performing one or more functions.

The term 'module' as used in embodiments of the present disclosure may refer to a unit including one of hardware, software, and firmware or any combination, may be interchangeable with the term 'unit,' 'logic,' 'logical block,' 'component,' or 'circuit', may be the smallest unit of an integrated component or a part thereof, may be the smallest unit that performs one or more functions or a part thereof, and may be mechanically or electronically implemented. For example, the 'module' according to embodiments of the present disclosure may include at least one of a dedicated processor, a CPU, application-specific integrated circuit (ASIC) chips, field-programmable gate arrays (FPGAs), and programmable-logic devices for performing certain operations, which are now known or will be developed in the future.

At least part of the method or system according to embodiments of the present disclosure can be implemented with instructions as programming modules that may be stored in computer-readable storage media. One or more processors can execute instructions, thereby performing the functions. At least part of the programming modules can be implemented (executed) by a processor and may include modules, programs, routines, or sets of instructions or processes, in order to perform one or more functions.

Examples of computer-readable media include magnetic media, such as hard disks, floppy disks, and magnetic tape, optical media such as compact disc-ROM (CD-ROM) disks and DVD, magneto-optical media, such as floptical disks, and hardware devices that are specially configured to store and perform program instructions, such as a read-only memory (ROM), random access memory (RAM), and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

Modules or programming modules according to embodiments of the present disclosure may include one or more components, remove part of the components described above, or include new components. The operations performed by modules, programming modules, or the other components may be executed in serial, parallel, repetitive or heuristic fashion. Part of the operations can be executed in any other order, skipped, or executed with additional operations.

The embodiments described in the present disclosure are merely provided to assist in a comprehensive understanding of the disclosure and the technology thereof and are not limited thereto.

FIGS. 4A, 4B, 4C, 4D and 4E illustrate a single-window and a multi-window of the electronic device according to embodiments of the present disclosure.

In one embodiment, the electronic device may include all or some of the components of the electronic device 101 of FIG. 1 or the electronic device 201 of FIG. 2.

Figure 4A:
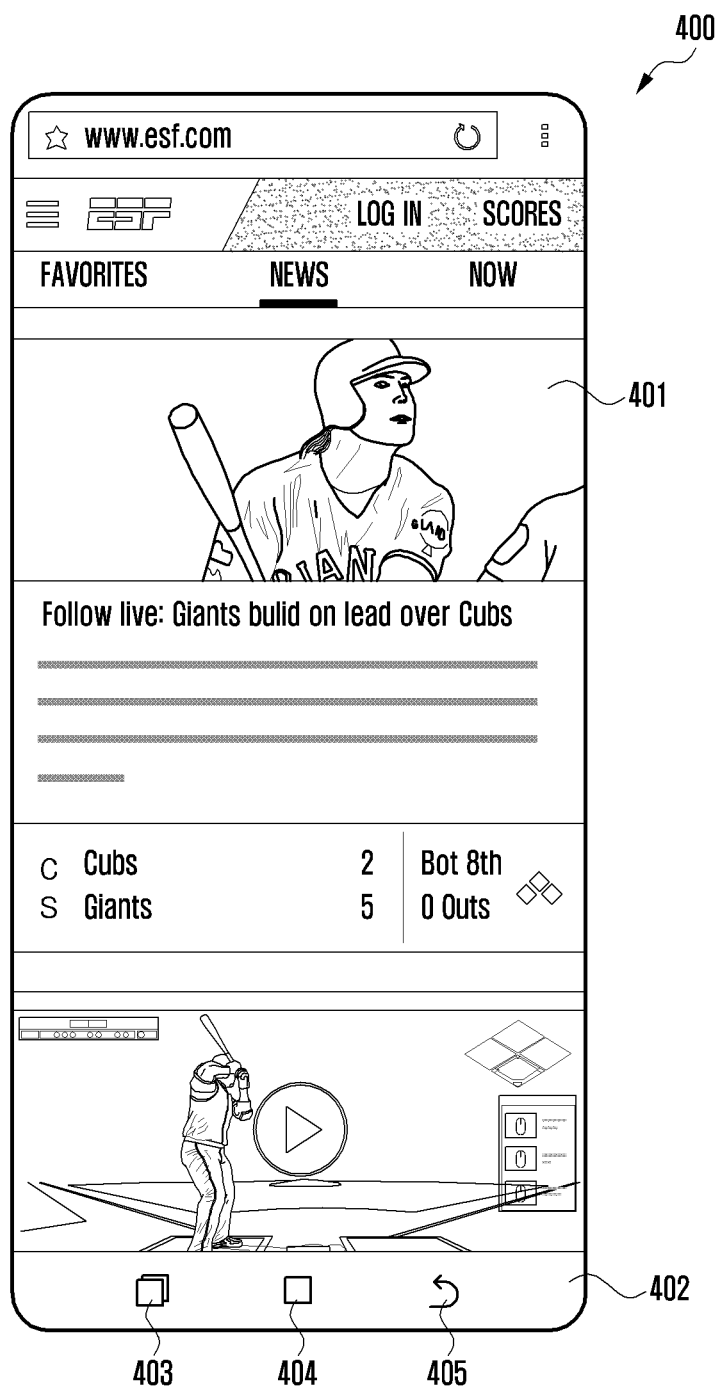
FIGS. 4A, 4B, 4C, 4D and 4E illustrate a single-window and a multi-window according to embodiments of the present disclosure.

With reference to FIG. 4A, the aspect ratio of the display 400 (e.g. display 160 in FIG. 1 or display 260 in FIG. 2) of the electronic device may be, but not limited to, within a range of 16:9 to 22:9, and thus may be 18.5:9 (Z:W). The resolution of the display 400 may be, but not limited to, 1440 (W)*2960 (Z). The electronic device may provide a single-window 401 and a soft-key panel (navigation bar) 402 via the display 400. The screen (user interface or content) of an application can be provided through the single-window 401. In one embodiment, at least one key (e.g. multitasking key 403, home key 404, or cancel key 405) may be provided via the soft-key panel 402. In another embodiment, the soft-key panel 402 may be not provided through the display 400, and separate hard keys (e.g. touch sensitive buttons replacing the soft-key panel 402) may be arranged close to the bottom end of the display 400. In the following description, a soft key provided through the display may also be replaced with a hard key.

Figure 4B:
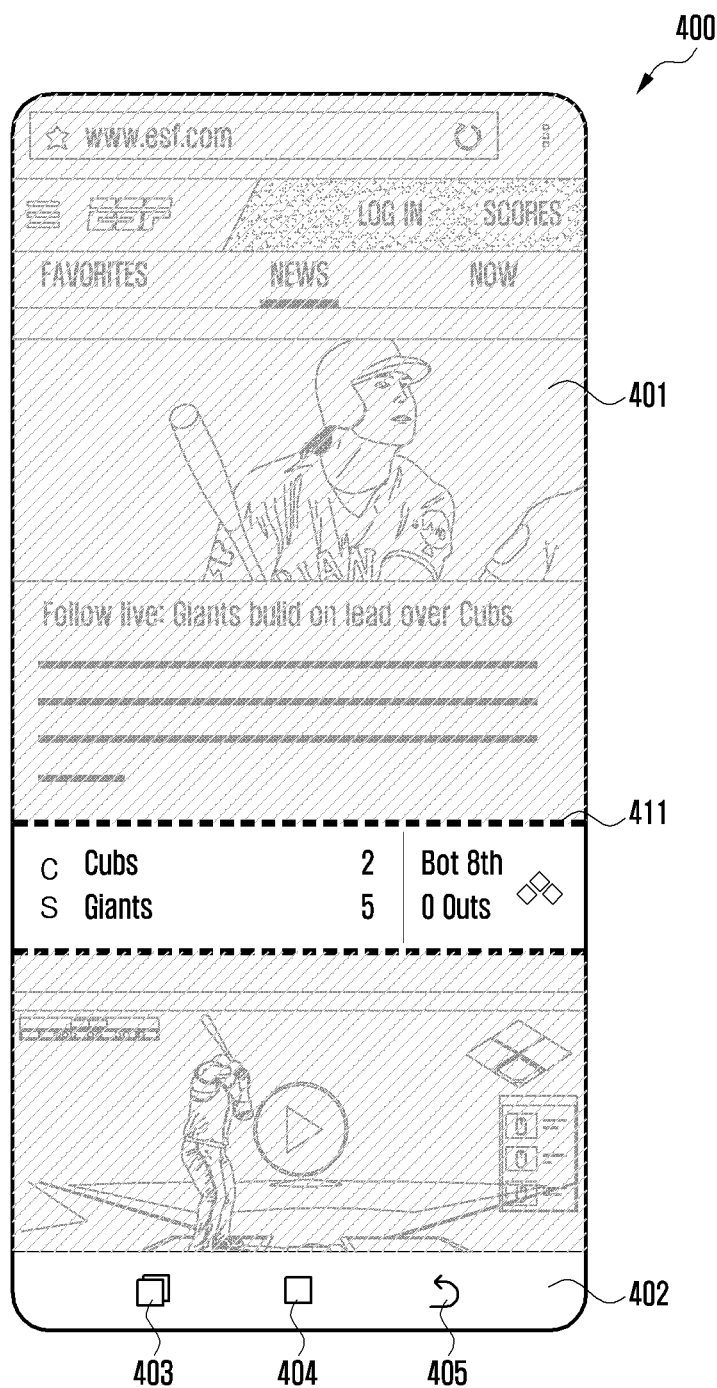

With reference to FIG. 4B, the electronic device may display a guide 411 in the single-window 401 in response to a first input of the user to the multitasking key 403. The guide 411 enables the user to select the size of the snap window and items to be displayed therein, and the size and position of the snap window can be changed according to user input. The term "snap" may indicate "taking a quick photograph", and "window" may indicate "seeing something through the window" Hence, "snap window" may indicate "quickly identifying an object". Also, "snap" can indicate "flicking one's fingers", and "snap window" can indicate "moving a selected object quickly to a position that is always visible".

The guide 411 may be provided based on the size of the content presented in the single-window 401. For example, when a moving image is displayed in the single-window 401, the guide 411 may be determined to have the same size as the moving image. The guide 411 may be in the form of a rectangle and may be referred to as a box or window. Hereinafter, the guide 411 is collectively referred to as "box" for ease of description. The portion located outside the box 411 in a user interface may be displayed differently from the portion located inside the box 411, such as by being displayed opaquely so that the user can readily recognize the position and size of the box 411.

Figure 4C:
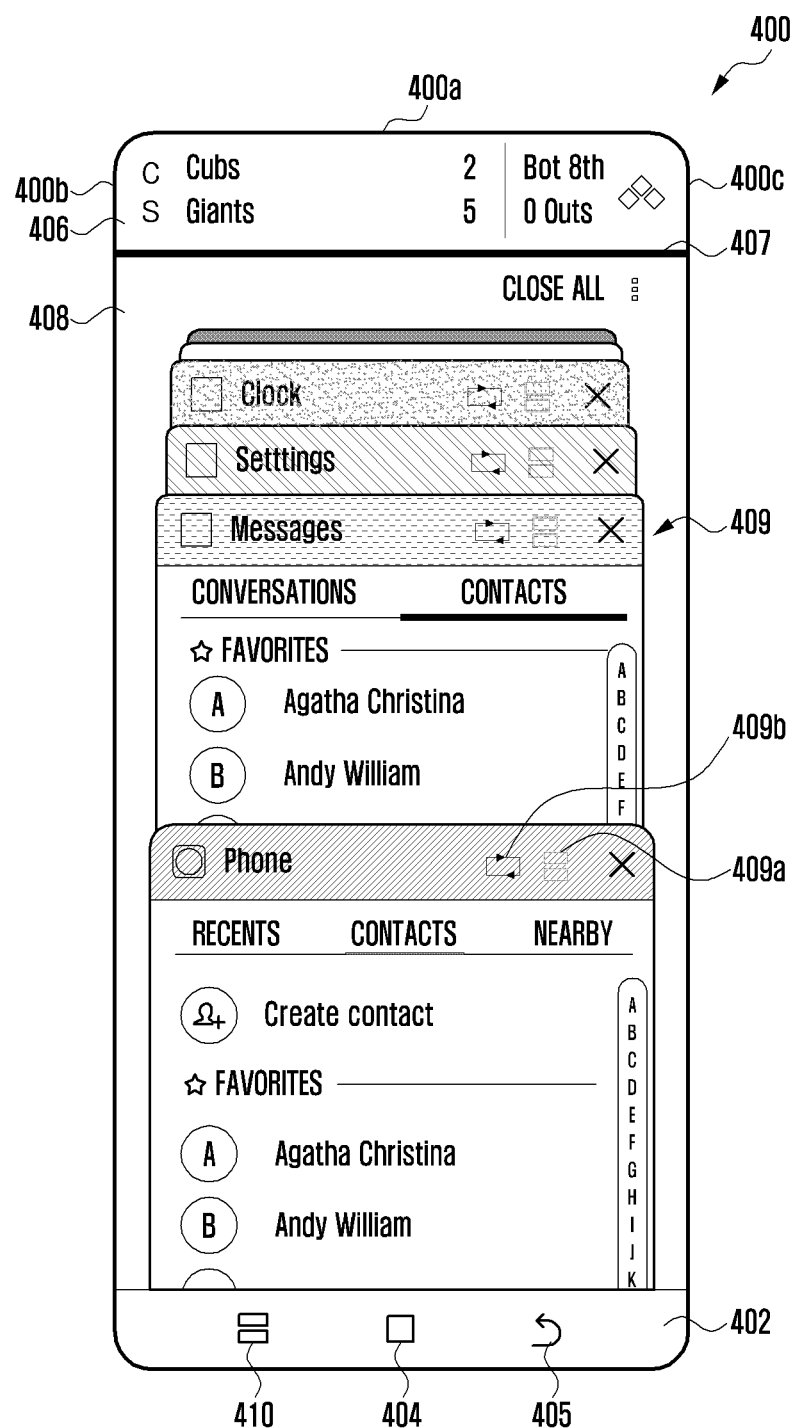

With reference to FIG. 4C, the electronic device may divide the single-window 401 into a first window 406 and a second window 408, and may continue to display at least a portion of the user interface displayed in the single-window 401 through the first window 406 and provide another user interface through the second window 408.

The size of the first window 406 may be determined based on the size or internal configuration of the box 411. The first window 406 is configured as a snap window and may be located at the upper portion of the display 400. For example, the first window 406 may touch the upper side 400a of the display 400, a portion of the left side 400b, and a portion of the right side 400c, but the position of the first window 406 may be changed. The second window 408 may be disposed at the upper portion of the display 401, and therebeneath the first window 406 may be disposed adjacent to the soft-key panel 402.

The electronic device may change the portion to be displayed in the first window 406 in response to user input. For example, when a user input such as dragging or scrolling within the first window 406 occurs while a portion of the user interface is being displayed through the first window 406, a different portion of the user interface may be provided through the first window 406.

The electronic device may display an application list 409 of running applications through the second window 408. The user can easily perform application switching through the application list 409. For example, when the user selects one application item of the application list 409, the display of the application list 409 may be terminated and the screen of the selected application may be displayed through the second window 408.

The electronic device may display a split bar 407 at the boundary between windows so that the user can readily recognize that the screen has been split. The size of the first window 406 may be determined according to user input, and the size of the second window 408 may be determined in inverse proportion to the size of the first window 406. For example, the electronic device can adjust the size of the first window 406 and the second window 408 by changing the position of the split bar 407 in response to a user input. The shape of the application list 409 may be changed, such as into a short-cut type or page type, in accordance with the size of the second window 408. Alternatively, the position of the split bar 407 may not be changed and the size of the first window 406 may be fixed.

In one embodiment, when the window mode is changed from the single mode to the multi-mode, the electronic device may provide the multi-window key 410 instead of the multitasking key 403, through the soft-key panel 402. When the multi-window key 410 is selected, the electronic device may change the window mode to the single mode and display the multitasking key 403 again instead of the multi-window key 410.

In the application list 409, each application item may include the name of the corresponding application, such as clock, settings, messages, or Internet, a multi-window indicator 409a indicating that the screen of the corresponding application is available through one of the multiple windows, a snap window indicator 409b indicating that the screen of the corresponding application is available through the snap window, and a captured image of the corresponding application. When a multi-window is provided (i.e. the first window 406 and the second window 408 are provided), the multi-window indicator of each application item may be deactivated.

Figure 4D:
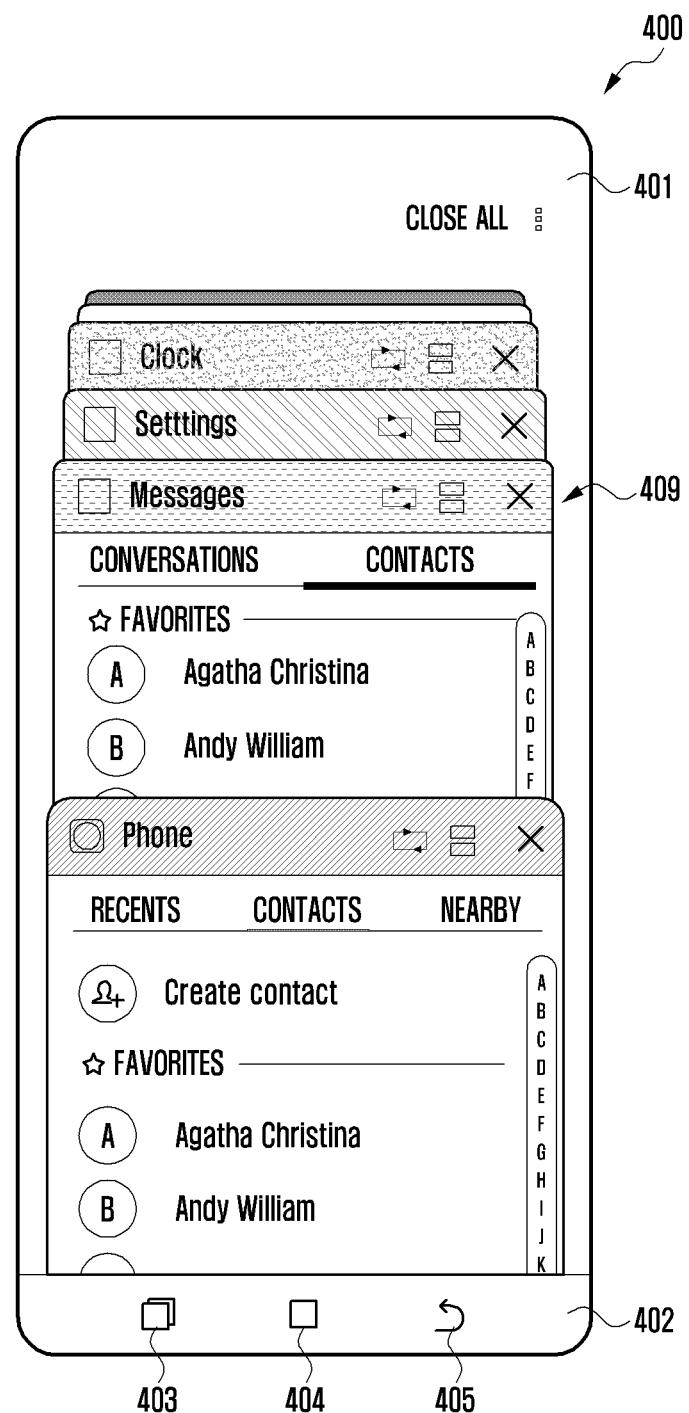

With reference to FIGS. 4A and 4D, the electronic device may provide the application list 409 via the single-window 401 in response to a second input of the user to the multitasking key 403. When the user selects one application from the application list, the display of the list via the single-window 401 may be terminated and the screen of the selected application can be provided through the single-window 401. The electronic device may provide the application list 409 via the single-window 401 as shown in FIG. 4D according to user input, such as a long press, to the first window 406 as shown in FIG. 4C.

Figure 4E:
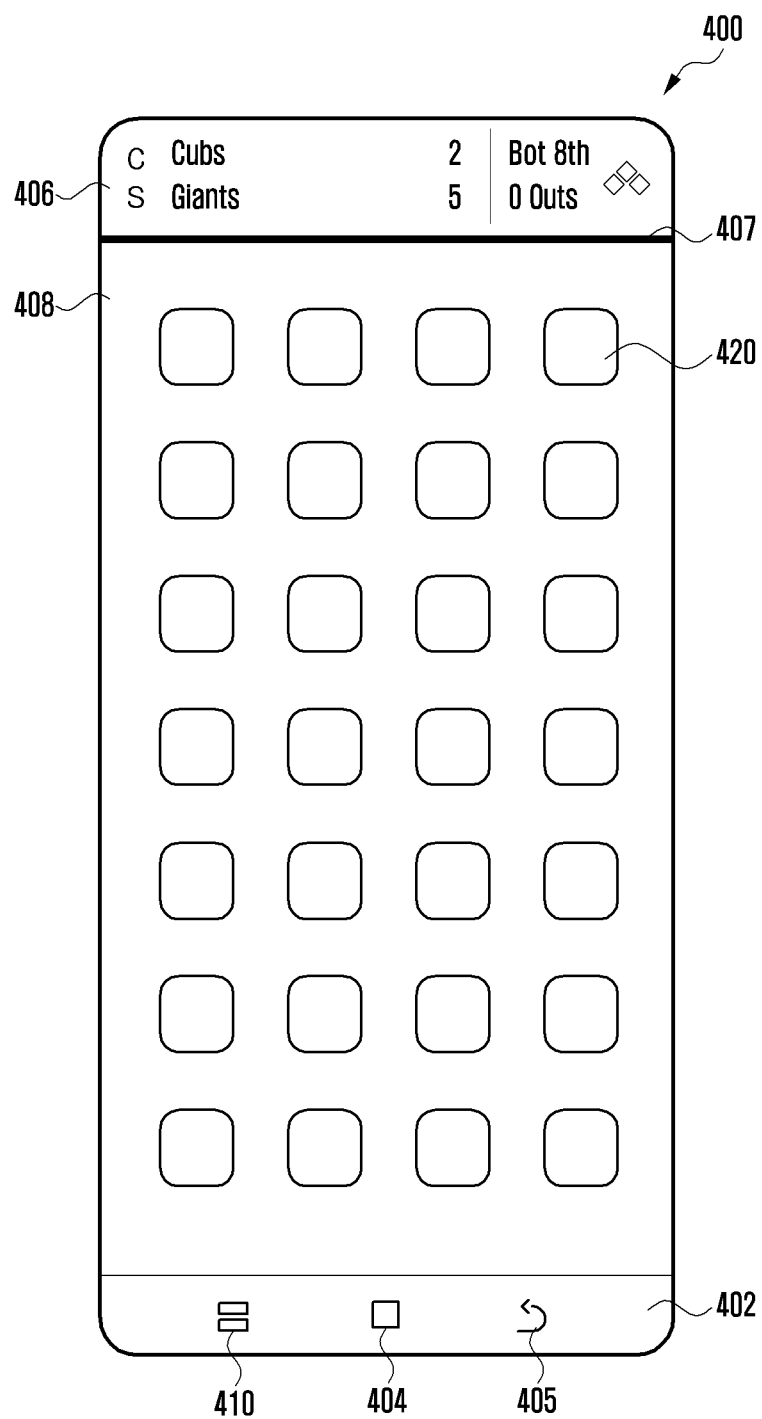

With reference to FIG. 4E, each item of the application list is provided in the form of a card as shown in FIGS. 4C and 4D, but the present disclosure is not limited thereto. For example, as shown in FIG. 4E, each item 420 of the application list may be displayed as an icon in the second window 408. Each icon can represent an application running on the electronic device or an executable (or installed) application.

In embodiments, the electronic device may provide a snap window through the display in response to user input. The electronic device may include a pressure sensor on at least a portion of the display 400 or the soft-key panel 402. The user input may include a force touch based on the strength of the touch input sensed by the pressure sensor.

Figure 5:
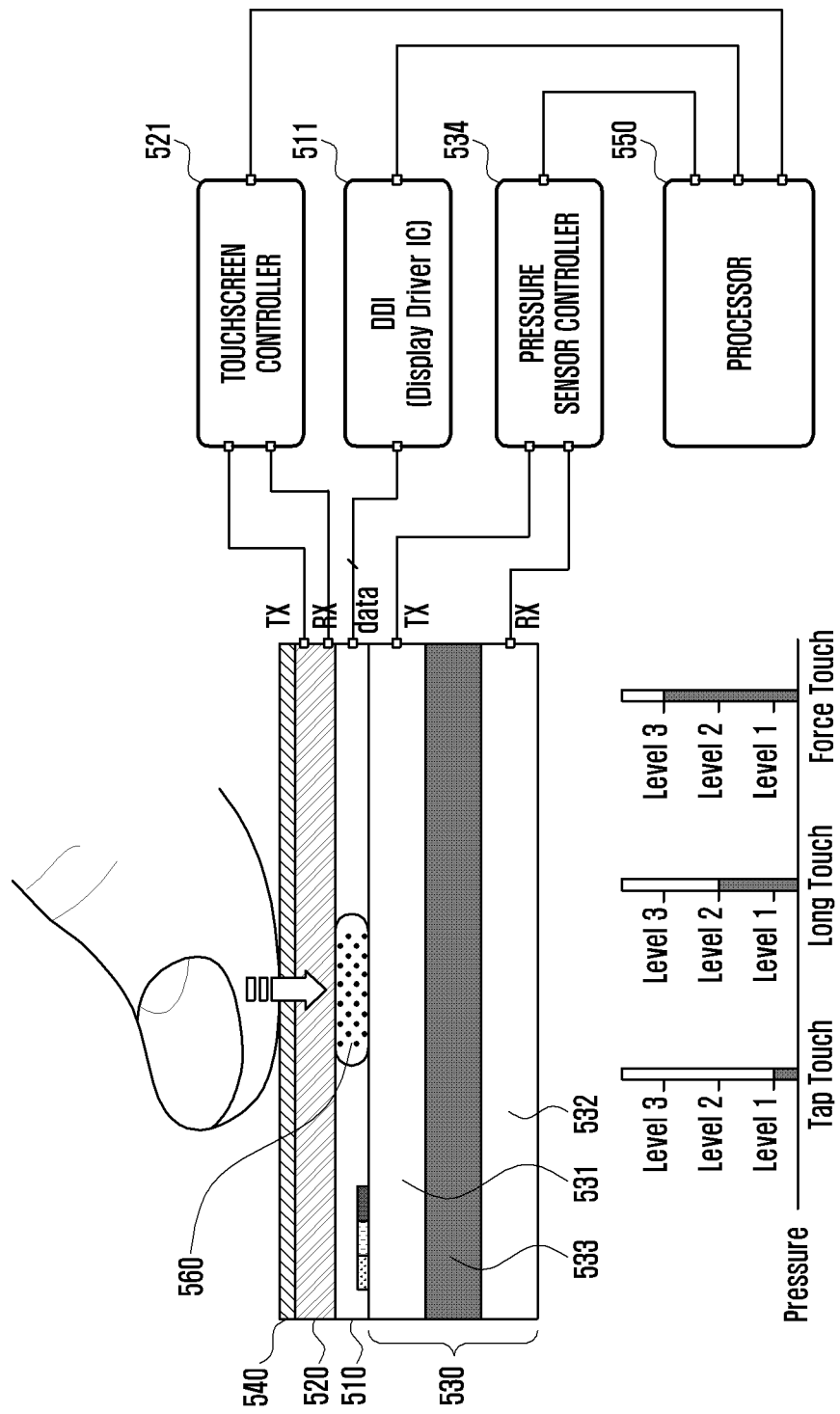
FIG. 5 illustrates the electrical blocks of the electronic device according to embodiments of the present disclosure.

FIG. 5 illustrates the electrical blocks of the electronic device according to embodiments of the present disclosure.

In one embodiment, the electronic device may include all or some of the components of the electronic device 101 of FIG. 1 or the electronic device 201 of FIG. 2.

With reference to FIG. 5, in the electronic device, a touchscreen panel 520 is located on the front of the display 510 and a pressure sensor 530 is located on the back of the display 510. The touchscreen panel 520 may be protected by a cover 540. The pressure sensor 530 may include a first pressure electrode layer 531, a second pressure electrode layer 532, and an insulating layer 533 interposed between the pressure electrode layers.

The touchscreen panel 520 may be electrically connected to the processor 550 through the touchscreen controller 521. The display 510 may be electrically connected to the processor 550 through the display driver IC (DDI) 511. The pressure sensor 530 may be electrically connected to the processor 550 through the pressure sensor controller 534.

The touchscreen panel 520 may be configured to have the same size as the display 510, and may generate an electrical signal in response to user touch input and output the signal to the processor 550 via the touchscreen controller 521. The touchscreen panel 520 may be a capacitive type. For a capacitive touchscreen panel, the reception (Rx) lines for receiving a control signal from the DDI 511 and the transmission (Tx) lines for outputting an electrical signal to the DDI 511 in response to touch input may be arranged on the single layer of the panel.

The DDI 511 may receive information on the aspect ratio from the processor 550, compose a screen based on the received information, and display the screen on the display 510. For example, the DDI 511 may use the data received from the processor 550 to compose a screen including a single-window and a soft-key panel as shown in FIG. 4A or a screen including a multi-window and a soft-key panel as shown in FIG. 4C.

In the pressure sensor 530, the gap between the first electrode layer 531 and the second electrode layer 532 can be changed by touch pressure. The pressure sensor 530 may generate an electrical signal corresponding to the gap change and transmit the signal to the processor 550 via the pressure sensor controller 534.

The processor 550 may obtain information about the touch input to the content 560 displayed on the display 510, such as a touch point or touch area, based on a signal received via the touchscreen controller, may obtain pressure (or force) information based on a signal received from the pressure sensor controller 534, and may recognize user input by using the pressure information and touch information. For example, if the obtained pressure information indicates a first level, the processor 550 may recognize the user input as a tap, if it indicates a second level, the processor 550 may recognize the user input as a long touch, and if it indicates a third level, the processor 550 may recognize the user input as a force touch.

Figure 6:
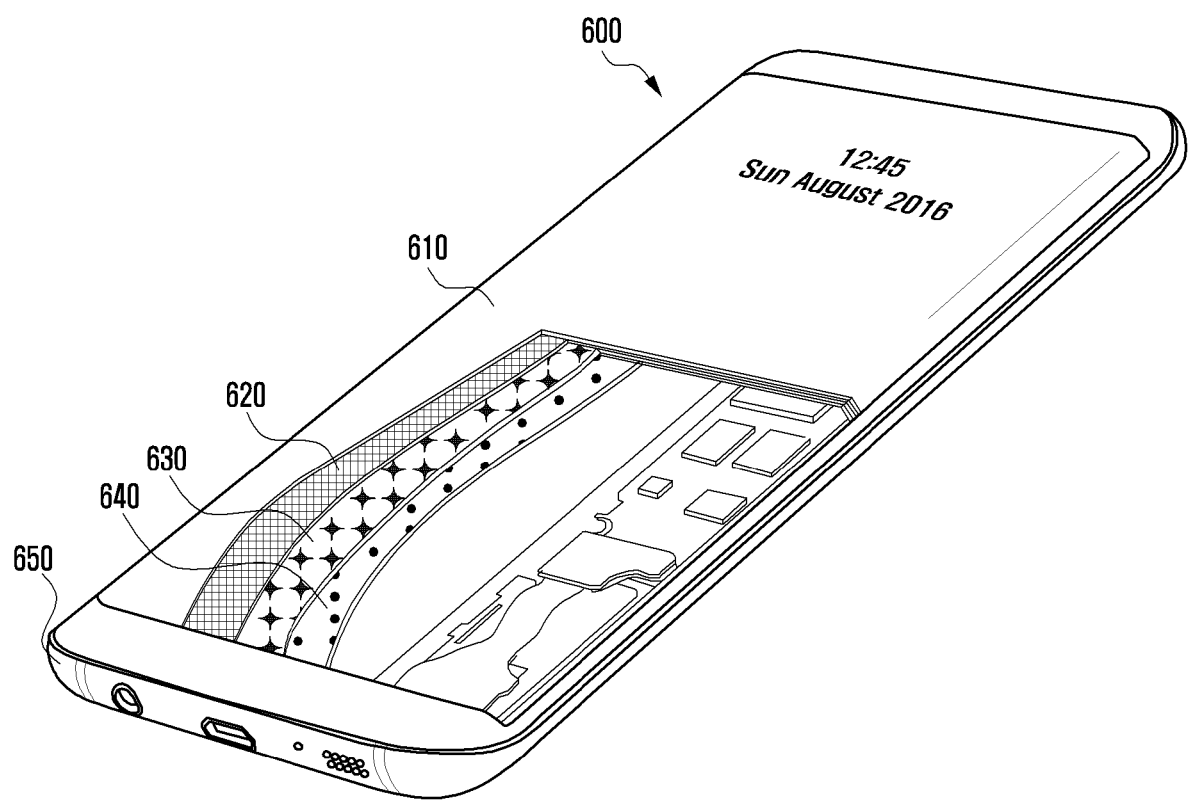
FIG. 6 is a partially cutaway front view of the electronic device according to embodiments of the present disclosure.

FIG. 6 is a partially cutaway front view of the electronic device according to embodiments of the present disclosure.

In one embodiment, the electronic device 600 may include all or some of the components of the electronic device 101 of FIG. 1 or the electronic device 201 of FIG. 2.

With reference to FIG. 6, in the electronic device 600, the cover 610 may constitute the front face of the electronic device 600. The touchscreen panel 620, the display 630 and the pressure sensor 640 can be located under the cover 610 and inside the frame 650. The display 630 may be located under the touchscreen panel 620. The pressure sensor 640 may be located under the display 630 and may be configured to have the same size as the display 630 to sense pressure in the entire area of the display 630. In addition, a digitizer panel or other input panel may be located below or above the pressure sensor 640.

Figure 7:
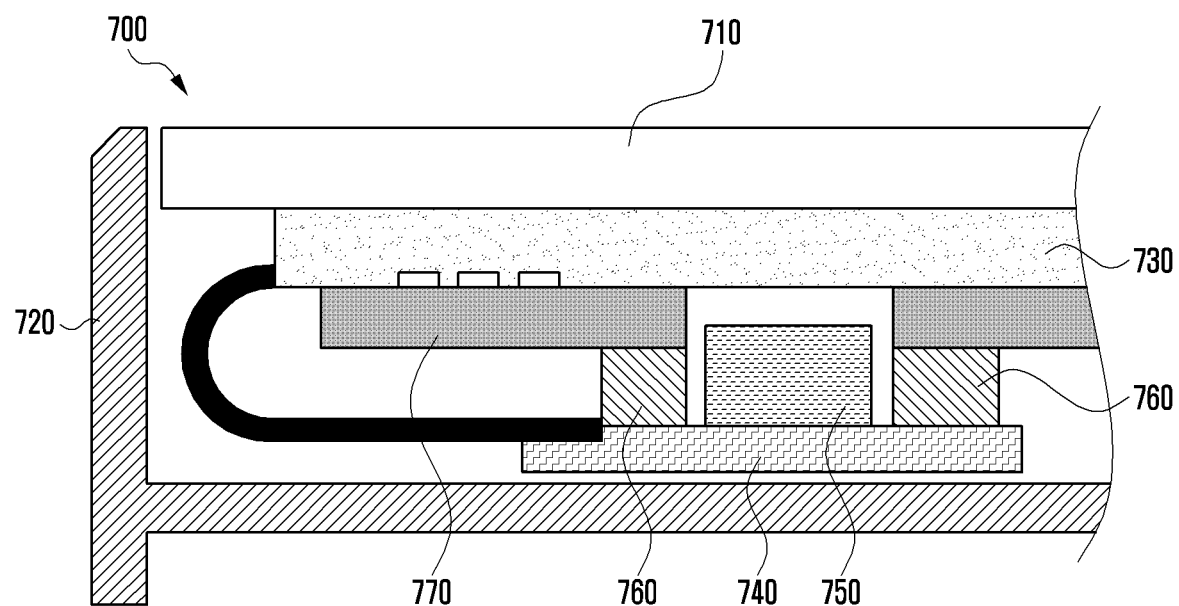
FIG. 7 is a partial schematic cross section view of the electronic device according to embodiments of the present disclosure.

FIG. 7 is a partial schematic cross section view of the electronic device according to embodiments of the present disclosure.

In one embodiment, the electronic device 700 may include all or some of the components of the electronic device 101 of FIG. 1 or the electronic device 201 of FIG. 2.

With reference to FIG. 7, the cover 710 may constitute the front face of the electronic device 700. The display panel 730 (e.g. display 630 of FIG. 6) including a display and a touchscreen panel (e.g. touch screen panel 620 of FIG. 6) may be located under the cover 710 and inside the frame 720. The flexible printed circuit board (FPCB) 740 is located under and electrically connected to the display panel 730. The fingerprint sensor 750 is mounted on the FPCB 740 and can detect a fingerprint being in contact with a portion of the cover 710, and may be designed based on an optical mechanism. The pressure sensor 760 is mounted on the FPCB 740 and is capable of sensing pressure at a portion of the cover 710.

Additionally, a cushion 770 for cushioning the pressure can be interposed between the display panel 730 and the pressure sensor 760. The portion of the cover 710 may correspond to a portion of the display panel 730 that displays soft keys, such as a home key, cancel key, back key, multitasking key, and multi-window key, and may act as a touch sensitive button.

When pressure is sensed through a touch sensitive button, the processor (e.g. processor 550 of FIG. 5) of the electronic device 700 may change the state of the electronic device 700 from the sleep state to the idle state, in which the electronic device 700 can perform user authentication using a fingerprint detected through the touch sensitive button.

Figure 8:
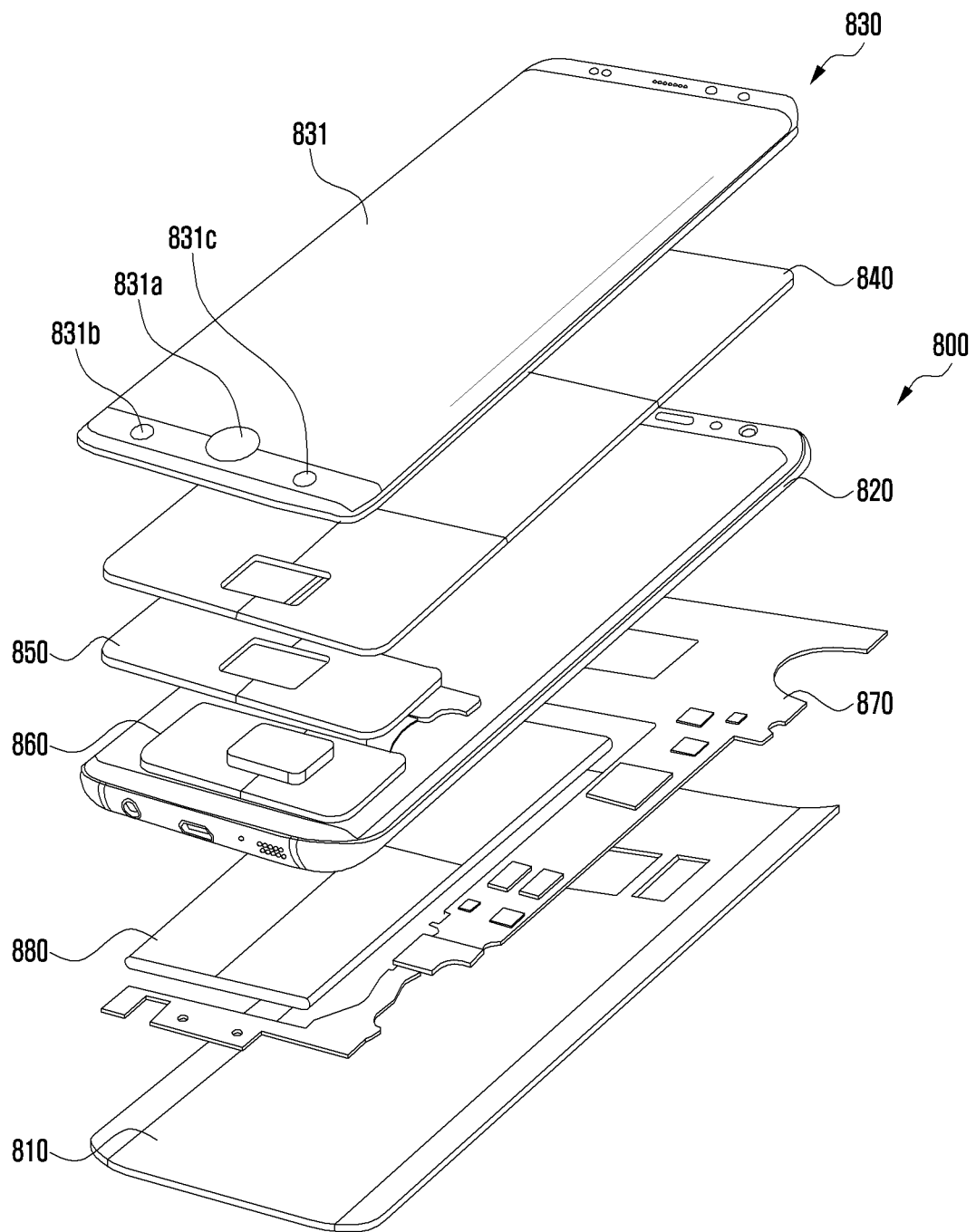
FIG. 8 is an exploded view of an electronic device according to embodiments of the present disclosure.

FIG. 8 is an exploded view of an electronic device according to embodiments of the present disclosure.

In one embodiment, the electronic device 800 may include all or some of the components of the electronic device 101 of FIG. 1 or the electronic device 201 of FIG. 2.

With reference to FIG. 8, the electronic device 800 may include various electronic components having a protective housing including a first surface in a first direction, a second surface in a second direction substantially opposite to the first direction, and a frame 820 enclosing at least a portion of the space between the first surface and the second surface.

The display panel 830, digitizer panel 840, pressure panel 850, fingerprint sensor 860, substrate 870, and battery 880 may be located in the internal space of the housing. The display panel 830 may include the front cover 831 constituting the first surface, the touchscreen panel, and the display. The fingerprint sensor 860 is electrically connected to the substrate 870, and may recognize a fingerprint contact on a portion of the first surface, such as soft-key 831*a* presented by the display, generate fingerprint data and output the same to the processor mounted on the substrate 870.

The pressure panel 850 is electrically connected to the substrate 870, and may recognize pressure occurring at a portion of the first surface, such as soft keys 831*a*, 832*b* and 832*c*, generate pressure data, and output the same to the processor. The rear cover 810 may constitute the second surface.

Figure 9:
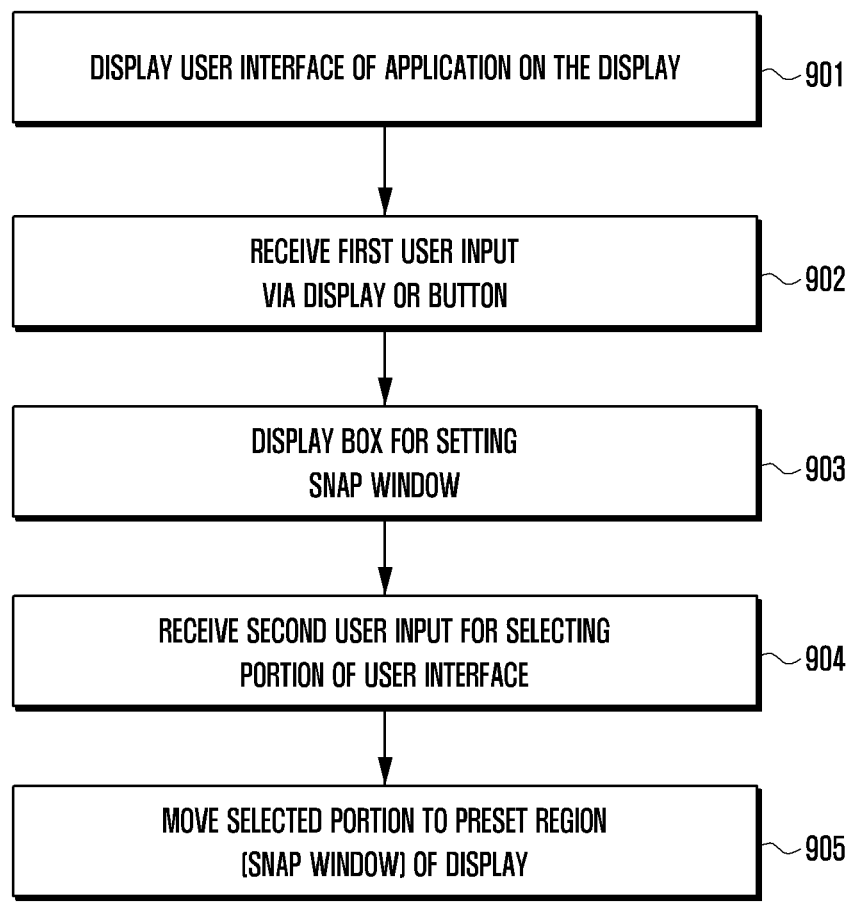
FIG. 9 illustrates operations of the electronic device according to embodiments of the present disclosure.

FIG. 9 illustrates operations of the electronic device according to embodiments of the present disclosure.

In one embodiment, the electronic device may include all or some of the components of the electronic device 101 of FIG. 1 or the electronic device 201 of FIG. 2.

With reference to FIG. 9, in step 901, the processor (e.g. processor 120 of FIG. 1) of the electronic device may display the user interface of an application on the display (e.g. display 160). For example, the aspect ratio of the display may be within a range of 16:9 to 22:9.

In step 902, while displaying the user interface, the processor may receive a first user input (force touch or touch input) through the display or a button, such as a touch sensitive button positioned close to the lower end of the display.

In step 903, in response to the first user input, the processor may display a window (box) for setting a snap window on the user interface. In one embodiment, the box may be displayed if the application has attributes supporting a multi-window. For an application not supporting a multi-window, the processor may not respond to the first user input. In addition to the box, a handler may also be displayed on the user interface to enable the user to adjust the size and position of the box. The processor may change the size and position of the box in response to user manipulation of the handler, and may move the box along the direction of a touch gesture, such as a flick or drag initiated within the box.

In step 904, the processor may receive a second user input for selecting a portion of the user interface through the display.

In step 905, in response to the second user input, the processor may move the selected portion displayed within the box to a designated or pre-selected region (i.e. snap window) of the display. The display area outside the snap window can be used to display the user interface of another application.

FIGS. 10A, 10B, 10C and 10D illustrate operations of the electronic device to provide a snap window via the display in a multi-window mode according to embodiments of the present disclosure.

In one embodiment, the electronic device may include all or some of the components of the electronic device 101 of FIG. 1 or the electronic device 201 of FIG. 2.

Figure 10A:
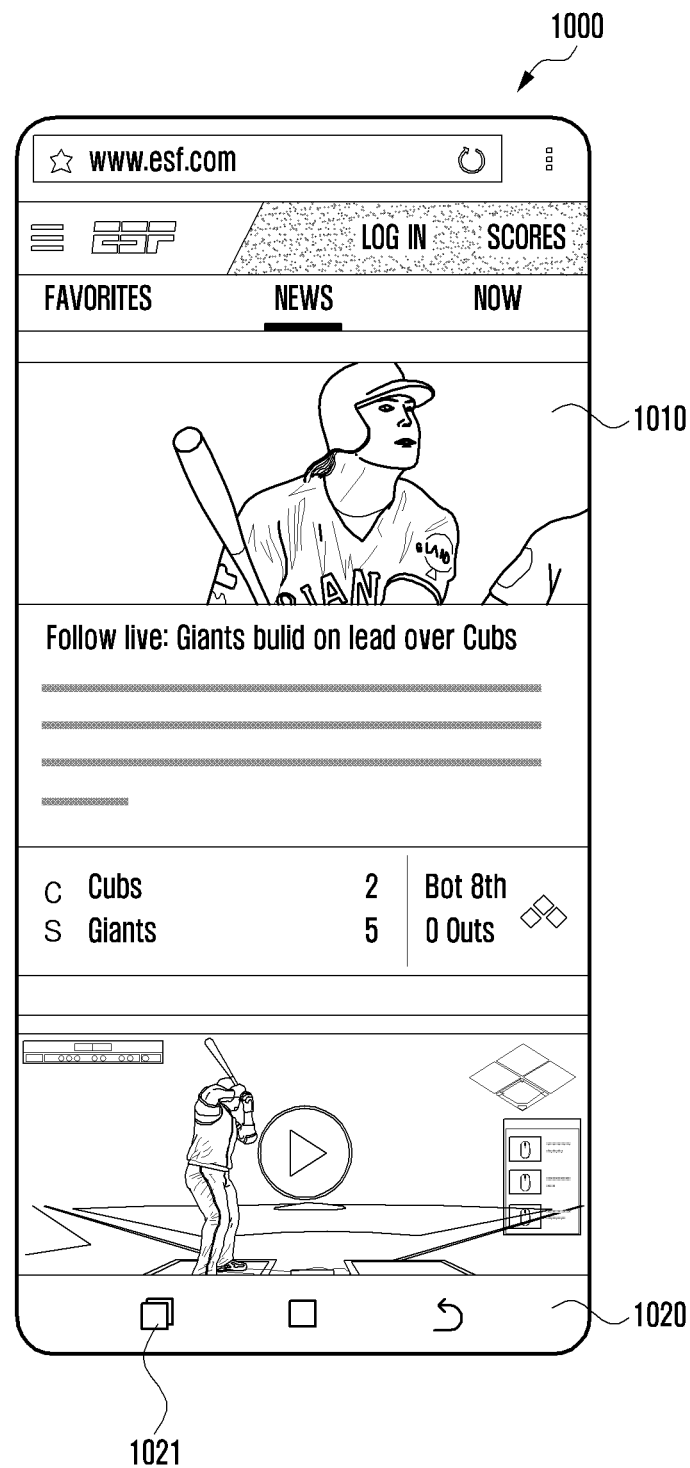
FIGS. 10A, 10B, 10C and 10D illustrate operations of the electronic device to provide a snap window via the display in a multi-window mode according to embodiments of the present disclosure.

With reference to FIG. 10A, the processor (e.g. processor 120 of FIG. 1) of the electronic device may provide the screen of an application via the single-window 1010 being a portion of the display 1000, and provide various soft keys, such as multitasking key 1021, via the soft-key panel 1020 on another portion of the display 1000.

Figure 10B:
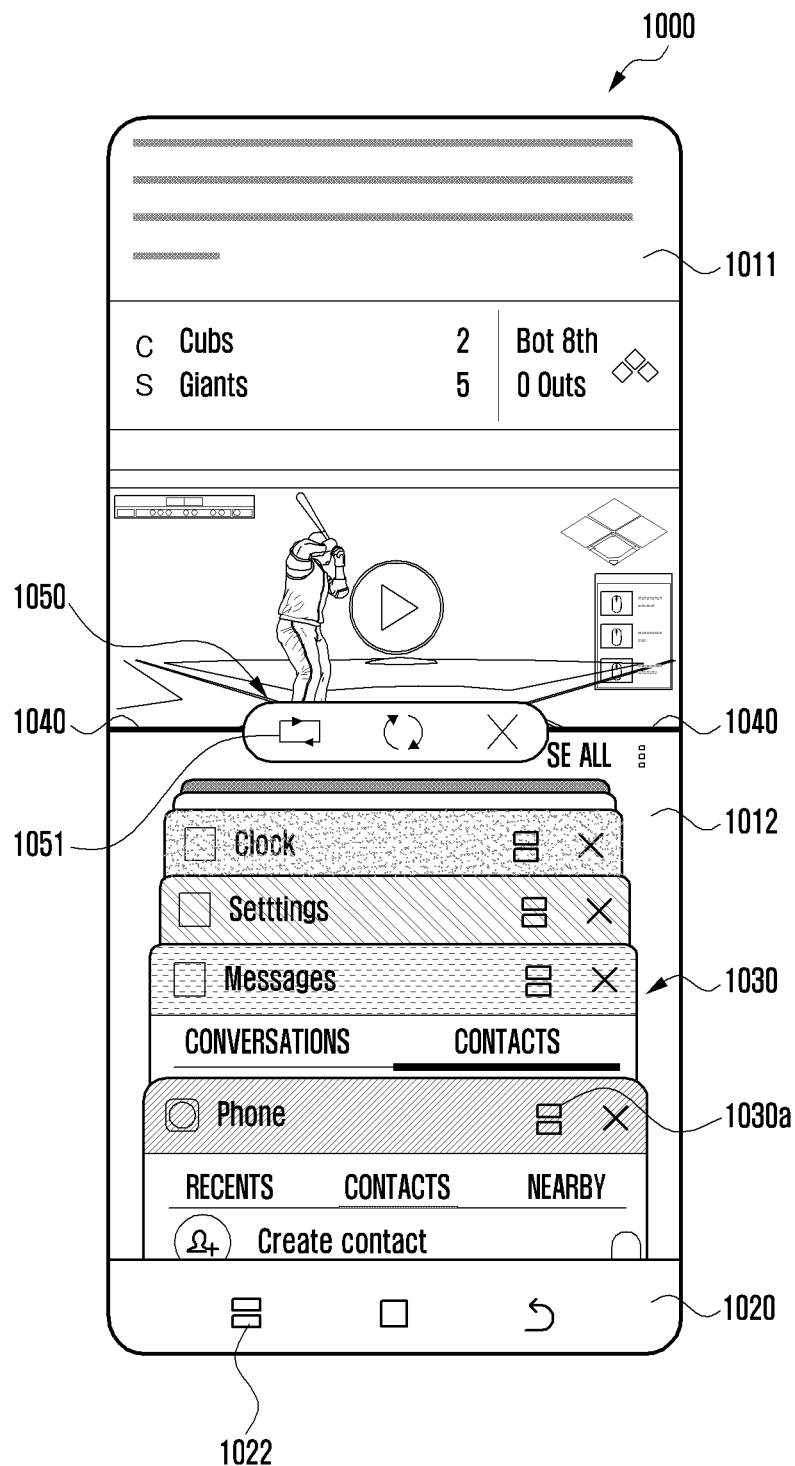

With reference to FIG. 10B, when the multitasking key 1021 of the soft-key panel 1020 is selected by the user, the processor may divide the single-window 1010 (FIG. 10A) into a first window 1011 and a second window 1012, and may continue to display the application screen through the first window 1011 and provide an application list 1030 through the second window 1012. The split bar 1040 may be positioned at the boundary between the windows and displayed in conjunction with the first selection object 1050.

In the application list 1030, each application item may include the name of the corresponding application (e.g. clock, settings, messages, and phone), a multi-window indicator 1030a, and a captured image of the corresponding application. In addition, when the window mode is changed from the single mode to the multi-mode, the multi-window key 1022 may be provided through the soft-key panel 1020 instead of the multitasking key 1021.

Figure 10C:
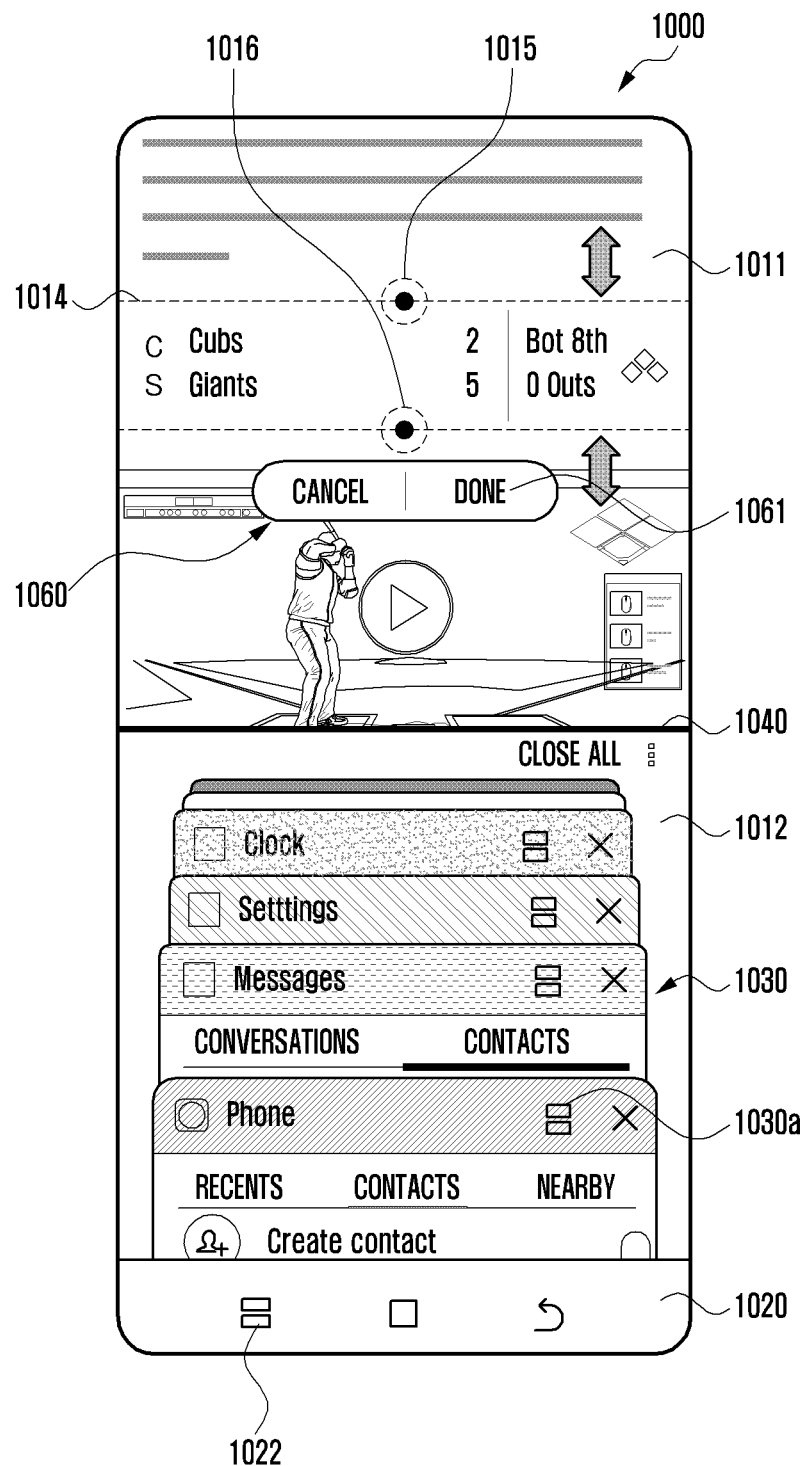

With reference to FIG. 10C, when the snap window button 1051 of the first selection object 1050 (FIG. 10B) is selected by the user, the processor (e.g. processor 120 of FIG. 1) may display a box 1014 with a preset aspect ratio, such as 16:9, in the first window 1011 and terminate display of the first selected object 1050.

The processor may display rounded handlers 1015 and 1016 at the top and bottom of the box 1014 as a tool that enables the user to adjust the size of the box 1014. The size (vertical length) of the box 1014 can be adjusted by varying the position of the handlers 1015 and 1016. For example, in response to a multi-touch gesture, such as narrowing or widening the gap between the thumb and the forefinger simultaneously contacting the handlers, or a single touch gesture, such as moving the finger up or down while touching one of the handlers 1015 and 1016, the processor may change the size of the box 1014 by simultaneously moving the handlers 1015 and 1016 up and down, respectively.

As another example, in response to a single touch gesture on the handler 1015 or 1016, the processor may change the size of the box 1014 by separately moving the handlers up and down. In addition, to adjust the horizontal length of the box 1014, handlers may be displayed on the left and right of the box 1014. The processor may move the box 1014 along the direction of a touch gesture, such as a flick or drag initiated within the box 1014.

Figure 10D:
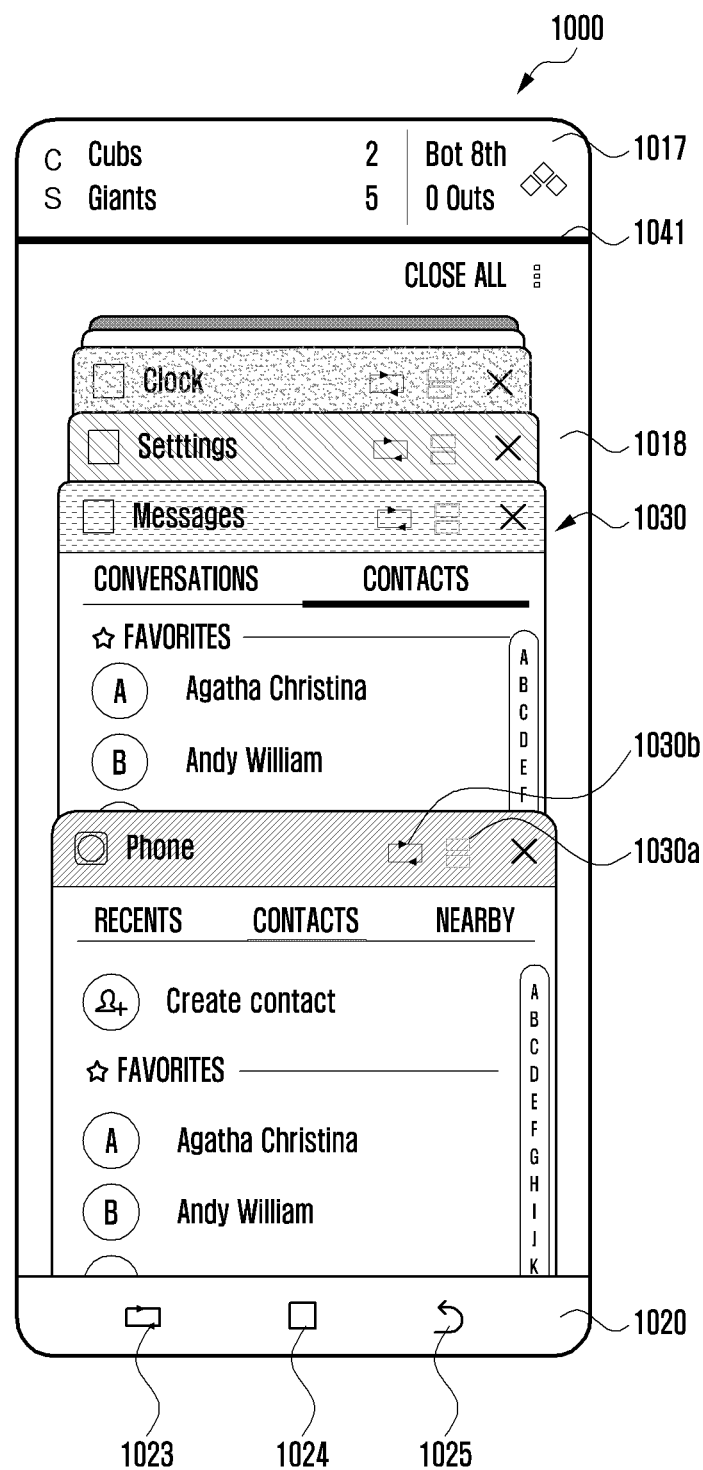

With reference to FIG. 10D, when the done button 1061 of the second selection object 1060 is selected by the user, the processor may adjust the size (vertical length) of the first window 1017 according to the size of the box 1014 and configure the first window 1017 as a snap window. At this time, a snap window indicator 1030b may be added to each item in the application list 1030, and the multi-window indicator of each application item may be deactivated. For example, the multi-window indicator may be blurred or displayed in a different color than prior to the configuration. As the first window 1017 is configured as the snap window, a snap window key 1023 may be provided via the soft-key panel 1020 instead of the multi-window key 1022.

Configuring the first window 1017 as the snap window may indicate that the position of the first window 1017 is fixed at the upper end of the display 1000 and the size thereof is fixed without change. Hence, when the first window 1017 is configured as the snap window, the window size adjustment function using the split bar 1041 can be deactivated. The content, such as a scoreboard, that was displayed in the box 1014 immediately prior to selection of the done button 1061 may be continuously displayed in the first window 1017, and the view area of the content to be displayed through the snap window may be changed by a first touch gesture of the user, such as dragging up/down within the first window 1017.

The above configuration may be reset by a second touch gesture, such as a long press, in the first window 1017. For example, when the configuration is reset, the size adjustment function of the first window 1017 and the second window 1018 using the split bar 1041 can be activated. The above configuration may also be reset by a touch input to the snap window key 1023 provided through the soft-key panel 1020. When a touch input to the cancel key 1025 is generated while the first window 1017 and the second window 1018 are being displayed, the above configuration may be reset and the previous screen (i.e., the screen of FIG. 10C) may be displayed. When a touch input to the home key 1023 is generated, the above configuration may be reset, and the window mode may be changed from the multi-mode mode to the single mode, so that the home screen may be displayed through the single-window.

Figure 11A:
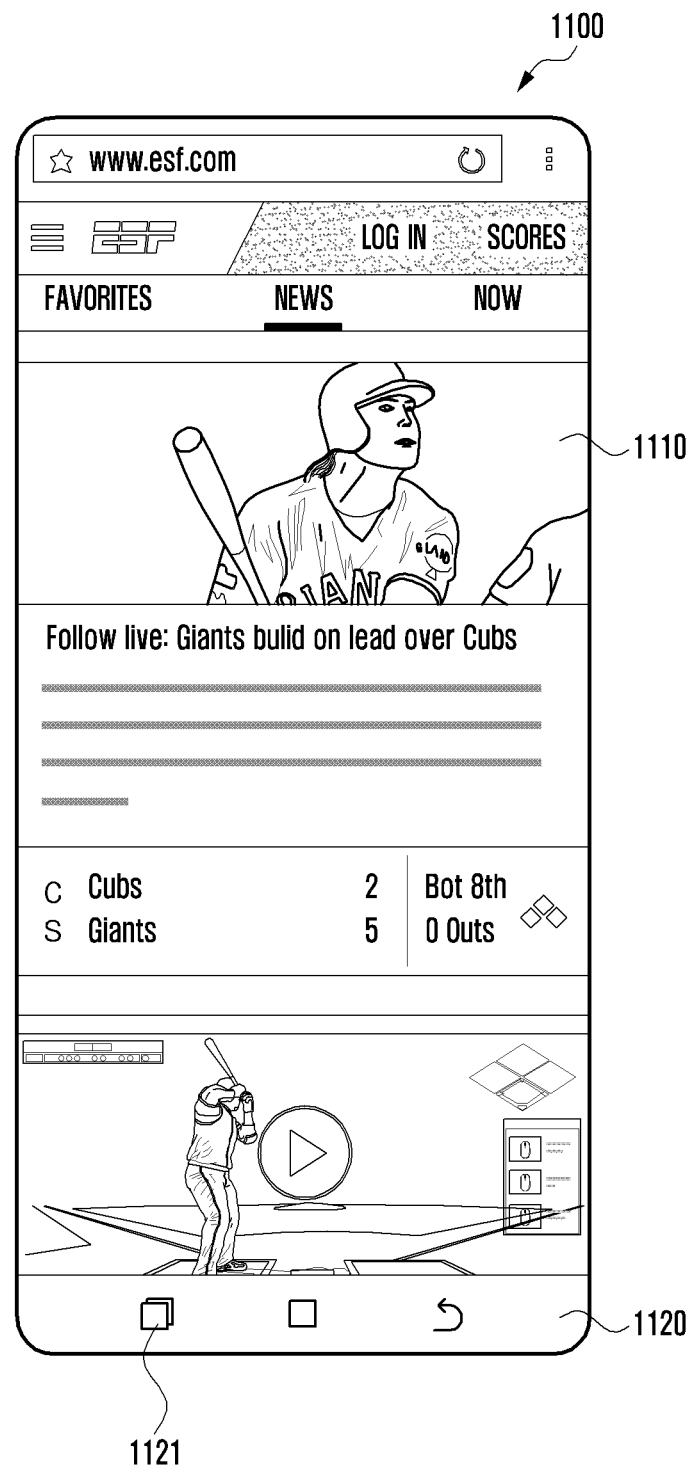
FIGS. 11A, 11B and 11C illustrate operations of the electronic device to provide a snap window via the display in a single-window mode according to embodiments of the present disclosure.
Figure 11B:
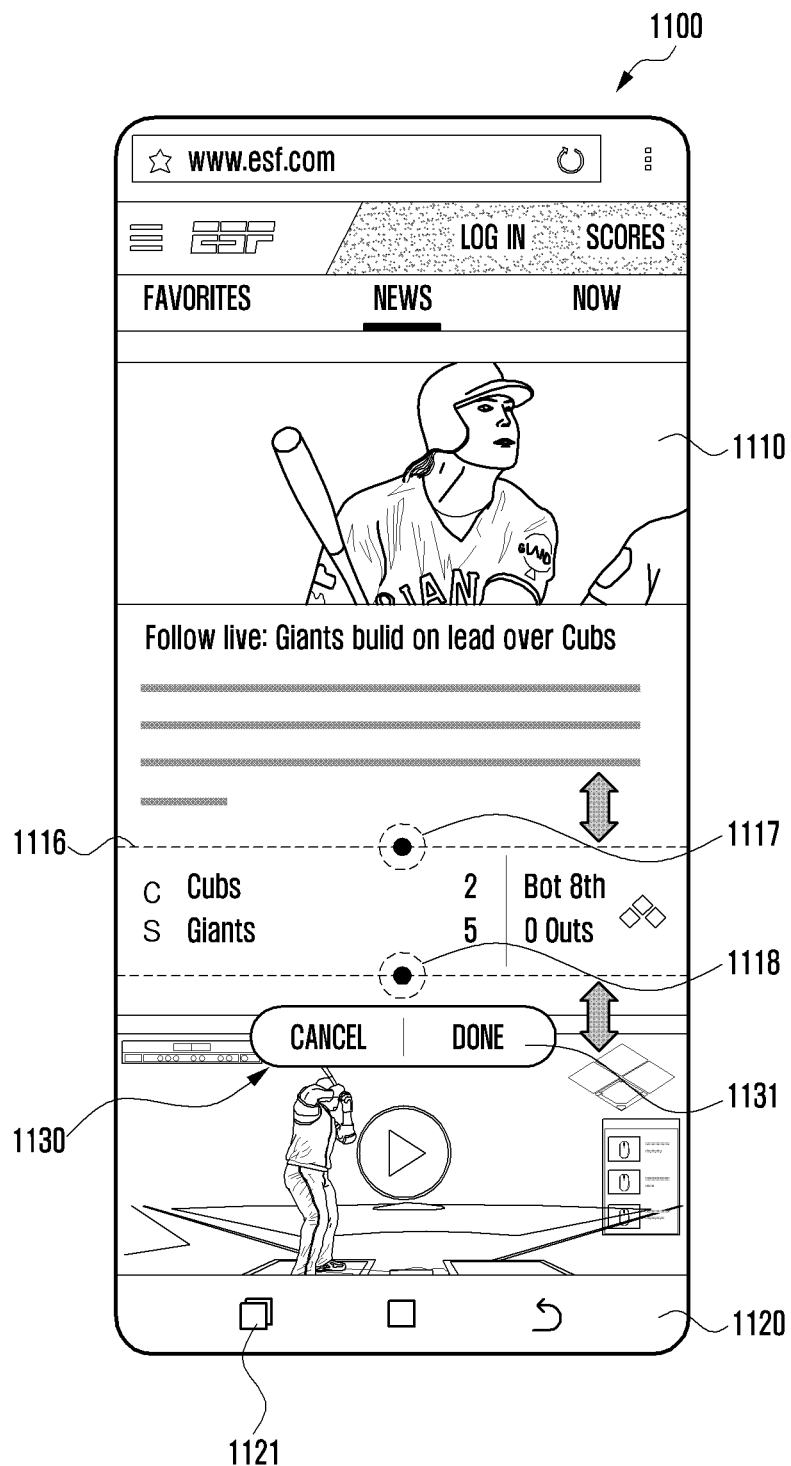
Figure 11C:
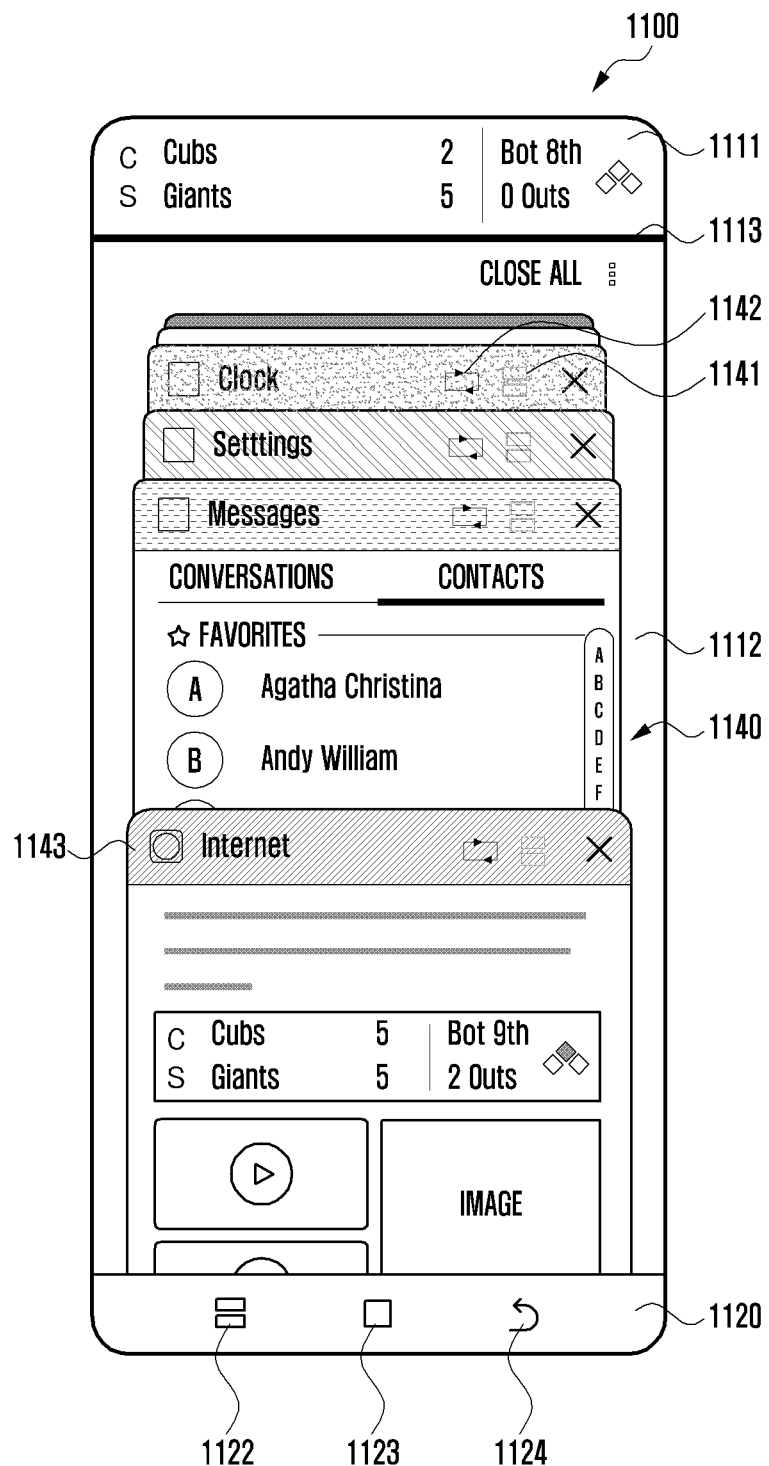

FIGS. 11A, 11B and 11C illustrate operations of the electronic device to provide a snap window via the display in a single-window mode according to embodiments of the present disclosure.

In one embodiment, the electronic device may include all or some of the components of the electronic device 101 of FIG. 1 or the electronic device 201 of FIG. 2.

With reference to FIG. 11A, the processor (e.g. processor 120 of FIG. 1) of the electronic device may divide the display area of the display 1100 into a single-window 1110 and a soft-key panel 1120. A web page may be displayed in the single-window 1110. The multitasking key 1121 may be displayed on the soft-key panel 1120 and the user may enter a touch input, such as a long press, multi-touch, or force touch, to the multitasking key 1121.

With reference to FIG. 11B, the processor may display the box 1116 of a preset size in the single-window 1110 in response to a touch input to the multitasking key 1121. The processor may also display handlers 1117 and 1118 for enabling the user to adjust the area of the box 1116 up and down at the upper end and lower end of the box 1106. When the up/down adjustment operation is completed, the processor may display the selection object 1130 adjacent to the box 1116, such as from the beginning along with the box 1116 in response to a touch input to the multitasking key 1121. The selection object 1130 may be hidden while the size of the box 1116 is being adjusted and be re-displayed when the size adjustment of the box 1116 is completed.

With reference to FIG. 11C, when the done button 1131 is selected by the user in the selection object 1130, the first window 1111 set as the snap window may be provided on the display 1100. For example, the processor may divide the single-window 1110 into a first window 1111 and a second window 1112, and may continue to display at least a portion of the web page through the first window 1111 set as the snap window and display the application list 1140 through the second window 1112. The first window 1111 and the second window 1112 can be separated by the split bar 1113 and the movement of the split bar 1113 (i.e. window size adjustment) can be deactivated.

In the application list 1140, each application item may include the name of the corresponding application, a multi-window indicator 1141, a snap window indicator 1142, and a captured image of the corresponding application.

When a multi-window is provided, the multi-window indicator 1141 of each application item may be deactivated. To notify the user of deactivation, the processor may display the multi-window indicator 1141 in a blurrier form than the snap window indicator 1142, as shown. In some cases, the multi-window indicator may not be displayed. In the Internet item 1143 among the items of the application list 1140, since the corresponding application screen is provided through the snap window 1111, the snap window indicator 1142 of the application may be deactivated. If one window of the multi-window is set as a snap window, a multi-window key 1122 indicating that the screen is split may be provided through the soft-key panel 1120 instead of the multitasking key 1121. Instead of the multi-window key 1122, a snap window key may be provided through the soft-key panel 1120.

When a touch input to the cancel key 1125 is generated while the first window 1111 set as the snap window and the second window 1112 are provided through the display 1100, the multi-window mode is canceled and the previous window (i.e., the screen of FIG. 11B) can be displayed. When a touch input to the home key 1124 is generated, the multi-window mode is canceled and the home screen can be displayed through the single-window.

While a portion of a web page is displayed through the first window 1111 set as the snap window and the application list 1140 is displayed through the second window 1112, when the snap window indicator of an item is selected from the application list 1140, the display of the application list 1140 may be terminated and the messages application screen may be displayed through the second window 1112. In addition, the box for setting a snap window can be displayed through the second window 1112. When the setting of the snap window using the box is completed, a portion of the messages application screen may be displayed in the first window 1111 instead of the web page and the application list 1140 may be re-displayed in the second window 1111.

While a portion of the web page is displayed through the first window 1111 set as the snap window and the application list 1140 is displayed through the second window 1112, when the snap window indicator of an item is selected from the application list 1140, the multi-window mode may be cancelled and the messages application screen and the box may be displayed through the single-window. When the setting of the snap window using the box is completed, the single-window mode may be switched to the multi-window mode, a portion of the messages application screen may be displayed through the first window 1111 and the application list 1140 may be displayed through the second window 1112.

Figure 12A:
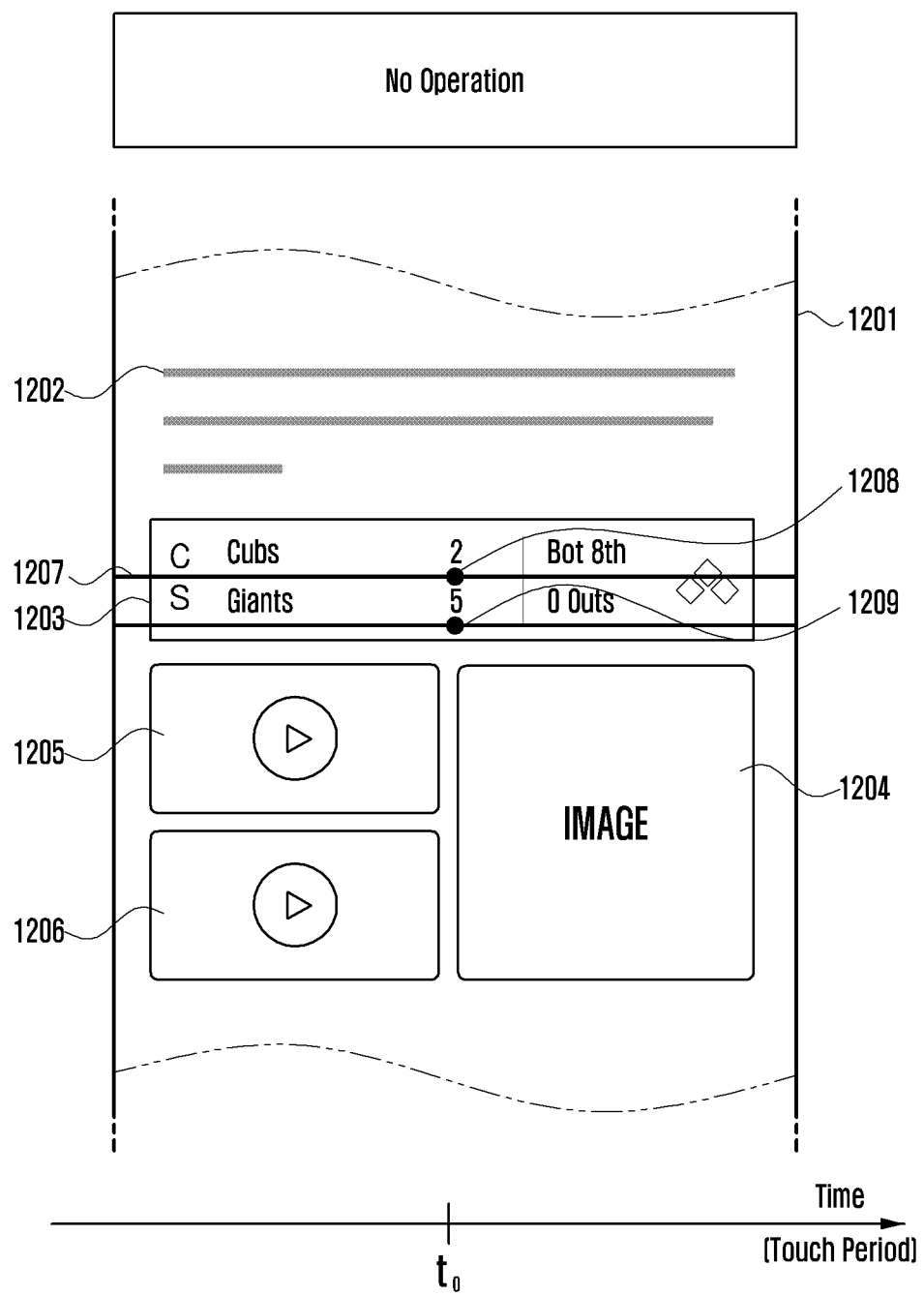
FIGS. 12A, 12B and 12C illustrate operations of the electronic device to set a box based on a touch input and to compose a snap window based on the content located inside the box (touch-based in-range arrangement) according to embodiments of the present disclosure.
Figure 12B:
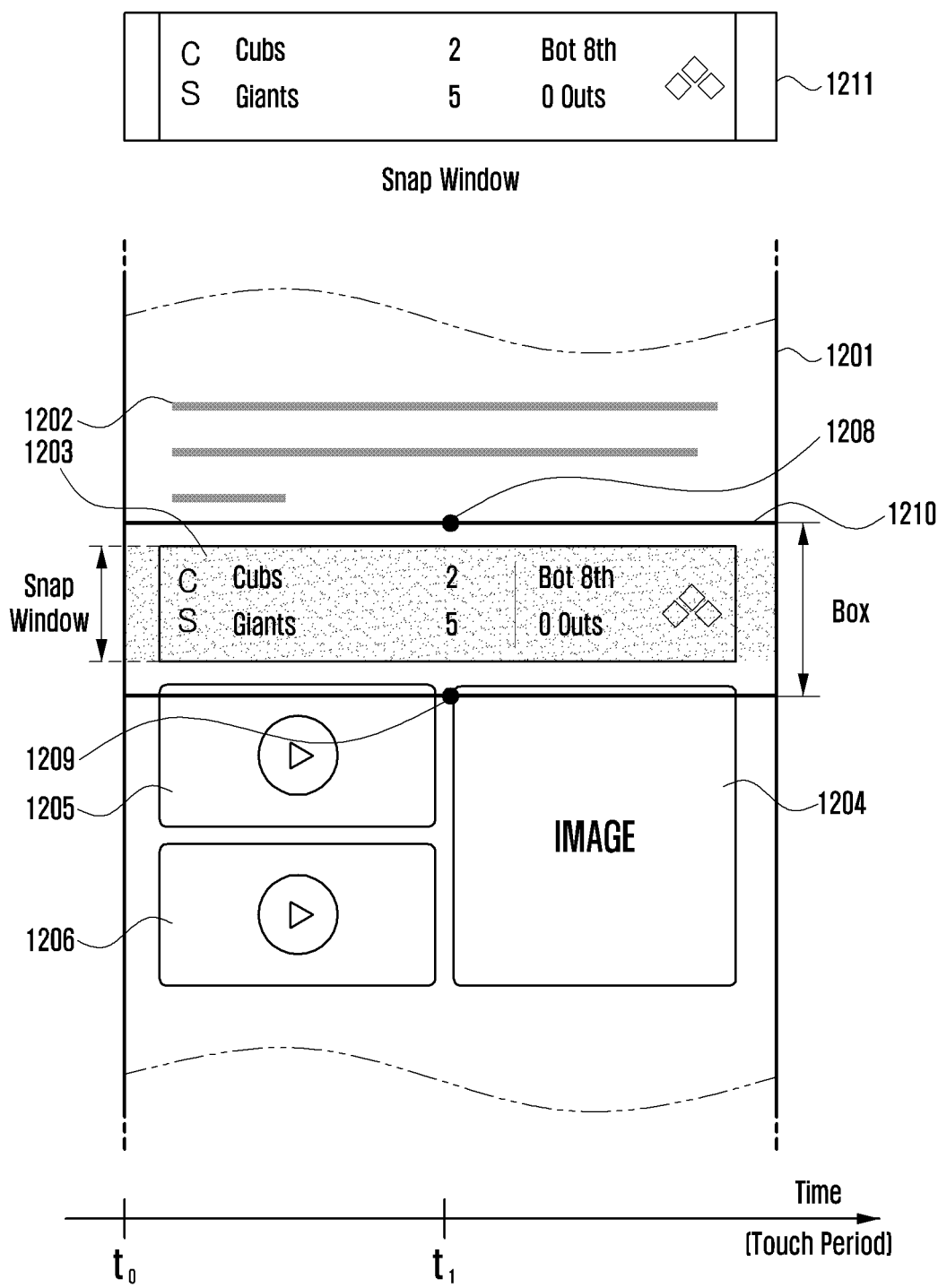
Figure 12C:
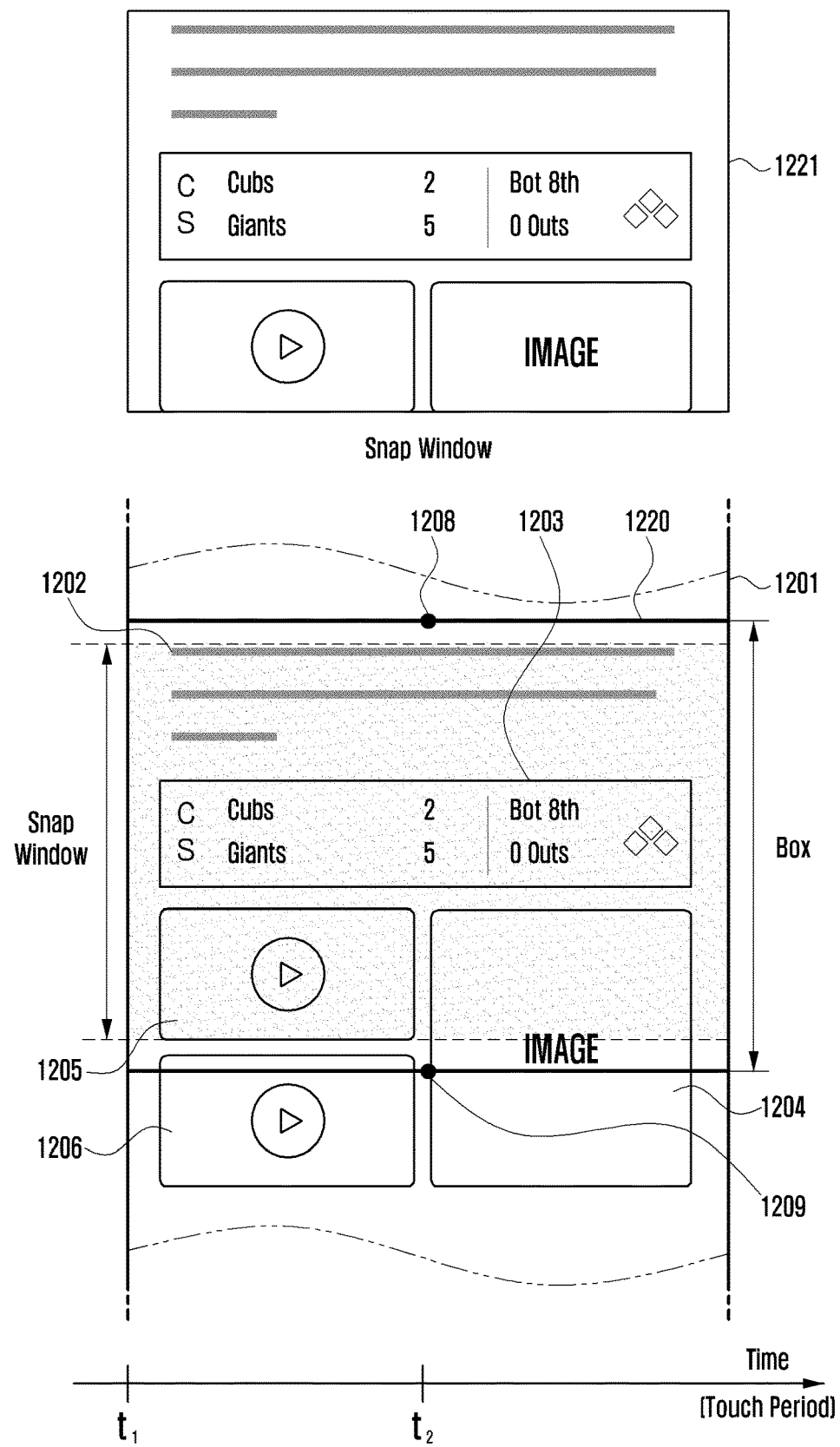

FIGS. 12A, 12B and 12C illustrate operations of the electronic device to set a box based on a touch input and to compose a snap window based on the content located inside the box (touch-based in-range arrangement) according to embodiments of the present disclosure.

In one embodiment, the electronic device may include all or some of the components of the electronic device 101 of FIG. 1 or the electronic device 201 of FIG. 2.

The processor (e.g. processor 120) of the electronic device may determine whether to include content in the box created by touch input through an in-range arrangement operation. The application may send the framework (e.g. middleware 330) information on the type, size, and location (coordinates) of each piece of content to be provided through the display. The framework may adjust the size and position of the box based on user input received from the kernel (e.g. kernel 320). Hence, the processor may determine whether to include the content in the box based on the size and location of each piece of content.

With reference to FIG. 12A, the processor (e.g. processor 120) may display pieces of content through the single-window 1201, such as a text 1202, a notification board 1203 to indicate the game score to the user, an image 1204, a first video 1205, a second video 1206, and handlers 1207 and 1208. In response to touch input generated at time t0, the processor may display a first box 1207 of a preset size at a specific position, such as on the scoreboard 1203 on which the touch input is generated.

When the first box 1207 is displayed on the scoreboard 1203, the scoreboard 1203 may not be entirely included in the first box 1207 but may be partially included, as shown. For example, the processor may compare the size of the scoreboard 1203 with the size of the first box 1207. If the scoreboard 1203 is larger than the first box 1207, or if the first box 1207 is larger than the scoreboard 1203 but the scoreboard 1203 is not included in the first box 1207, the processor may determine that the scoreboard 1203 is not completely included in the first box 1207. In this case, even if there is a display request of the snap window from the user, such as the touch input being released from the single-window, the display of the first box 1207 may be terminated but the snap window may not be provided through the display. In addition to the game score, various information, such as the weather, a schedule, the time, and an advertisement, can be notified to the user through the notification board.

With reference to FIG. 12B, the size of the box can be adjusted according to a touch input to the handlers 1208 and 1209. For example, in response to a multi-touch gesture, such as narrowing or widening the gap between the thumb and the forefinger simultaneously contacting the handlers 1208 and 1209, or a single touch gesture, such as moving the finger up or down while touching one of the handlers 1208 and 1209, the processor may change the size of the box 1207 by simultaneously moving the handlers 1208 and 1209 up and down, respectively.

Alternatively, in response to a single touch gesture for the handler 1208 or 1209, the processor may change the size of the box 1207 by separately moving each handler up and down. As the first box 1207 is enlarged to the second box 1210 at time t1, the scoreboard 1203 may be entirely included in the second box 1210, and the image 1204 and the first video 1205 may be partially included therein. The snap window 1210 may be determined by the processor based on the size of content, such as the scoreboard 1203. For example, the vertical length of the snap window 1211 may be determined to be the same as the vertical length of the scoreboard 1203, so that the scoreboard 1203 can be displayed entirely through the snap window 1210. In one embodiment, in response to the passing of a given time after a touch is released from a handler and before the done button (e.g., 1061 of FIG. 10) is selected, the processor can change a size of the second box (1210) to a given size (e.g., the size of the first box (1207) at "t0"). According to a different embodiment, even if the touch is released from the handler, the size of the first box (1210) can be maintained without any change.

With reference to FIG. 12C, as the user continues to manipulate the handlers 1208 and 1209, the second box 1210 may be enlarged to the third box 1220 at time t2, so that the scoreboard 1203, the first video 1205, and the text 1202 may be included in the third box 1220. Hence, the vertical length of the snap window 1221 may be determined to be the vertical length from the top line of the text 1202 to the bottom of the first video 1205. At this time, a portion of the image 1204 may be displayed via the snap window 1221. In one embodiment, in response to the passing of a given time after a touch is released from a handler and before the done button is selected, the processor can change a size of the third box (1220) to a given size (e.g., the size of the first box at "t0"). According to a different embodiment, even if the touch is released from the handler, the size of the third box (1220) can be maintained.

In one embodiment, through an in-range arrangement operation, the processor of the electronic device can set the size of the snap window to a size less than or equal to the size of the box that fully includes at least one piece of content, such as by a shorter vertical length.

Figure 13A:
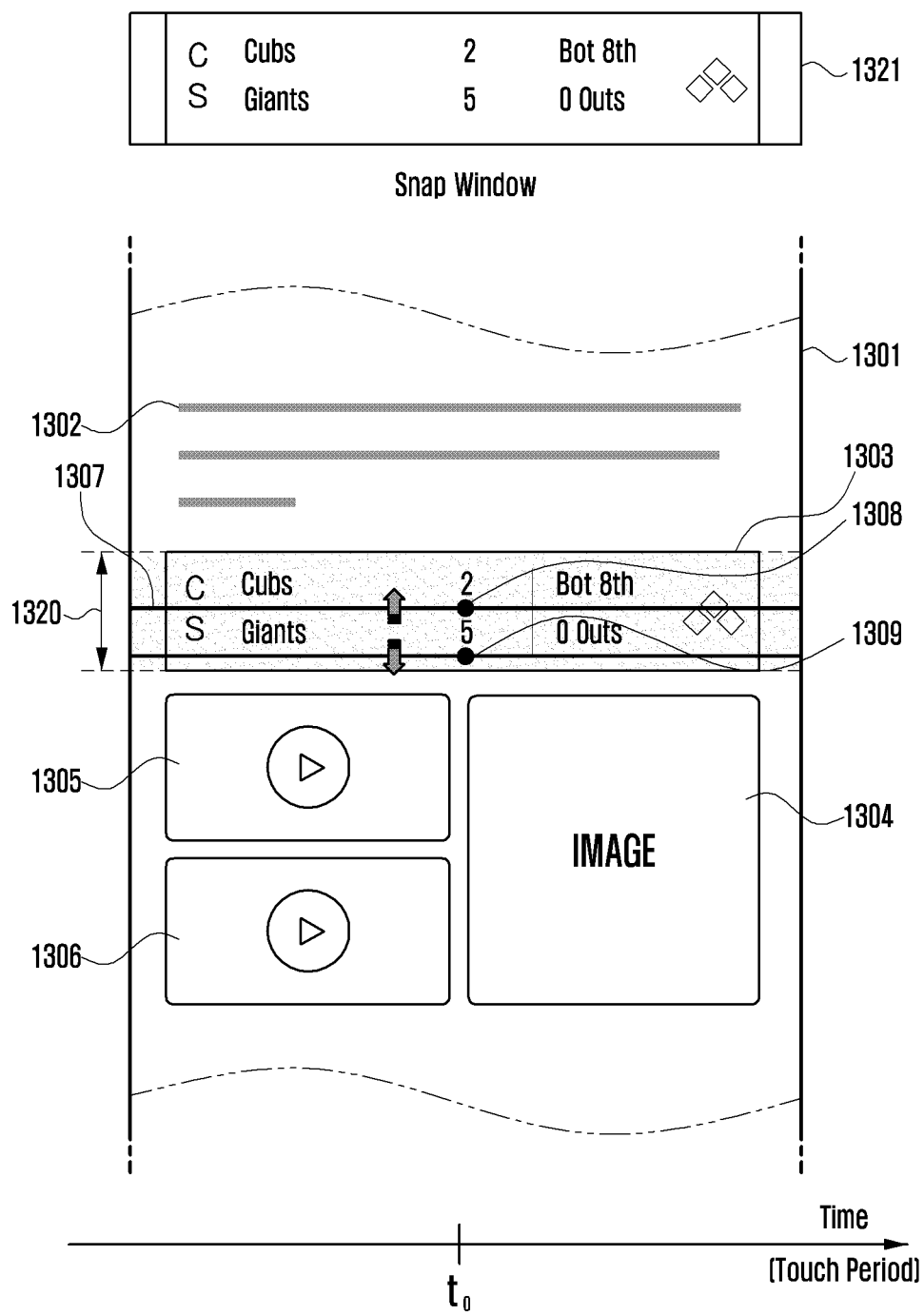
FIGS. 13A, 13B and 13C illustrate operations of the electronic device to set a box based on a touch input and to compose a snap window based on the content located outside the box (touch-based out-of-range arrangement) according to embodiments of the present disclosure.
Figure 13B:
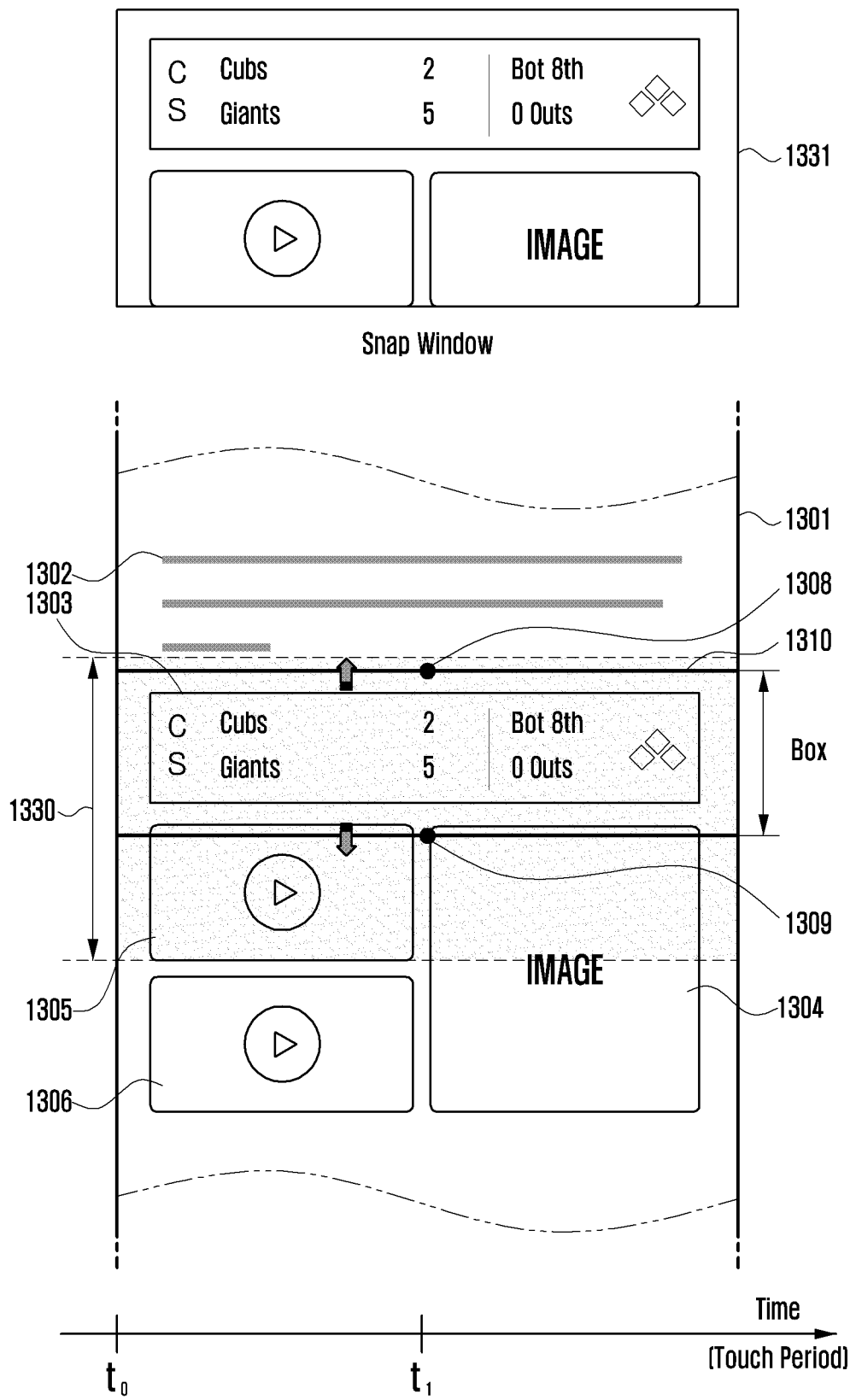
Figure 13C:
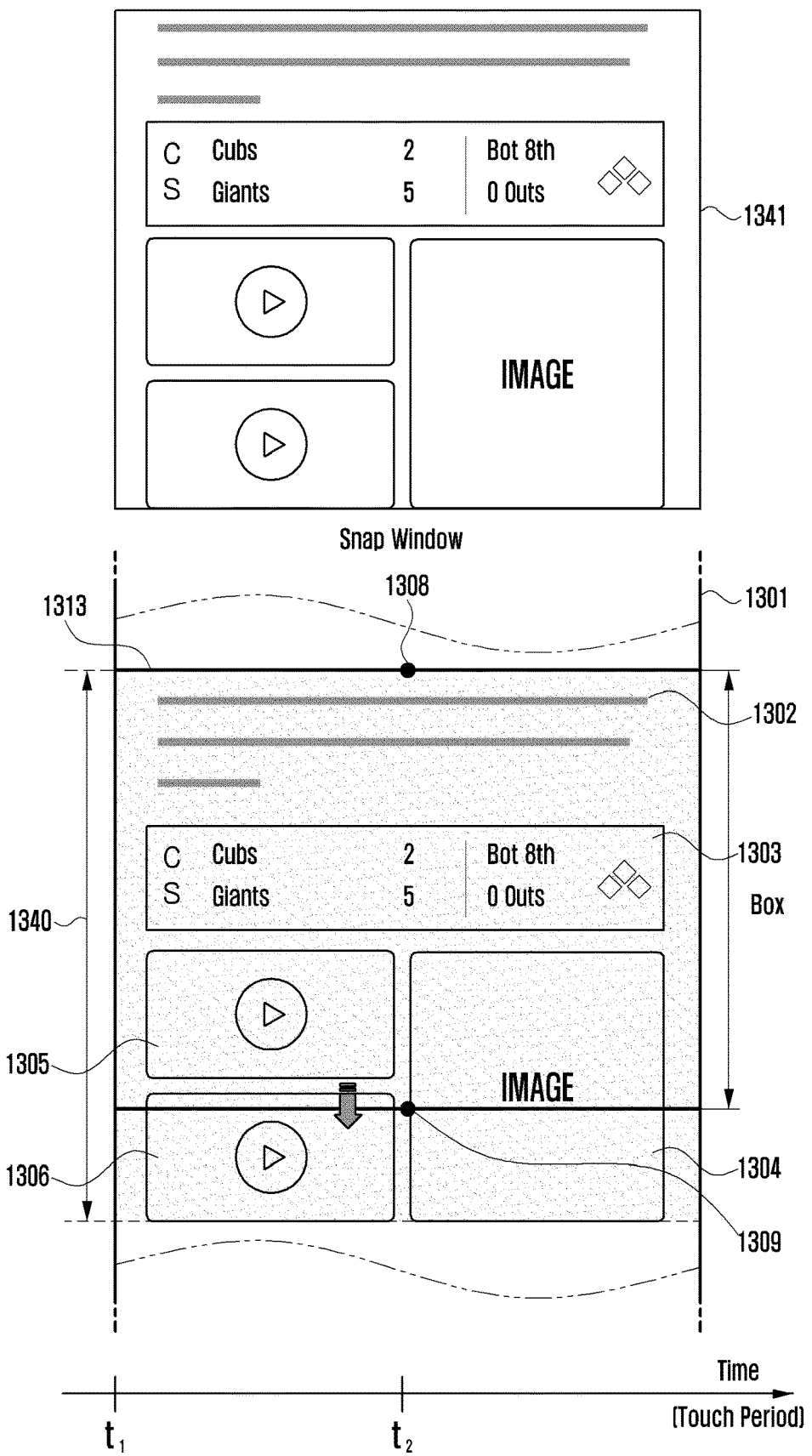

FIGS. 13A, 13B and 13C illustrate operations of the electronic device to set a box based on a touch input and to compose a snap window based on the content located outside the box (touch-based out-of-range arrangement) according to embodiments of the present disclosure.

In one embodiment, the electronic device may include all or some of the components of the electronic device 101 of FIG. 1 or the electronic device 201 of FIG. 2.

In one embodiment, when a piece of content is partially included in the box, the processor (e.g. processor 120) of the electronic device may set the size of the snap window so that the content is fully displayed through an out-of-range arrangement operation.

With reference to FIG. 13A, the processor may provide multiple pieces of content 1302 to 1306 through the single-window 1301. In response to a touch input generated at time t0, the processor can display the first box 1307 of a preset size at a preset position on the single-window 1301.

In one embodiment, when at least a portion of the scoreboard 1303 is included in the first box 1307, the processor may set the first portion 1320, including the entire scoreboard 1303 in the single-window 1301, as the snap window. For example, the first portion 1320 corresponds to the first box 1307 extended to the top and bottom of the scoreboard 1303, and the scoreboard 1303 located inside the first portion 1320 can be displayed through the snap window 1321.

With reference to FIG. 13B, the handlers 1308 and 1309 may be moved up and down, respectively, by user input, so that the box can be enlarged. For example, in response to a multi-touch gesture, such as narrowing or widening the gap between the thumb and the forefinger simultaneously contacting the handlers 1308 and 1309, or a single touch gesture, such as moving the finger up or down while touching one of the handlers 1308 and 1309, the processor may simultaneously move the handlers 1308 and 1309 up and down, respectively. Then, the first box 1307 may be enlarged to the second box 1310 at time t1, and the scoreboard 1303 may be fully included in the second box 1310. Alternatively, in response to a single touch gesture on the handler 1308 or 1309, the processor may change the size of the box by separately moving the handler up and down.

The image 1304 and the first video 1305 may be partially included within the second box 1310. Then, the processor may reset the second portion 1330, which entirely includes not only the scoreboard 1303 but also at least part of the image 1304 and the first video 1305, as the snap window 1331. As an example of snap window resetting, among the lower end of the image 1304 and the lower end of the first video 1305, the lower end of the first video 1305 that is closer to the second box 1310 may be determined as the lower end of the second portion 1330. As such, through the snap window 1331, the scoreboard 1303 and the first video 1305 can be fully displayed and the image 1304 can be partially displayed. Alternatively, if any content is included in the box above a preset ratio, such as 15%, the processor may enlarge the box to include all of the content and reset the enlarged box as the snap window 1331.

With reference to FIG. 13C, the handlers 1308 and 1309 can be moved up and down, respectively, according to user operation, so that the box can become larger. For example, the second box 1310 may be enlarged to the third box 1313 at time T2 and the text 1302, the scoreboard 1303, and the first video 1305 may all be fully included within the third box 1313, and the image 1304 and the second video 1306 may be partially included within the third box 1313. Then, the processor may reset the third portion 1340, including the image 1304 and the second video 1306 as a whole in the single-window 1301, as the snap window 1341.

The electronic device may configure the snap window to be larger than the box by performing an out-of-range arrangement operation.

In one embodiment, when a long press or force touch, preset as an input for releasing the snap window, is generated in the snap window, the processor may terminate the presentation of the snap window and provide a screen for resetting the snap window, such as the screen on which the box is provided as described above, through the display. The snap window can be reset by touch-based in-range or out-of-range arrangement operations described above. After this reset, the snap window can be provided again through the display.

Figure 14A:
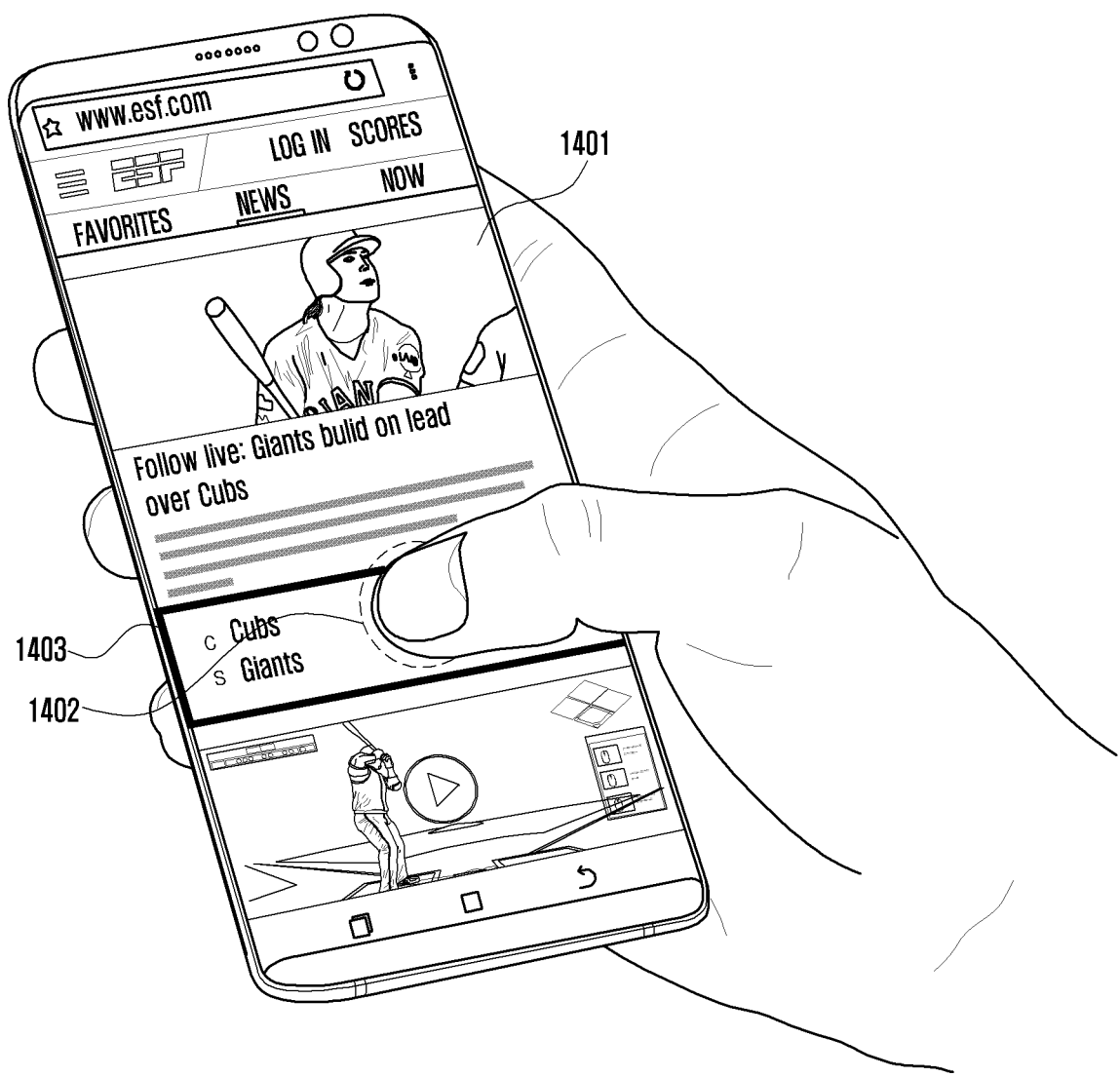
FIGS. 14A and 14B illustrate operations of the electronic device to provide a snap window based on a force touch input according to embodiments of the present disclosure.
Figure 14B:
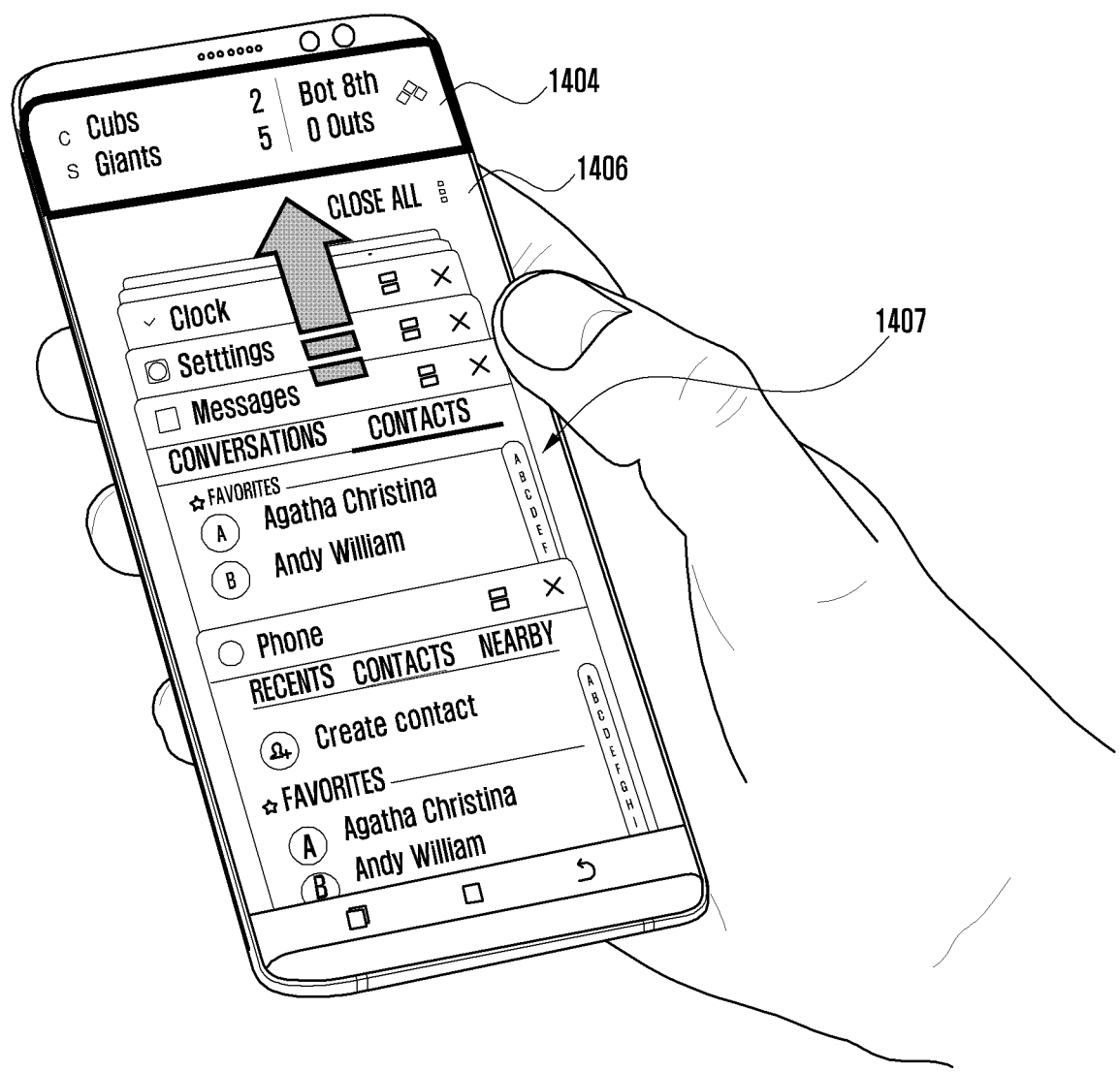

FIGS. 14A and 14B illustrate operations of the electronic device to provide a snap window based on a force touch input according to embodiments of the present disclosure.

In one embodiment, the electronic device may include all or some of the components of the electronic device 101 of FIG. 1 or the electronic device 201 of FIG. 2.

With reference to FIG. 14A, the processor (e.g. processor 120) of the electronic device may set at least a portion of the touch sensitive display (e.g. display 160) including a pressure sensor (e.g. pressure sensor 530) as a single-window 1401 and provide a web page through the single-window 1401. If a touch input 1402 received from the single-window 1401 satisfies a given condition, the processor may cause the box 1403 to be displayed in the single-window 1401. For example, the processor may receive pressure information of the touch input 1402 from the display and recognize the touch input 1402 as a force touch input if the pressure is above a preset level. When a force touch input is received from the single-window 1401, the processor may display the box 1403 in the region where the force touch input is detected.

The size of the box 1403 can be set to a uniform ratio, such as 16:9, in consideration of the aspect ratio of the display. The size of the box 1403 may be changed based on the intensity or period of the pressure, and based on the area of the content contained therein. That is, the size of the box 1403 can be adjusted according to the amount of content located in the box 1403.

The length of one side of the box may be fixed to the horizontal or vertical length of the display according to the display mode (portrait or landscape mode), and the length of the other side may be adjusted based on the intensity or period of the pressure. For example, in FIG. 14A, when the display resolution is 1440 (horizontal)*2960 (vertical) and the display mode is portrait mode (vertical mode), the horizontal length of the box 1403 may be fixed to the horizontal resolution of the display (1440 pixels), and the vertical length of the box 1403 may be changed based on the intensity or period of the pressure. When the display mode is landscape mode (horizontal mode), the vertical length of the box 1403 can be fixed to the vertical resolution (2960 pixels) and the horizontal length of the box 1403 can be changed based on the intensity or period of the pressure.

With reference to FIG. 14B, when the force touch input 1402 is released from the single-window 1401, the processor may divide the single-window 1401 into a snap window 1404 and a multitasking window 1406, and may continue to provide the web page through the snap window 1404 and provide the application list 1407 through the multitasking window 1406. The size of the snap window 1404 and the portion of the web page to be displayed therein can be determined according to the box 1403. In one embodiment, upon release of the touch input 1402, the processor may present a visual effect on the display that raises upward the content present in the box 1403.

The size of the box can be adjusted based on a force touch input. For example, the box can be displayed on the display based on the intensity of the pressure first, and the size of the box can be adjusted based on at least one of the intensity and period of the pressure. As another example, the processor may adjust the size of the box in response to a force touch input, move the position of the box in response to a touch input after release of the force touch input, and display the content in the box through the snap window upon release of the touch input.

Figure 15A:
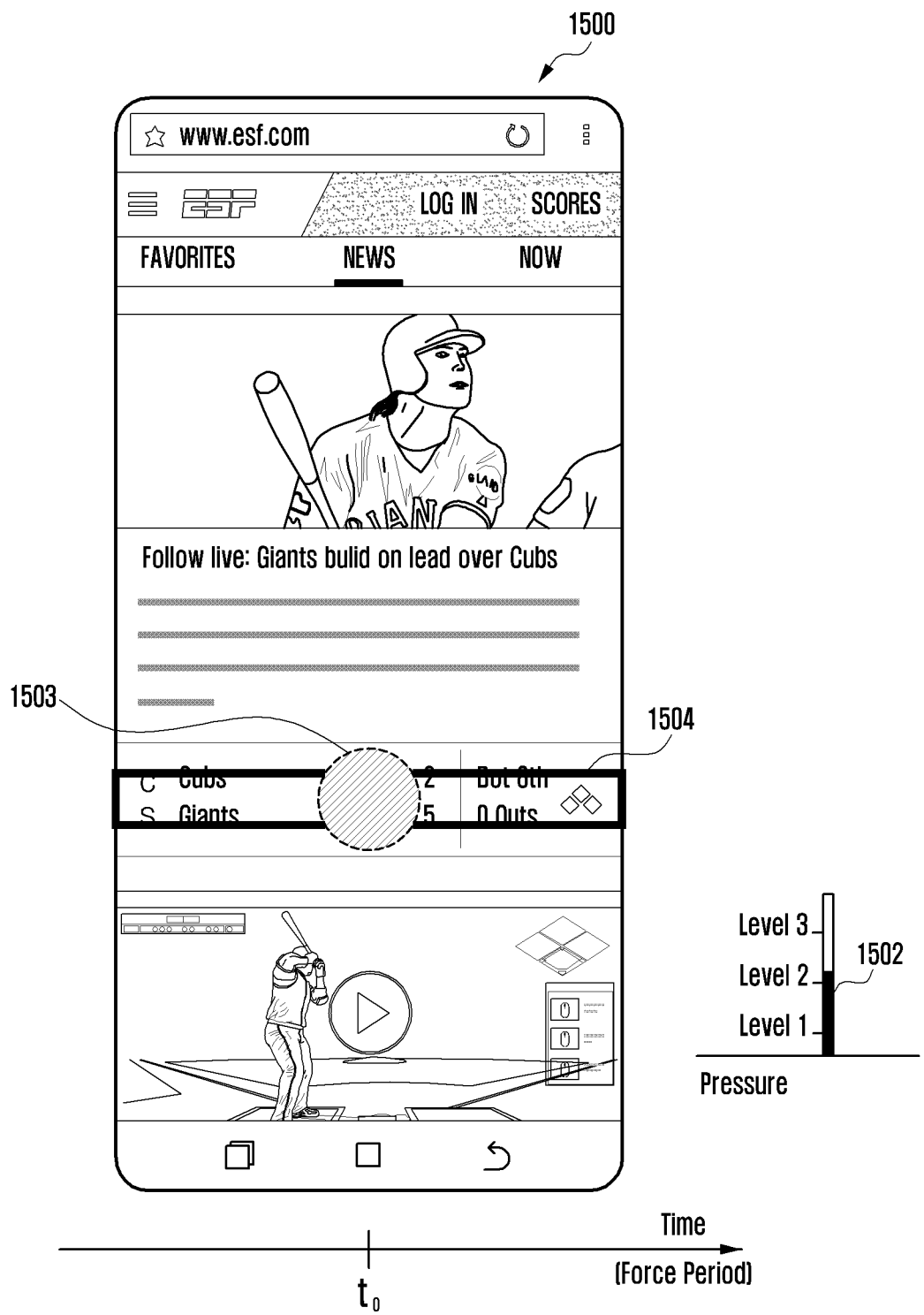
FIGS. 15A, 15B and 15C illustrate operations of the electronic device to adjust the size of the box based on a force touch input according to embodiments of the present disclosure.
Figure 15B:
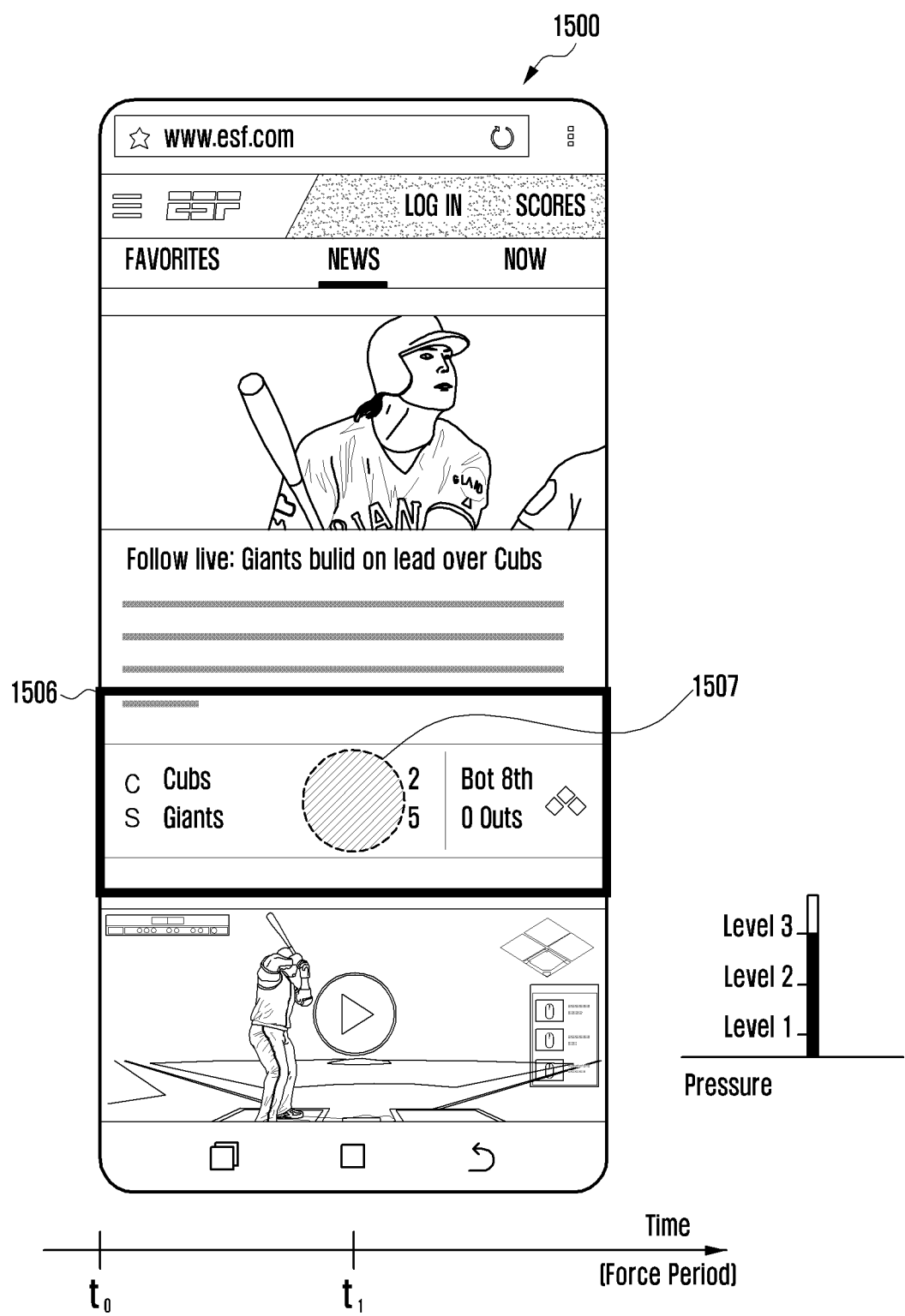
Figure 15C:
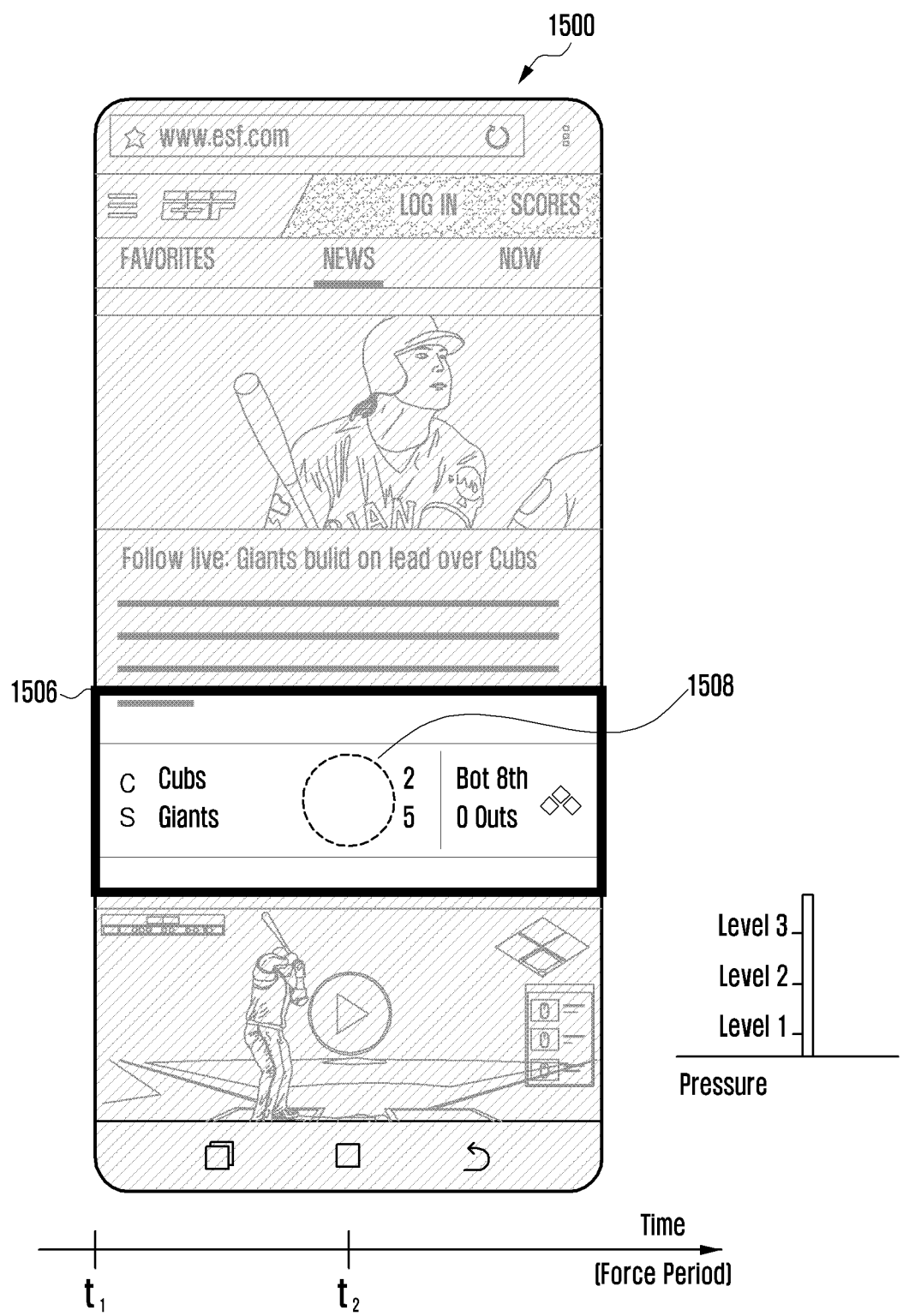

FIGS. 15A, 15B and 15C illustrate operations of the electronic device to adjust the size of the box based on a force touch input according to embodiments of the present disclosure.

In one embodiment, the electronic device may include all or some of the components of the electronic device 101 of FIG. 1 or the electronic device 201 of FIG. 2.

With reference to FIG. 15A, the processor (e.g. processor 120) of the electronic device may display a web page on the touch sensitive display 1500. The processor may receive a force touch input 1503 from the display 1500 at time t0. If the pressure 1502 of the force touch input 1503 exceeds level 2, the processor may display the first box 1504 of a preset size in the display area corresponding to the force touch input 1503.

With reference to FIG. 15B, if the force touch input is sustained for a given time and the pressure is above a given level, the processor can adjust the size of the box. For example, if the pressure of the force touch input 1507 is maintained greater than or equal to level 2 from time t0 to time t1 and the pressure measured at time t1 is greater than or equal to level 3, the first box 1504 may be enlarged to the second box 1506.

With reference to FIG. 15C, when the force touch input 1508 is released at time t2, the processor may select the second box 1506 for determining the size of the snap window and configuring the content to be displayed therein. To enable the user to recognize such a selection, the processor may display the second box 1506 in a manner readily distinguished from the other area, such as by applying a blur or visual effect. In addition, the processor can provide haptic or tactile feedback to the user.

Figure 16A:
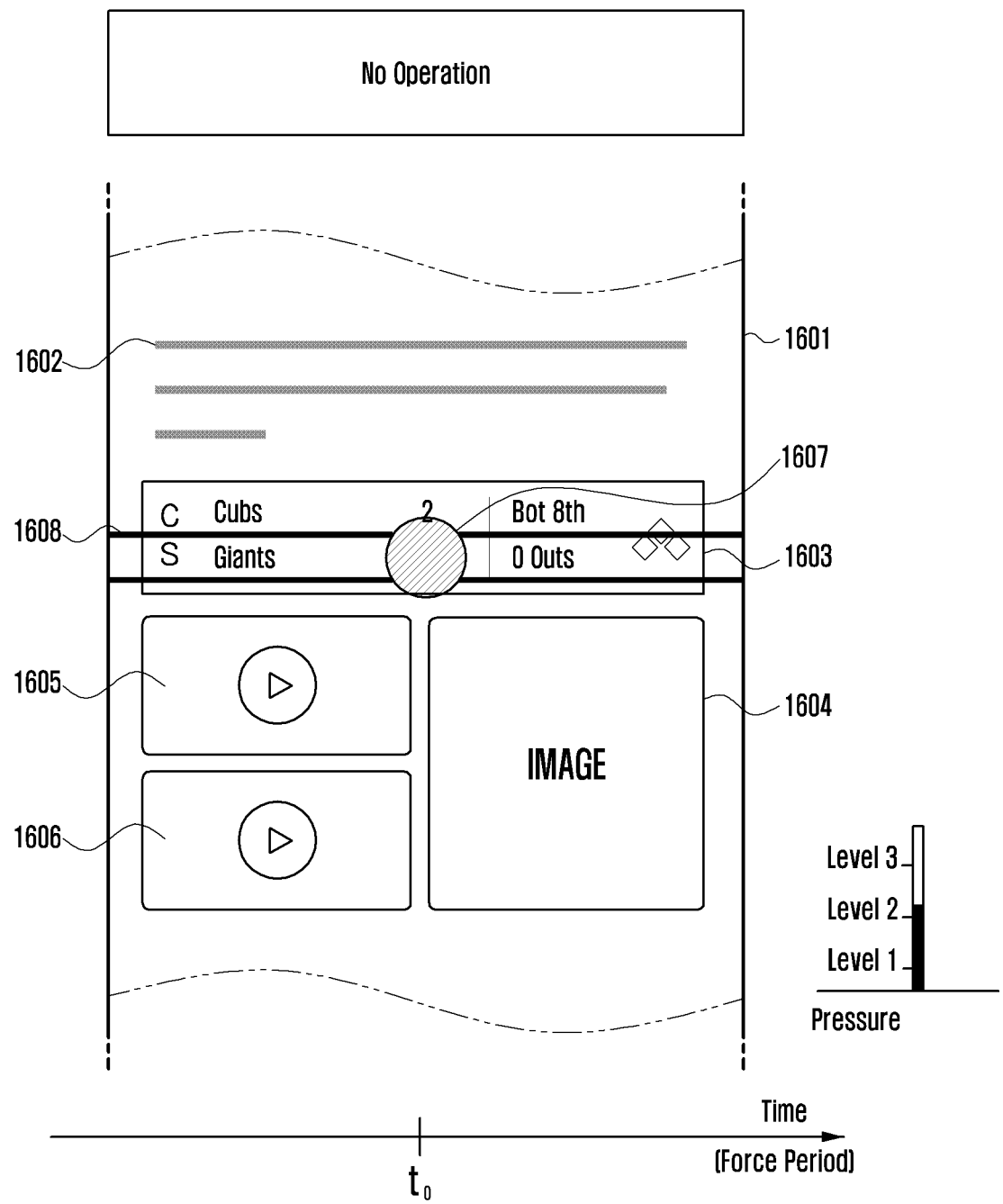
FIGS. 16A, 16B and 16C illustrate in-range arrangement operations of the electronic device based on a force touch input according to embodiments of the present disclosure.
Figure 16B:
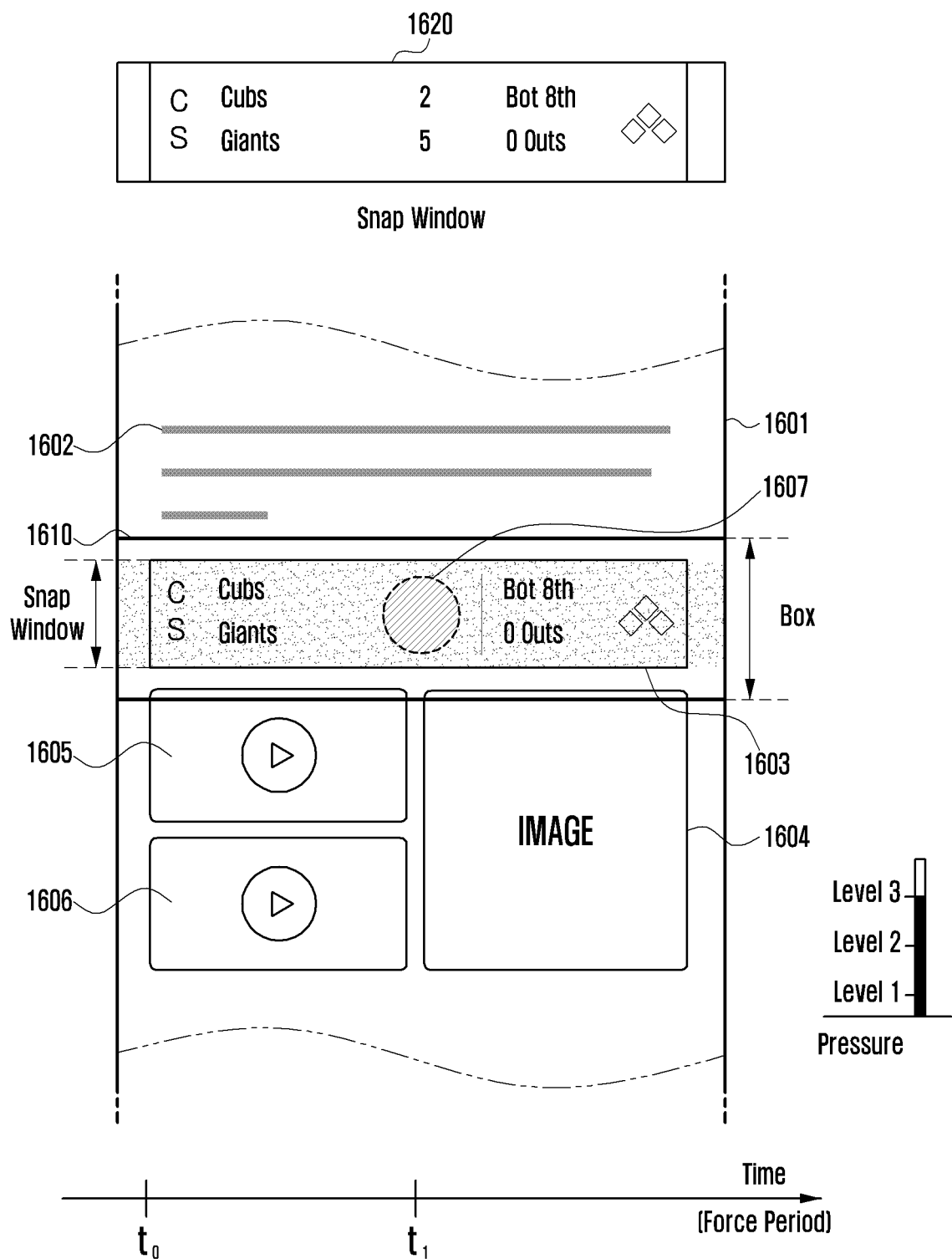
Figure 16C:
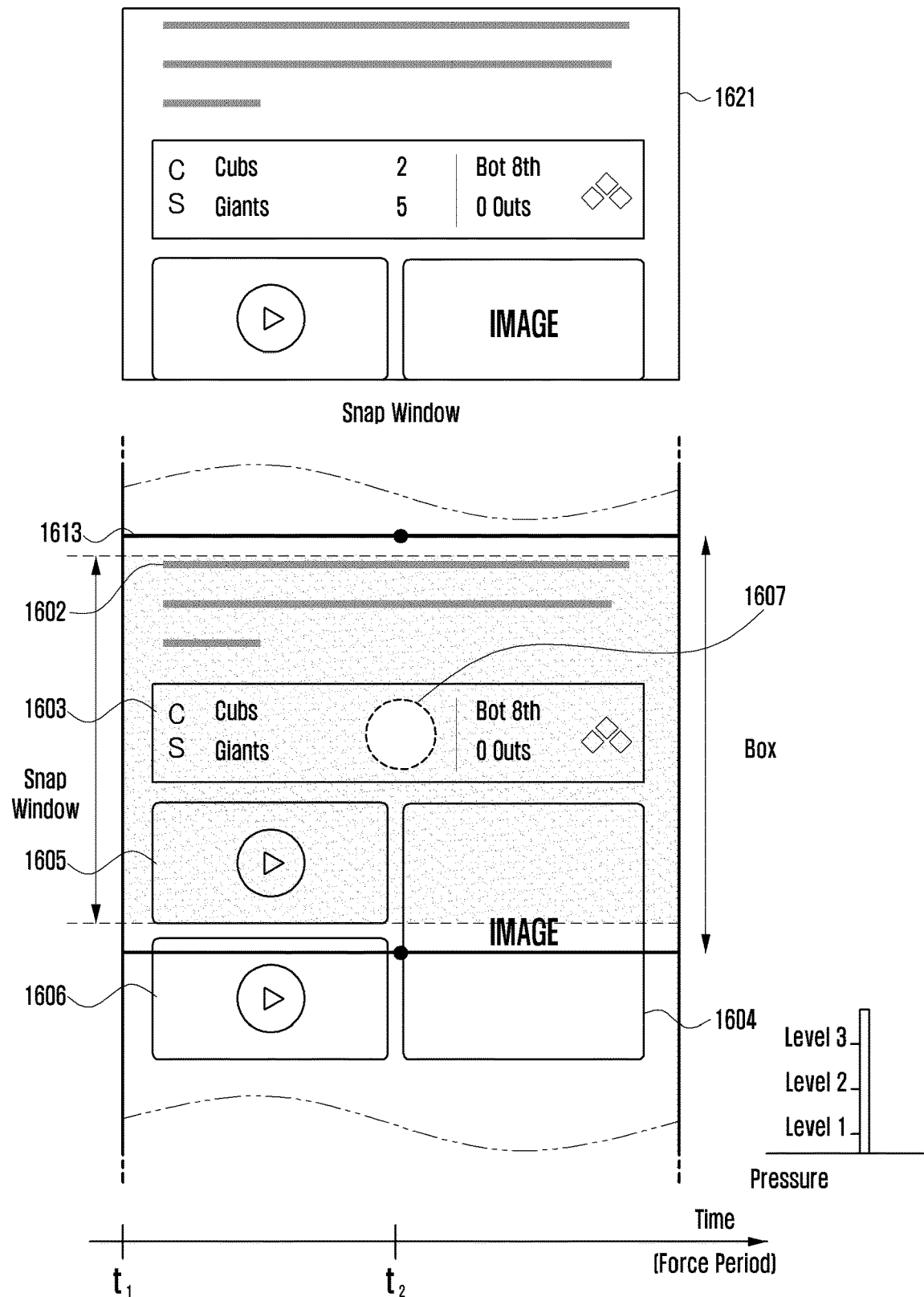

FIGS. 16A, 16B and 16C illustrate in-range arrangement operations of the electronic device based on a force touch input according to embodiments of the present disclosure.

In one embodiment, the electronic device may include all or some of the components of the electronic device 101 of FIG. 1 or the electronic device 201 of FIG. 2.

With reference to FIG. 16A, the processor (e.g. processor 120) of the electronic device may provide pieces of content 1602 to 1606 through the single-window 1601. In response to a force touch input 1607 to the scoreboard 1603 with a pressure level 2 at time t0, the processor may display a first box 1608 of a preset size on the scoreboard 1603 associated with the force touch input. At this time, the scoreboard 1603 may not be entirely included in the first box 1608 but may be partially included therein, as shown. Then, even if there is a display request of a snap window from the user, such as a release of the force touch input 1607 from the single-window, the processor may terminate the display of the first box 1608 but may not provide a snap window via the display (e.g. display 160).

With reference to FIG. 16B, the force touch input 1607 may be maintained on the scoreboard 1603 from time t0 to time t1, during which period the pressure may also be maintained greater than or equal to level 2. Then, the processor may enlarge the first box 1607 to the second box 1610 by increasing the vertical length of the first box 1607 in up and down directions in proportion to the period (t1-t0) of the force touch input 1607. As such, the second box 1610 may fully include the scoreboard 1603 and may not include other content. Thereby, the processor may determine the vertical length of the scoreboard 1603 to be the vertical length of the snap window 1620.

Meanwhile, the horizontal length of the snap window 1620 may already be determined as the horizontal length of the single-window 1601. In one embodiment, when the force touch input 1607 is released from the single-window 1601 when the size (width*length) of the snap window 1620 is already determined as described above, the processor may provide the snap window 1620 through the display. For example, the scoreboard 1603 may be displayed through the snap window 1620.

With reference to FIG. 16C, as the force touch input 1607 is maintained until time t2, the vertical length of the second box 1610 may be increased in up and down directions, so that the second box 1610 is enlarged to the third box 1613. Hence, the third box 1613 may include the text 1602, the scoreboard 1603, and the first video 1605 as a whole. The processor may determine the size of the snap window 1621 based on the vertical length from the top row of the text 1602 to the bottom of the first video 1605. The snap window 1621 may be provided through the display based on release of the force touch input 1607. For example, when the force touch input 1607 is released at time t2 from the single-window 1601, the snap window 1621 may be provided through the display and the pieces of content may be continuously displayed through the snap window 1621.

Figure 17A:
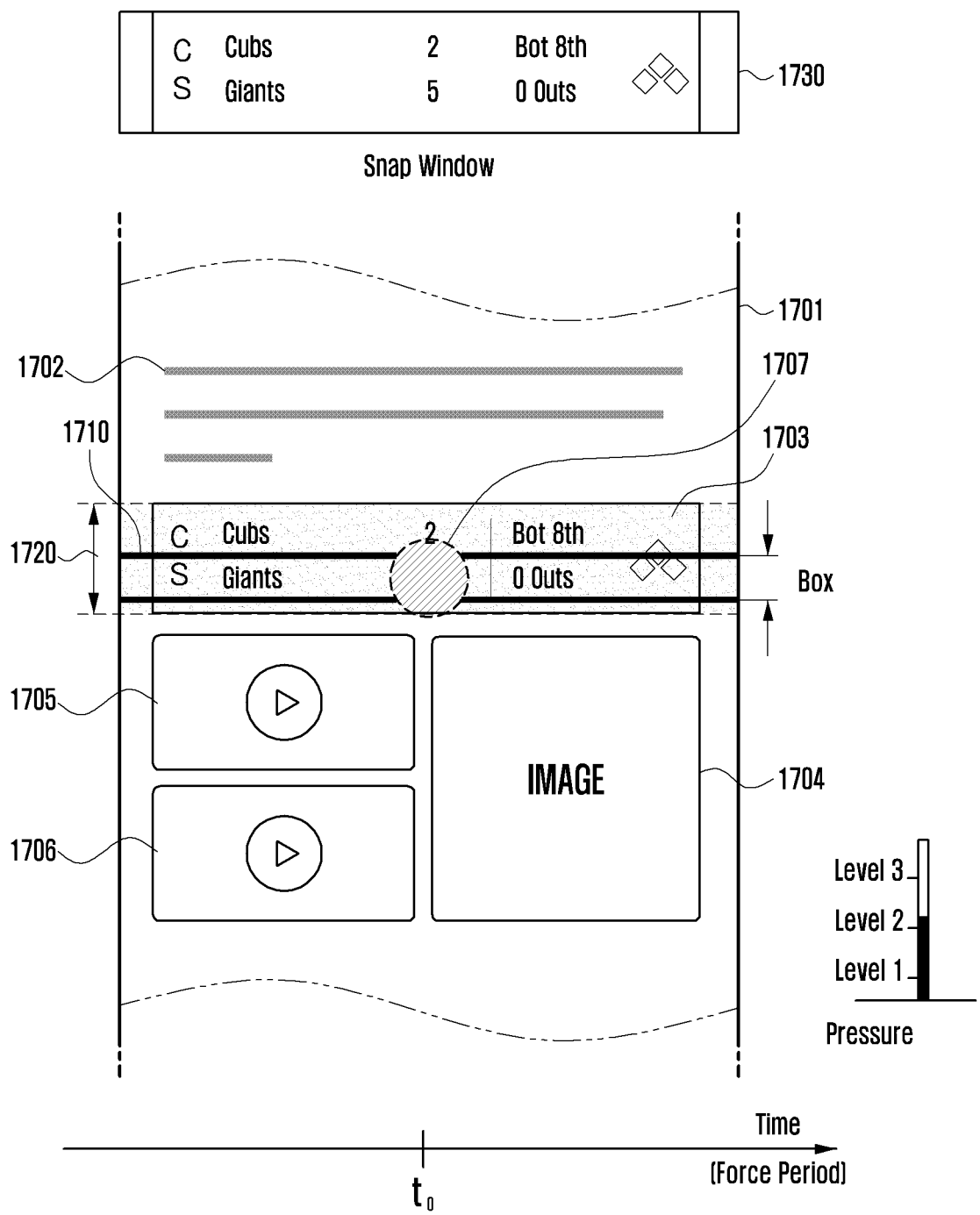
FIGS. 17A, 17B and 17C illustrate out-of-range arrangement operations of the electronic device based on a force touch input according to embodiments of the present disclosure.
Figure 17B:
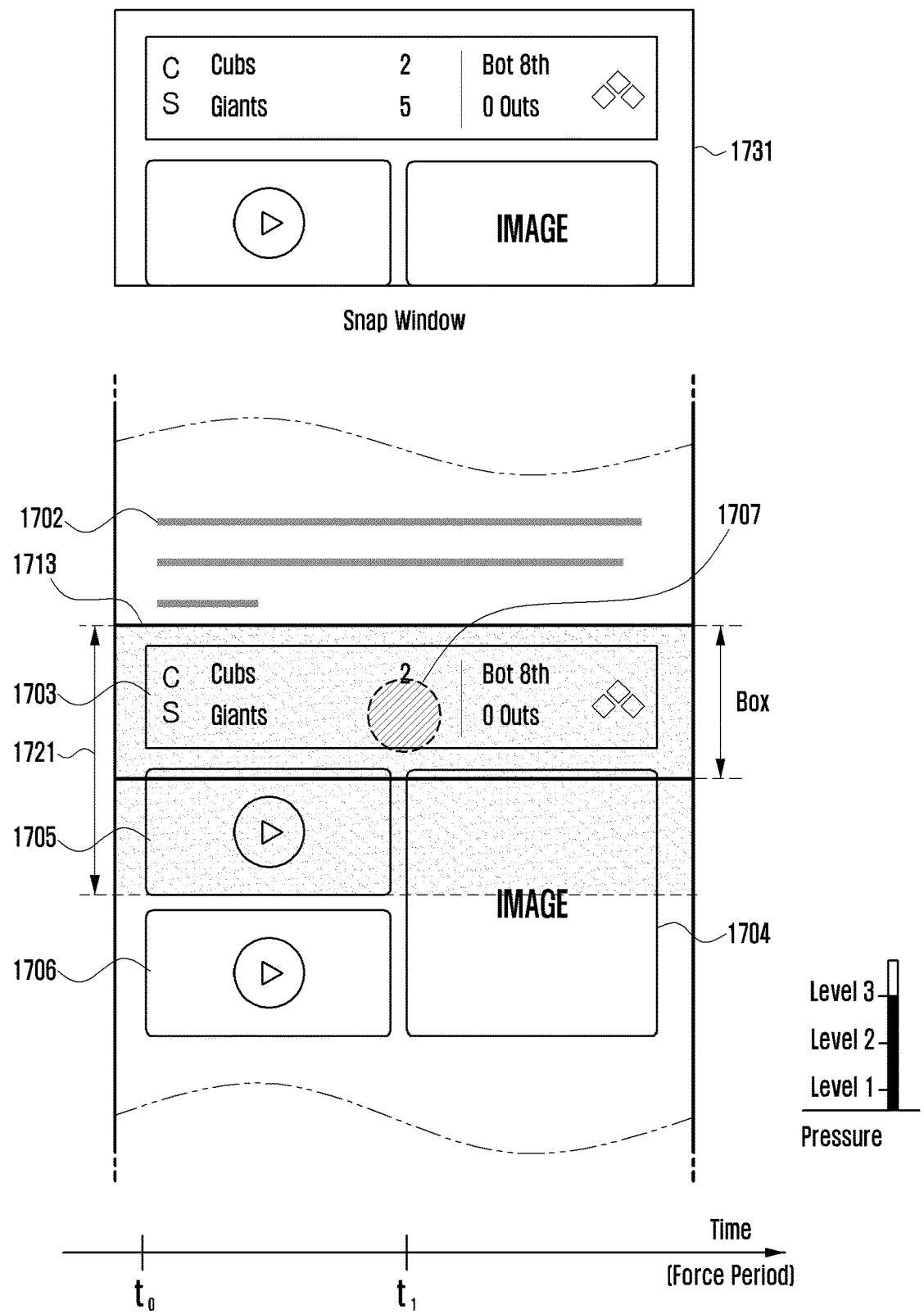
Figure 17C:
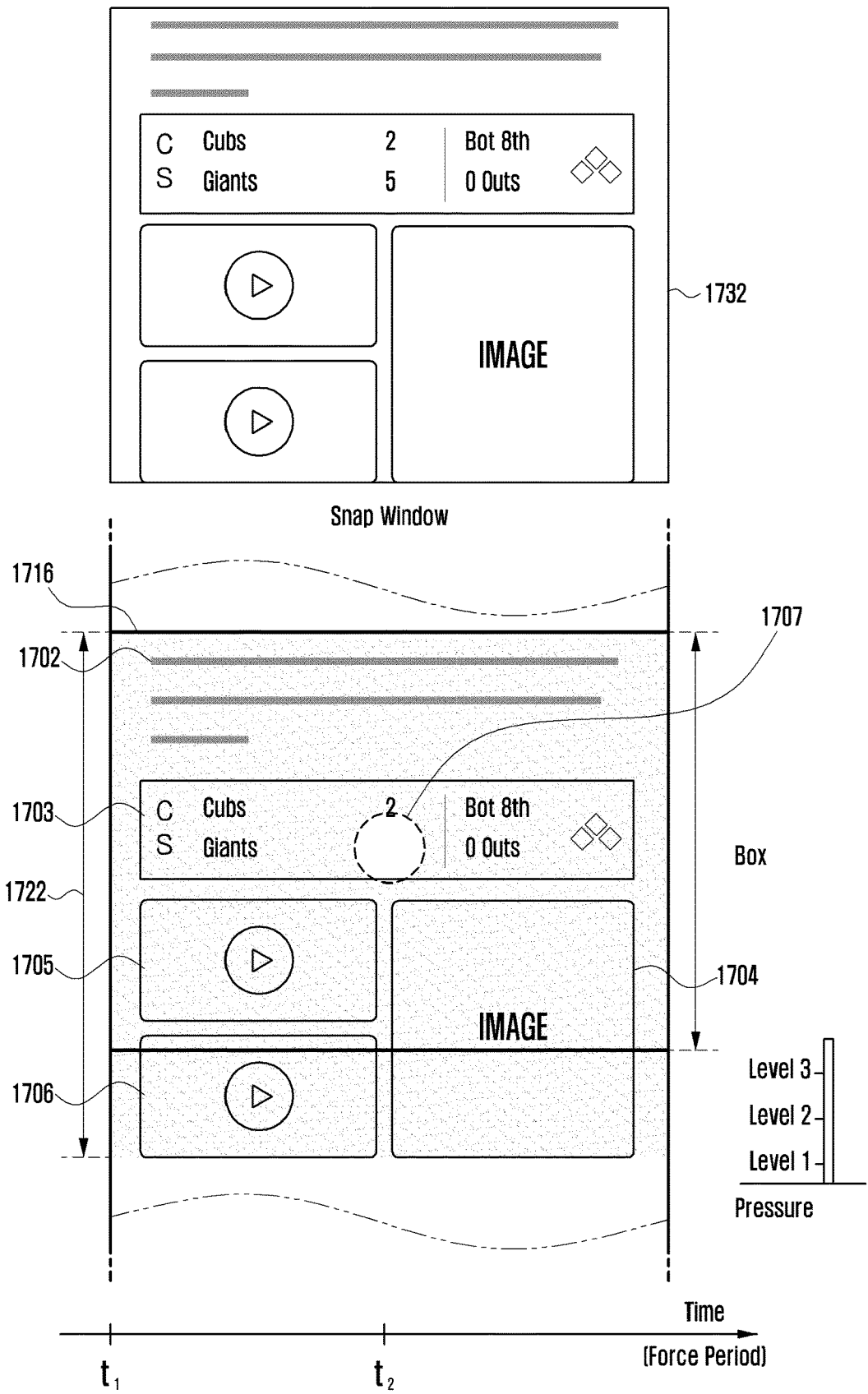

FIGS. 17A, 17B and 17C illustrate out-of-range arrangement operations of the electronic device based on a force touch input according to embodiments of the present disclosure.

In one embodiment, the electronic device may include all or some of the components of the electronic device 101 of FIG. 1 or the electronic device 201 of FIG. 2.

With reference to FIG. 17A, the processor (e.g. processor 120) of the electronic device may provide pieces of content 1702 to 1706 through the single-window 1701. In response to a force touch input 1707 to the scoreboard 1703 with a pressure level 2 at time t0, the processor may display a first box 1710 of a preset size on the scoreboard 1703 associated with the force touch input. If at least a portion of the scoreboard 1703 is included in the first box 1710, the processor may configure a first portion 1720, which fully includes the scoreboard 1703 in the single-window 1701, as the snap window 1730. For example, the processor may determine the vertical length of the scoreboard 1703 to be the vertical length of the snap window 1730. Alternatively, the horizontal length of the snap window 1730 may already be determined to be the horizontal length of the single-window 1701 and can be fixed without change. When the force touch input 1707 is released from the single-window 1701, the snap window 1730 may be provided via the display (e.g. display 160).

With reference to FIG. 17B, the force touch input 1707 may be maintained on the scoreboard 1703 from time t0 to time t1. During that period, the pressure may also be maintained greater than or equal to level 2. Then, the processor may enlarge the first box 1710 to the second box 1713 by increasing the vertical length of the first box 1710 in up and down directions in proportion to the period (t1-t0) of the force touch input 1707. As such, the second box 1713 may fully include the scoreboard 1703 and may partially include the image 1704 and the first video 1705.

The processor may reset the second portion 1721, which entirely includes not only the scoreboard 1703 but also at least one of the image 1704 and the first video 1705 in the single-window 1701, as the snap window 1731. For example, the vertical length of the second portion 1721 may be determined to be the vertical length from the upper end of the second box 1721 to the lower end of the first video 1705. Hence, when the force touch input 1707 is released from the single-window 1701 at time t1, the scoreboard 1703 and the first video 1705 can be fully displayed through the snap window 1731 and the image 1704 can be partially displayed.

With reference to FIG. 17C, as the force touch input 1707 is maintained until time t2, the processor may enlarge the second box 1713 to the third box 1716 by increasing the vertical length of the second box 1713 in up and down directions in proportion to the period (t2-t0). As such, the third box 1716 may include the text 1702, the scoreboard 1703, and the first video 1705 as a whole, and may also partially include the image 1704 and the second video 1706. To permit the image 1704 to be fully displayed through the snap window 1732, the processor may determine the size of the third portion 1722 based on the vertical length from the top of the third box 1716 to the bottom of the image 1704. When the force touch input 1707 is released from the single-window 1701 at time t2 after the size of the snap window 1732 is determined as above, the processor can provide the snap window 1732 via the display. Thereby, the pieces of content can be continuously displayed through the snap window 1732.

Figure 18:
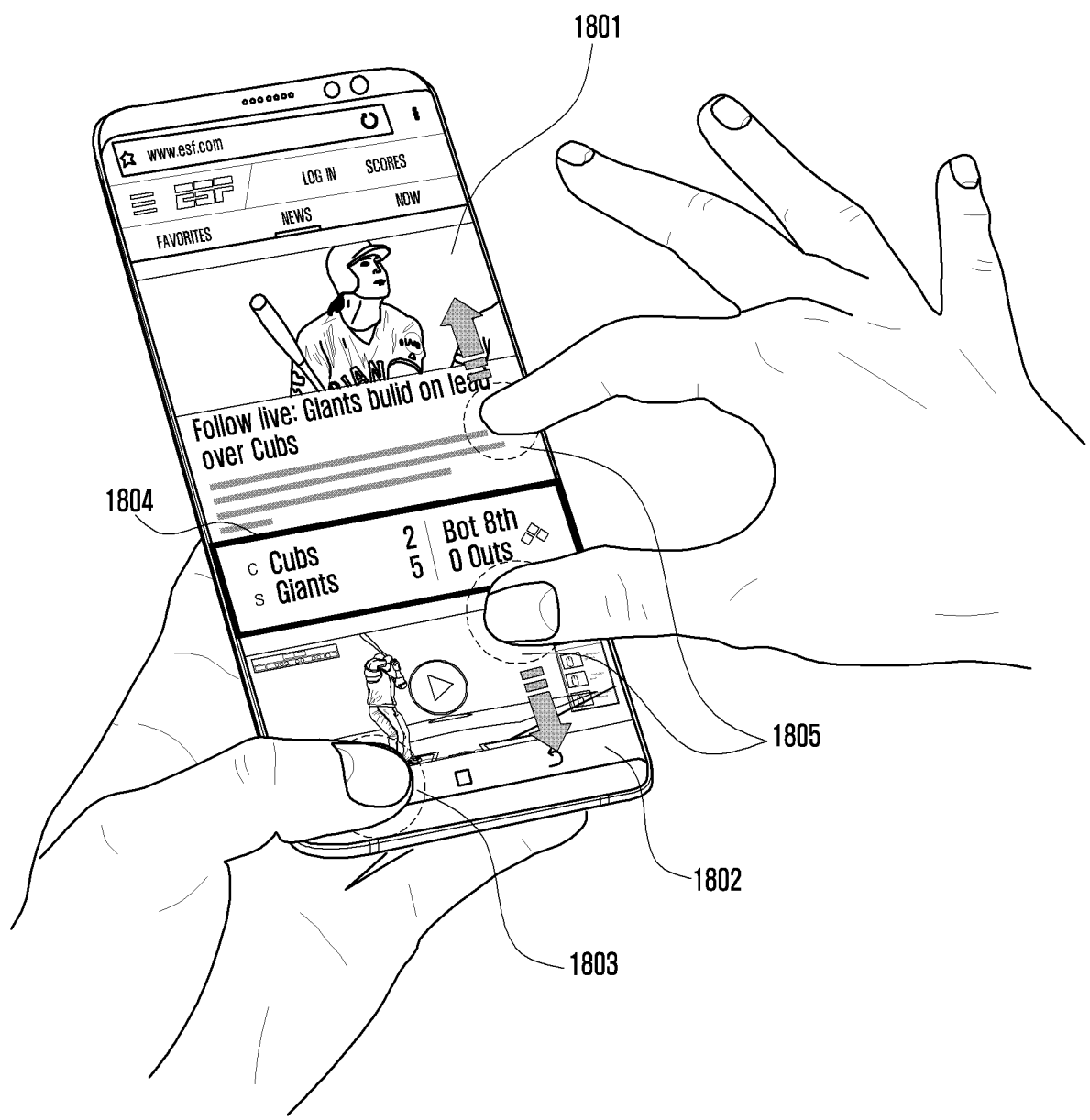
FIG. 18 illustrates operations of the electronic device to set a box based on a multi-touch input according to embodiments of the present disclosure.

FIG. 18 illustrates operations of the electronic device to set a box based on a multi-touch input according to embodiments of the present disclosure.

In one embodiment, the electronic device may include all or some of the components of the electronic device 101 of FIG. 1 or the electronic device 201 of FIG. 2.

With reference to FIG. 18, the processor (e.g. processor 120) of the electronic device may divide the touch sensitive display into a single-window 1801 and a soft-key panel 1802, display a web page via the single-window 1801, and display a plurality of soft keys via the soft-key panel 1802. When a force touch input 1803 is received from the multi-tasking key among the keys of the soft-key panel 1802, the processor can display a box 1804 of a preset size at a preset position of the single-window 1801. The processor may receive a touch input from the single-window 1801 while the force touch input 1803 is maintained on the multitasking key, and may adjust the size of the box 1804 based on the touch input.

The touch input received from the single-window 1801 may be a pinch zoom input 1805. If the pinch zoom input 1805 is a pinch-in operation (moving two fingers closer together), the processor may reduce the box 1804 by moving its top downward and its bottom upward. If the pinch zoom input 1805 is a pinch-out operation (moving two fingers farther apart), the processor may enlarge the box 1804 by moving its top upward and its bottom downward.

The touch input received from the single-window 1801 may be a single-touch input. The size and position of the box 1804 can be adjusted by moving the top or the bottom of the box 1804 separately according to the movement of the single-touch input, along the direction of a touch gesture initiated within the box 1804. The processor may determine the size of the snap window based on the box 1804 and its internal configuration. When the force touch input 1803 is released from the multitasking key, the processor may divide the single-window 1801 into two windows, set one of the two windows as the snap window, and continue to display at least a portion of the web page through the snap window.

Figure 19A:
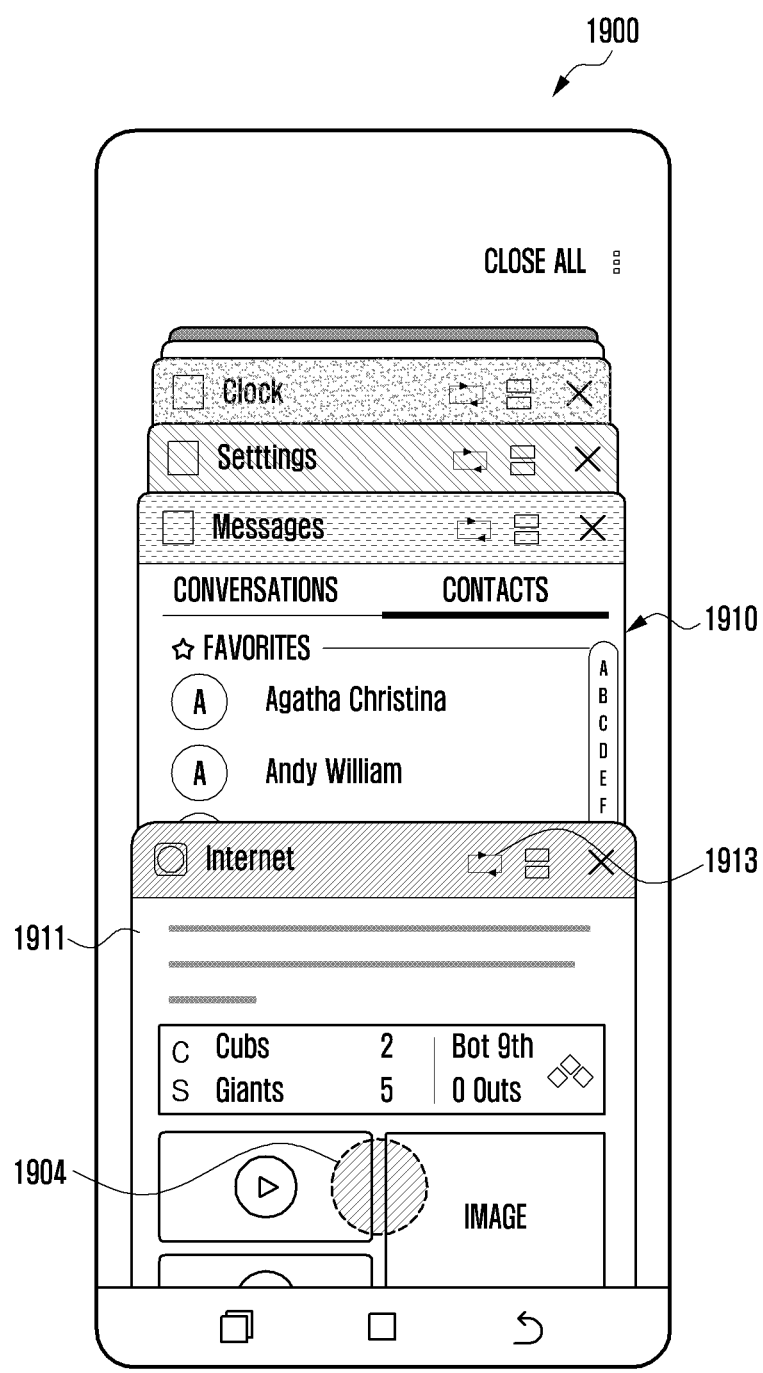
FIGS. 19A and 19B illustrate operations of the electronic device to provide a snap window using an application list according to embodiments of the present disclosure.
Figure 19B:
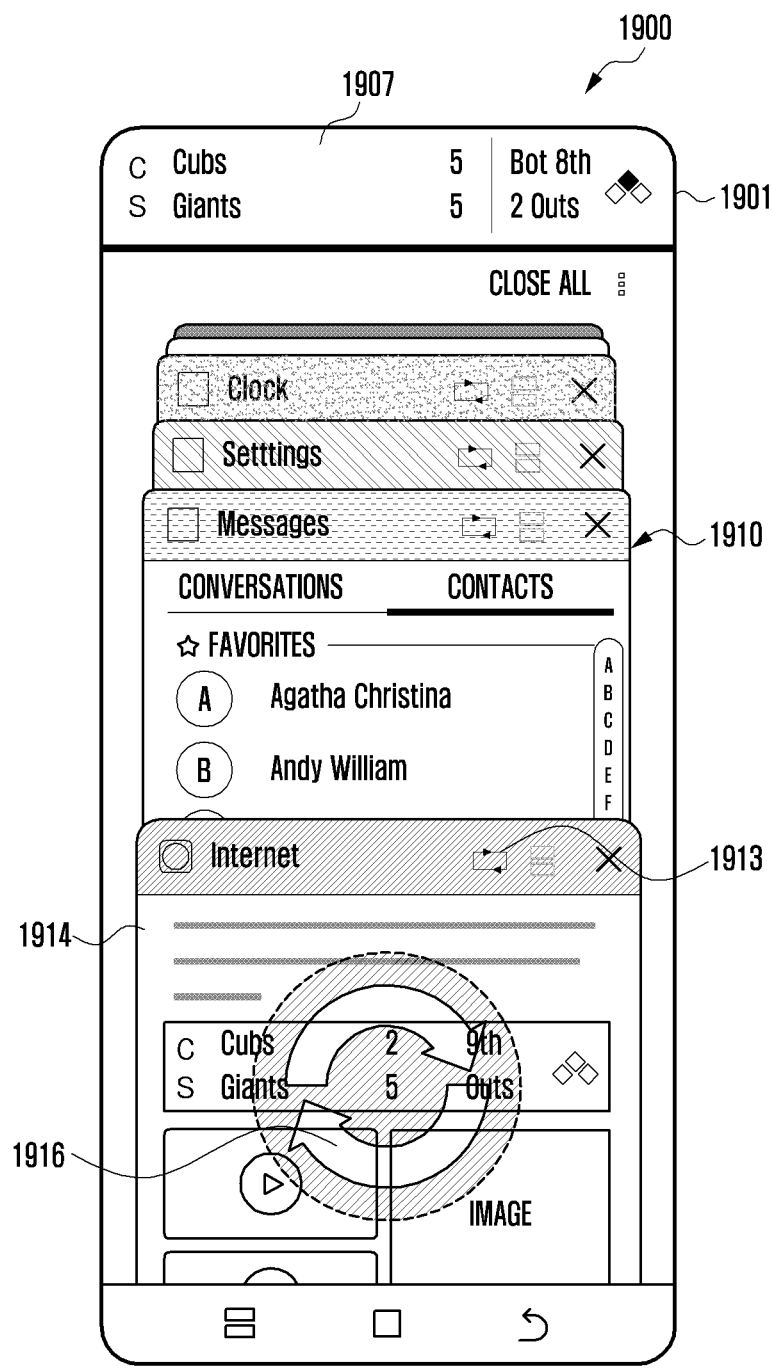

FIGS. 19A and 19B illustrate operations of the electronic device to provide a snap window using an application list according to embodiments of the present disclosure.

In one embodiment, the electronic device may include all or some of the components of the electronic device 101 of FIG. 1 or the electronic device 201 of FIG. 2.

With reference to FIG. 19A, the processor (e.g. processor 120) of the electronic device may provide a list 1910 of currently running applications via the touch sensitive display 1900, and selectively display the application list 1910 through scrolling up/down corresponding to touch input. Among the applications shown by the application list 1910, the screen of a selected application may have been provided through the snap window.

For the application whose screen is being provided through the snap window in the application list 1910, the processor may attach an indicator indicating that the screen is provided through the snap window to the corresponding item of the application. For example, the processor may download a sports news article 1911 from an external server (e.g. server 106) using an Internet application, display the article 1911 through the single-window, and display the scoreboard of the article 1911 through the snap window. When the operating mode of the Internet application is switched from the foreground to the background, the sports news article 1911 may be copied into the clipboard, and, as described above, when the application list 1910 is provided, the sports news article 1911 may be included in an Internet item and displayed as a captured image. A snap window indicator 1913 may also be included in the Internet item. In addition, when the operating mode of the Internet application switches from the foreground to the background, the processor may store history information about the Internet application, such as size and location of the snap window, in the memory.

With reference to FIGS. 19A and 19B, the processor can receive a display request for the snap window from the user while displaying the application list 1910. For example, the processor may receive a force touch input 1904 for the sport news article 1911 or a touch input for the snap window indicator 1913 from the display 1900. In response to the force touch input 1904 or touch input, the processor may check the history information of the Internet application and recognize that the screen of the Internet application has been provided through the snap window. Then, the processor may update the sports news article 1911 using the Internet application, display the updated sports news article 1914 in the Internet item in FIG. 19B, and display a refresh indicator 1916 indicating that the update is in progress on the application list 1910. In addition, based on the history information, the processor may divide the display area of the display 1900 into two portions, set one portion as the snap window 1901, and display the updated scoreboard 1907 through the snap window 1901.

Figure 20A:
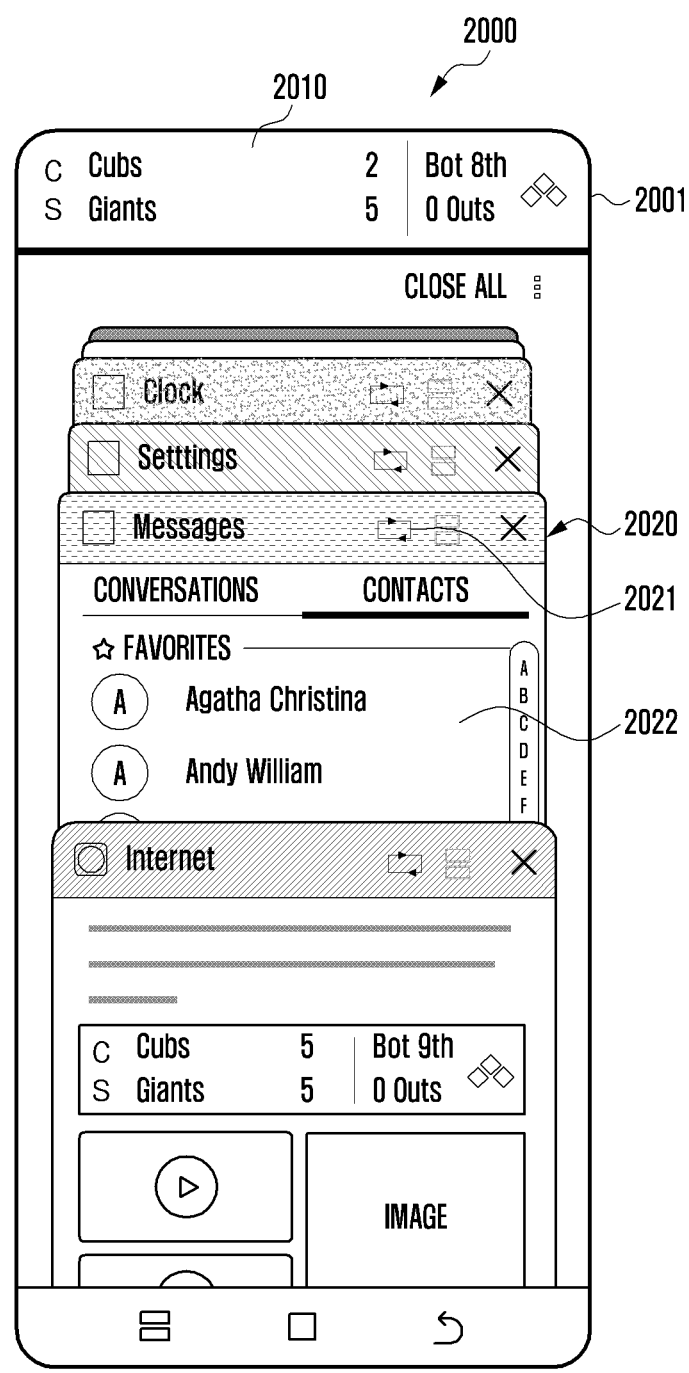
FIGS. 20A, 20B and 20C illustrate operations of the electronic device to provide multiple snap windows via the display according to embodiments of the present disclosure.
Figure 20B:
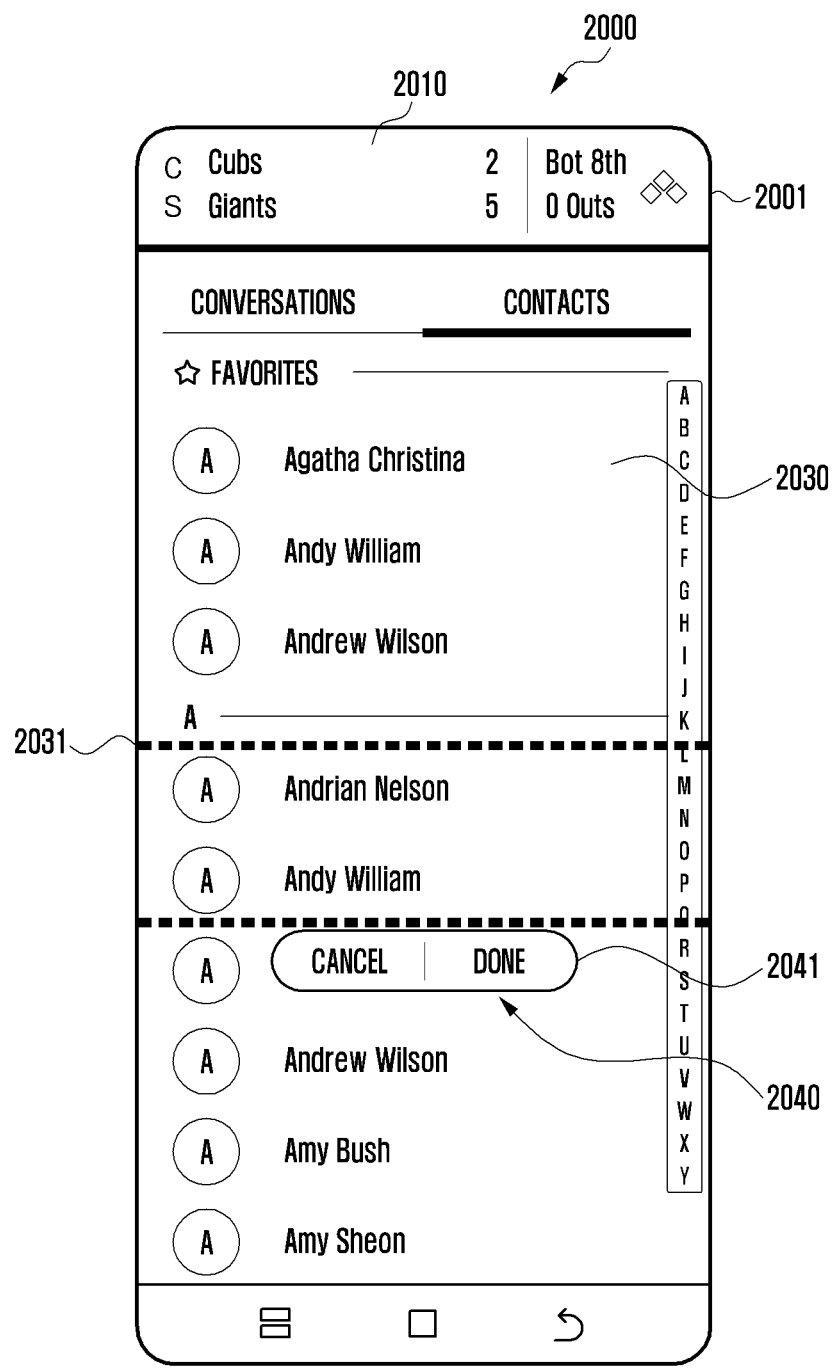
Figure 20C:
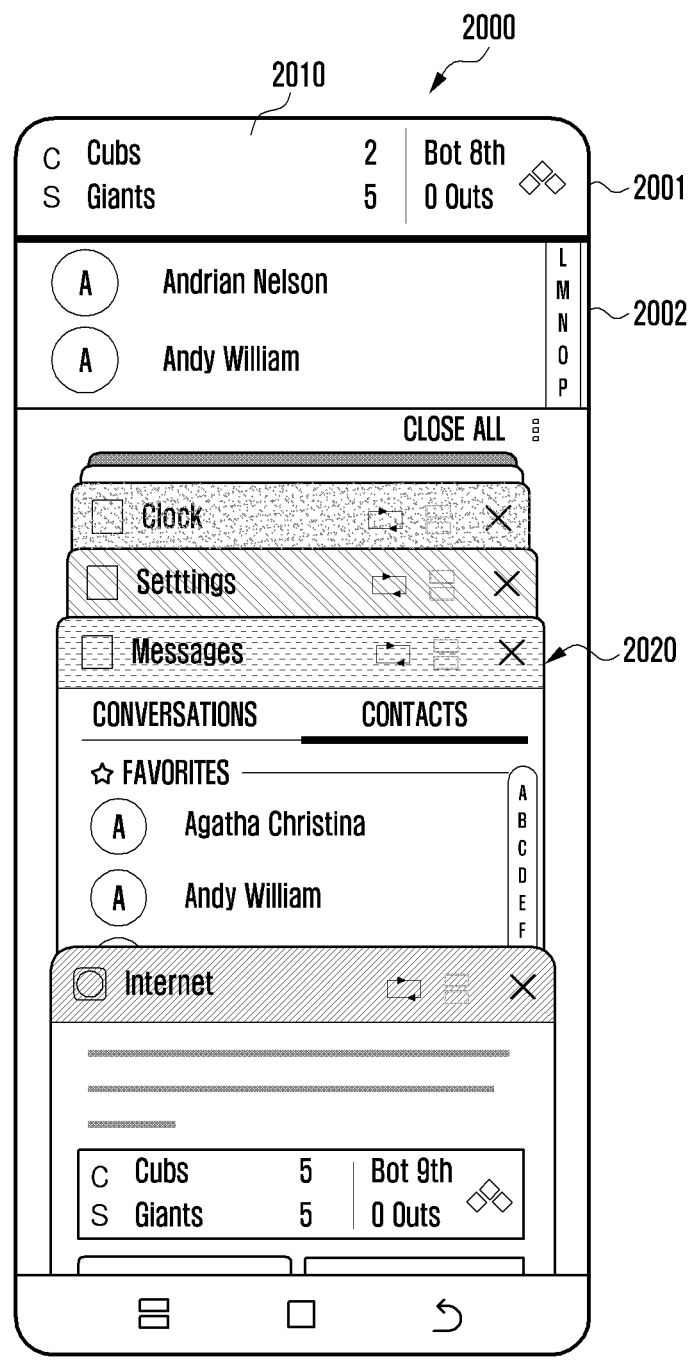

FIGS. 20A, 20B and 20C illustrate operations of the electronic device to provide multiple snap windows via the display according to embodiments of the present disclosure.

In one embodiment, the electronic device may include all or some of the components of the electronic device 101 of FIG. 1 or the electronic device 201 of FIG. 2.

With reference to FIG. 20A, the processor of the electronic device may configure the upper portion of the touch sensitive display 2000 as a first snap window 2001 and display an application screen, such as scoreboard 2010, through the first snap window 2001. In addition, the processor may display the application list 2020 through another portion of the display 2000. Each item of the application list 2020 may include a snap window indicator 2021 indicating that the screen of the corresponding application is available through the snap window.

With reference to FIG. 20B, when the snap window indicator 2021 of the message application is selected by the user, or when a user input, such as a force touch or touch input, is generated in the captured image 2022 of the message application, the processor may display the message application screen 2030 in place of the application list 2020. Additionally, in response to the selection of the snap window indicator 2021, the processor may display the box 2031 on the message application screen 2030.

The electronic device may provide plural snap windows on the display.

With reference to FIGS. 20B and 20C, when the done button 2041 is selected from the selection object 2040, the processor may determine the size, such as vertical length, of the second snap window 2002 based on the box 2031 and its internal configuration, such as content, configure the other part of the snap window 2001 on the display 2000 as the area for the second snap window 2002, and continue to display a portion of the message application screen 2030 through the second snap window 2002. In addition, the processor may display the application list 2020 through an area of the display 2000 outside the snap windows 2001 and 2002.

In embodiments of the present disclosure, the snap window is configured and provided based on touch input. However, the present disclosure is not limited thereto. For example, the snap window may be configured and provided based on the user's gaze recognition using a camera. The snap window may also be configured and provided based on a command received from an external device functionally connected to the electronic device. For instance, the processor may configure the snap window by using information on the user's muscle movement received from a wearable device, or information related to movement of the user received from an acceleration apparatus or a flexible sensor.

In various embodiments, when the snap window is successfully set using the box based on user input, haptic feedback may be provided to the user. Haptic feedback may also be provided when the single-window is successfully split into the snap window and the multitasking window. If user input that cannot be applied to the snap window is received, haptic feedback can be provided for operation error notification.

According to various embodiments of the present disclosure, an electronic device may include a housing configured to include a first surface and a second surface facing away from the first surface, a touchscreen display exposed through a first portion of the first surface, a wireless communication circuit positioned inside the housing, a processor positioned inside the housing and electrically connected to the display and the wireless communication circuit, and a memory positioned inside the housing and electrically connected to the processor, wherein the memory is configured to store instructions that, when executed, cause the processor to display a first user interface of a first application program on the display receive a first user input via the display while the first user interface is displayed display, in response to the first user input, a movable and resizable window for selecting a portion of the first user interface, receive a second user input for selecting the portion of the first user interface via the display, and move, in response to the second user input, the selected portion of the first user interface to a designated region of the display.

According to various embodiments of the present disclosure, an electronic device may include a housing configured to include a first surface and a second surface facing away from the first surface, a touchscreen display exposed through a first portion of the first surface, a touch sensitive button placed at a second portion of the first surface, a wireless communication circuit positioned inside the housing, a processor positioned inside the housing and electrically connected to the display, the button, and the wireless communication circuit; and a memory positioned inside the housing and electrically connected to the processor, wherein the memory is configured to store instructions that, when executed, cause the processor to display a first user interface of a first application program on the display, receive a first user input via the display or the button while the first user interface is displayed, display, in response to the first user input, a movable and resizable window for selecting a portion of the first user interface, receive a second user input for selecting the portion of the first user interface via the display, and move, in response to the second user input, the selected portion of the first user interface to a designated region of the display.

The instructions may cause the processor to display, after moving the selected portion, at least a portion of a second user interface of a second application program or an icon of the second application program through an area of the display outside the designated region, receive a third user input for selecting the second application program via the display, display, in response to the third user input, the selected portion of the first user interface through the designated region, and display at least a portion of the second user interface through the area of the display outside the designated region.

The instructions may cause the processor to display, in response to the third user input, at least a portion of the second user interface so that the at least a portion of the second user interface fills the area of the display outside the designated region.

The instructions may cause the processor to receive, before receiving the second user input, a third user input for changing the size and/or position of the window.

The instructions may cause the processor to: determine the length of one of a first side and a second side of the window having a quadrilateral shape to be the length of one side of the display having a rectangular shape, and change the length of the other of the first side and the second side of the window in response to the third user input, wherein the first side is substantially perpendicular to the second side.

The instructions may cause the processor to receive, after receiving the second user input, a third user input for changing the size and/or position of the selected portion of the first user interface.

The display may have an aspect ratio in the range of 16:9 to 22:9 or 18:9 to 19:9.

The display is in the form of a rectangle having a first side, a second side, a third side, and a fourth side, the third side and the fourth side are shorter than the first side and the second side, and the designated region of the display has a rectangular shape and is tangent to a first portion of the first side, a second portion of the second side, and the third side.

The electronic device may further include a pressure sensor disposed between the touchscreen display and the second surface of the housing, and an input received from the pressure sensor may be used to present the window.

The instructions may cause the processor to adjust the size of the window according to at least one of the pressure intensity and the pressure period indicated by the input received from the pressure sensor.

The instructions may cause the processor to: adjust, if the display mode of the display is portrait mode, the length of a first side of the window being rectangular, and adjust, if the display mode of the display is landscape mode, the length of a second side of the window, wherein the first side is substantially perpendicular to the second side.

If at least a portion of content in the first user interface is located within the window, the whole of the content may be included in the selected portion of the first user interface.

The content may be a video, an image, a notice board, or a text.

The size and position of the designated region may be fixed without change until a third user input for releasing the designated region is received.

The instructions may cause the processor to update the selected portion and display the updated selected portion through the designated region.

The instructions may cause the processor to: receive a fourth user input through the designated region of the display, and display, in response to the fourth user input, another portion of the user interface outside the selected portion through the designated region.

According to various embodiments of the present disclosure, a method of an electronic device having a touchscreen display may include displaying a first user interface of a first application program on the display, receiving a first user input via the display or a touch sensitive button while the first user interface is displayed, displaying, in response to the first user input, a movable and resizable window for selecting a portion of the first user interface, receiving a second user input for selecting the portion of the first user interface via the display, and moving, in response to the second user input, the selected portion of the first user interface to a designated region of the display.

The method may further include displaying, after moving the selected portion, at least a portion of a second user interface of a second application program or an icon of the second application program through an area of the display outside the designated region, receiving a third user input for selecting the second application program via the display, displaying, in response to the third user input, the selected portion of the first user interface through the designated region, and displaying at least a portion of the second user interface through the area of the display outside the designated region.

Embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

What is claimed is:
1. An electronic device comprising:
a housing comprising a first surface and an opposing second surface;
a touchscreen display exposed through a first portion of the first surface;
a wireless communication circuit positioned inside the housing;
a processor positioned inside the housing and electrically connected to the display and the wireless communication circuit; and
a memory positioned inside the housing and electrically connected to the processor,
wherein the memory is configured to store instructions that, when executed, cause the processor to:
display a first user interface of a first application program on the display;
receive a first user input via the display while the first user interface is displayed;
display, in response to the first user input, a movable and resizable window for selecting a portion of the first user interface;
receive a second user input for selecting the portion of the first user interface via the display;
in response to the second user input, display the selected portion of the first user interface to a designated region of the display and simultaneously display an application list in another region of the display, the application list including images corresponding to each of application programs, wherein, if a portion of content in the first user interface is located within the window and another portion of the content is located outside the window, the entire content including the other portion is moved to the designated region of the display;
receive a third user input for selecting a second application program from the application list via the display; and
in response to the third user input, terminate the displaying of the application list, display the selected portion of the first user interface in the designated region and display at least a portion of a second user interface of the second application program,
wherein the instructions further cause the processor to:
display a first indicator and a second indicator in at least one of the images, the first indicator indicating that an application program corresponding to an image including the first indicator is available to be provided through the designated region instead of the first application program, and the second indicator indicating that an application program corresponding to an image including the second indicator is available to be provided through one of multiple windows.

2. The electronic device of claim 1, wherein the instructions further cause the processor to display, in response to the third user input, the at least a portion of the second user interface such that the at least a portion of the second user interface fills the area of the display outside the designated region.

3. The electronic device of claim 1, wherein the instructions further cause the processor to receive, prior to receiving the second user input, a fourth user input for changing at least one of the size and position of the window.

4. The electronic device of claim 3, wherein the instructions further cause the processor to:
determine a length of one of a first side and a second side of the window having a quadrilateral shape to be the length of one side of the display having a rectangular shape; and
change the length of the other of the first side and the second side of the window in response to the fourth user input,
wherein the first side is perpendicular to the second side.

5. The electronic device of claim 1, wherein the instructions further cause the processor to receive, after receiving the second user input, a fourth user input for changing at least one of a size and a position of the selected portion of the first user interface.

6. The electronic device of claim 1, wherein the display is configured to have an aspect ratio in the range of 16:9 to 22:9.

7. The electronic device of claim 6, wherein the display is configured to have an aspect ratio in the range of 18:9 to 19:9.

8. The electronic device of claim 7,
wherein the display has a rectangular shape having a first side, a second side, a third side, and a fourth side,
wherein the third side and the fourth side are shorter than the first side and the second side, and
wherein the designated region of the display has a rectangular shape and is tangential to a first portion of the first side, a second portion of the second side, and the third side.

9. The electronic device of claim 1, further comprising a pressure sensor disposed between the touchscreen display and the opposing second surface of the housing, wherein the window is used for display according to an input received from the pressure sensor.

10. The electronic device of claim 9, wherein the instructions further cause the processor to adjust the size of the window if a touch input force that is received from the pressure sensor is sustained for a predetermined amount of time.

11. The electronic device of claim 1, wherein the instructions further cause the processor to:
adjust, if the display mode of the display is a portrait mode, a vertical length of a first side of the window; and
adjust, if the display mode of the display is a landscape mode, a horizontal length of a second side of the window,
wherein the first side is perpendicular to the second side.

12. The electronic device of claim 1, wherein the content is a video, an image, a notice board, or a text.

13. The electronic device of claim 1, wherein a size and position of the designated region are fixed without change until a fourth user input for releasing the designated region is received.

14. The electronic device of claim 13, wherein the instructions further cause the processor to update the selected portion and display the updated selected portion through the designated region.

15. The electronic device of claim 13, wherein the instructions further cause the processor to:
receive a fifth user input through the designated region of the display; and
display, in response to the fifth user input, another portion of the user interface outside the selected portion through the designated region.

16. An electronic device comprising:
a housing configured to include a first surface and an opposing second surface;
a touchscreen display exposed through a first portion of the first surface;
a touch sensitive button disposed at a second portion of the first surface;
a wireless communication circuit positioned inside the housing;
a processor positioned inside the housing and electrically connected to the display, the button, and the wireless communication circuit; and
a memory positioned inside the housing and electrically connected to the processor,
wherein the memory is configured to store instructions that, when executed, cause the processor to:
display a first user interface of a first application program on the display;
receive a first user input via the display or the button while the first user interface is displayed;
display, in response to the first user input, a movable and resizable window for selecting a portion of the first user interface;
receive a second user input for selecting the portion of the first user interface via the display;
in response to the second user input, display the selected portion of the first user interface to a designated region of the display and simultaneously display an application list in another region of the display, the application list including images corresponding to each of application programs, wherein, if a portion of content in the first user interface is located within the window and another portion of the content is located outside the window, the entire content including the other portion is moved to the designated region of the display;
receive a third user input for selecting a second application program from the application list via the display; and
in response to the third user input, terminate the displaying of the application list, display the selected portion of the first user interface in the designated region and display at least a portion of a second user interface of the second application program,
wherein the instructions further cause the processor to:
display a first indicator and a second indicator in at least one of the images, the first indicator indicating that an application program corresponding to an image including the first indicator is available to be provided through the designated region instead of the first application program, and the second indicator indicating that an application program corresponding to an image including the second indicator is available to be provided through one of multiple windows.

17. A method for operating an electronic device, the method comprising:

displaying, by an electronic device having a touchscreen display, a first user interface of a first application program on the display;

receiving, by the electronic device, a first user input via the display or a touch sensitive button while the first user interface is displayed;

displaying, by the electronic device, in response to the first user input, a movable and resizable window for selecting a portion of the first user interface;

receiving, by the electronic device, a second user input for selecting the portion of the first user interface via the display;

in response to the second user input, displaying, by the electronic device, the selected portion of the first user interface to a designated region of the display and simultaneously displaying, by the electronic device, an application list in another region of the display, the application list including images corresponding to each of application programs, wherein, if a portion of content in the first user interface is located within the window and another portion of the content is located outside the window, the entire content including the other portion is moved to the designated region of the display;

receiving, by the electronic device, a third user input for selecting a second application program from the application list via the display; and in response to the third user input, terminating, by the electronic device, the displaying of the application list, displaying, by the electronic device, the selected portion of the first user interface in the designated region and displaying, by the electronic device, at least a portion of a second user interface of the second application program, wherein displaying the application list comprises displaying a first indicator and a second indicator in at least one of the images, the first indicator indicating that an application program corresponding to an image including the first indicator is available to be provided through the designated region instead of the first application program, and the second indicator indicating that an application program corresponding to an image including the second indicator is available to be provided through one of multiple windows.

* * * * *